(12) United States Patent
Hall

(10) Patent No.: US 9,078,796 B1
(45) Date of Patent: Jul. 14, 2015

(54) APPARATUS FOR LIFTING A CHAIR

(71) Applicant: Shawn Anthony Hall, Pleasantville, NY (US)

(72) Inventor: Shawn Anthony Hall, Pleasantville, NY (US)

(*) Notice: Subject to any disclaimer, the term of this patent is extended or adjusted under 35 U.S.C. 154(b) by 159 days.

(21) Appl. No.: 13/958,798

(22) Filed: Aug. 5, 2013

(51) Int. Cl.
  *A61G 5/14* (2006.01)
  *A47C 3/22* (2006.01)
  *F16M 11/38* (2006.01)

(52) U.S. Cl.
  CPC ... *A61G 5/14* (2013.01); *A47C 3/22* (2013.01); *F16M 11/38* (2013.01)

(58) Field of Classification Search
  CPC .................................... A47C 3/20; A47C 3/22
  USPC ........................................ 297/344.12–344.19
  See application file for complete search history.

(56) References Cited

U.S. PATENT DOCUMENTS

| | | | | |
|---|---|---|---|---|
| 2,615,499 | A * | 10/1952 | Wallace | 297/325 |
| 4,786,107 | A * | 11/1988 | Crockett | 297/330 |
| 5,294,179 | A * | 3/1994 | Rudes et al. | 297/330 |
| 5,871,257 | A * | 2/1999 | Dundes, Sr. | 297/314 |
| 6,068,280 | A * | 5/2000 | Torres | 280/304.1 |
| 7,413,158 | B1 * | 8/2008 | Burer | 248/564 |
| 7,484,805 | B2 * | 2/2009 | Baum | 297/344.15 |
| 7,516,977 | B2 * | 4/2009 | Wu et al. | 280/650 |
| 7,866,747 | B2 * | 1/2011 | Park | 297/217.4 |
| 8,186,658 | B2 * | 5/2012 | Lewis, II | 267/131 |
| 8,292,368 | B1 * | 10/2012 | Yarbrough | 297/344.12 |
| 8,317,266 | B2 * | 11/2012 | Alfredsson et al. | 297/344.15 |
| 8,398,171 | B2 * | 3/2013 | Lin et al. | 297/330 |
| 8,403,409 | B2 * | 3/2013 | Pollard et al. | 297/85 M |
| 8,684,459 | B2 * | 4/2014 | Teufel et al. | 297/284.11 |
| 2003/0080596 | A1 * | 5/2003 | Berman et al. | 297/314 |
| 2005/0280302 | A1 * | 12/2005 | Ropp | 297/344.17 |
| 2007/0295882 | A1 * | 12/2007 | Catton | 248/588 |
| 2010/0117275 | A1 * | 5/2010 | Nakamura | 267/133 |
| 2012/0091773 | A1 * | 4/2012 | Lorey | 297/344.19 |
| 2013/0140865 | A1 * | 6/2013 | Shin | 297/344.12 |
| 2013/0158791 | A1 * | 6/2013 | Contratto et al. | 701/36 |
| 2013/0257127 | A1 * | 10/2013 | Bullis | 297/314 |
| 2013/0320733 | A1 * | 12/2013 | Haller | 297/344.12 |
| 2015/0028643 | A1 * | 1/2015 | Reborse | 297/344.16 |

* cited by examiner

*Primary Examiner* — David R Dunn
*Assistant Examiner* — Timothy J Brindley
(74) *Attorney, Agent, or Firm* — Leason Ellis LLP

(57) ABSTRACT

An apparatus for raising and lowering a payload, particularly a chair and its user to provide assistance with the sit-to-stand task. The apparatus comprises a platform, a left lifter assembly, a right lifter assembly, means to power both lifter assemblies, and means to control the raising and lowering thereof. Means to sense and correct sideways tilt, desirable to preclude excessive tilt if one of the lifters fails, are described. The user may use an existing, favorite chair, including a reclining chair, which is placed upon the platform without modification. In a low position, the platform is very close to the floor, providing comfort during sitting. In a high position, the platform is greatly elevated, to provide a full measure of sit-to-stand assistance. The apparatus doesn't interfere with posterior foot placement during the sit-to-stand process, and doesn't interfere with reclining while sitting. The apparatus is easily deployable, movable, and storable.

15 Claims, 44 Drawing Sheets

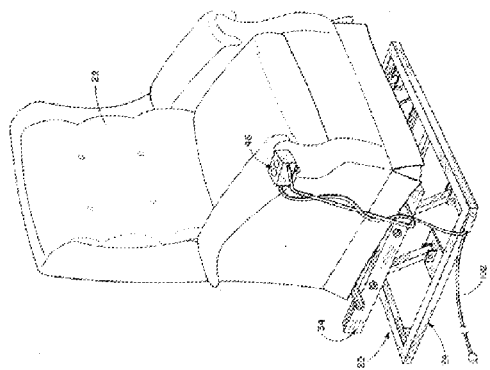
Fig. 1
(Prior Art, Crockett)
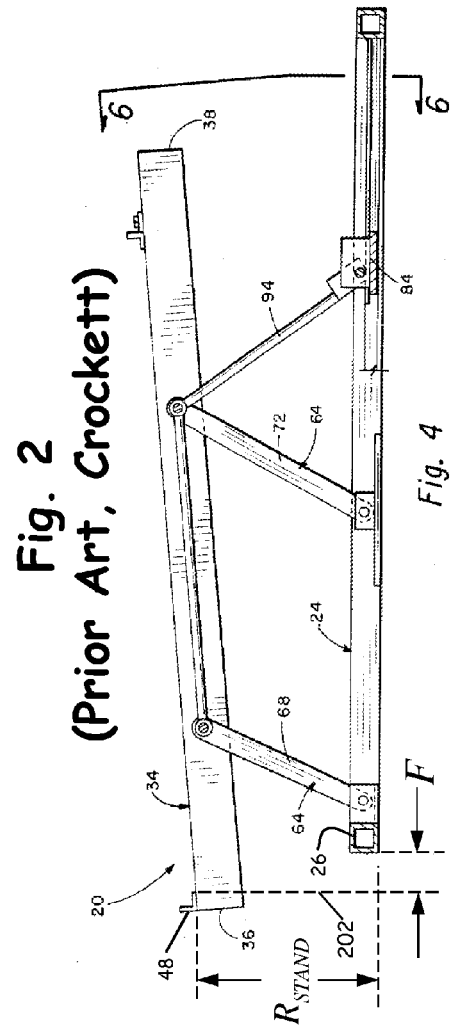
Fig. 2
(Prior Art, Crockett)
Fig. 4
(Prior Art, Crockett)
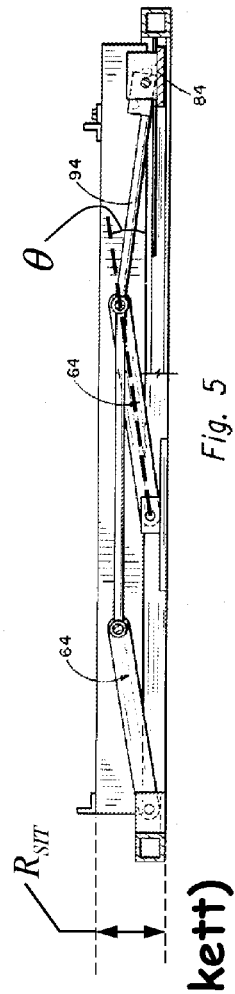
Fig. 3
(Prior Art, Crockett)
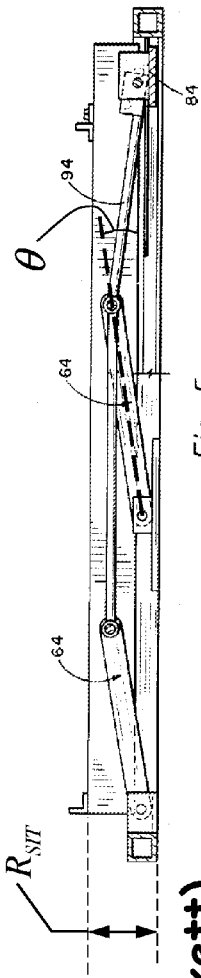
Fig. 5

(Prior Art, LaPointe)

(Prior Art, LaPointe)

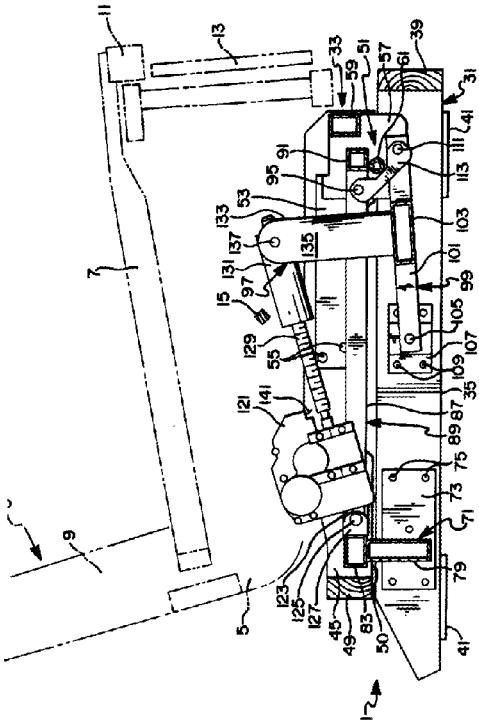
Fig. 7
(Prior Art, LaPointe)
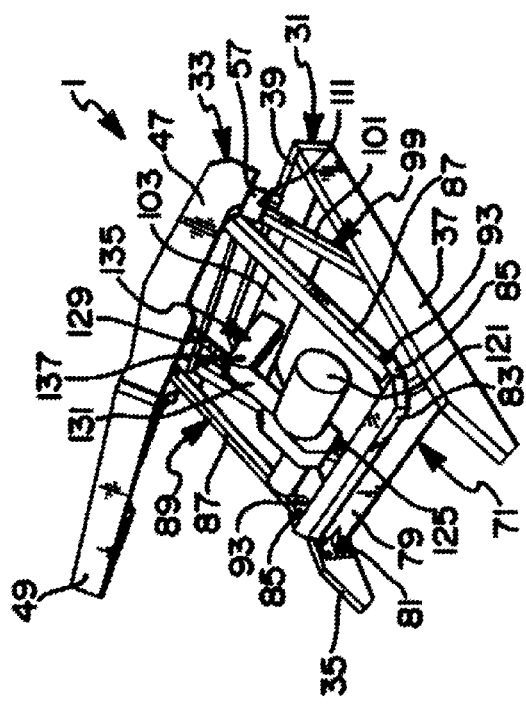
Fig 6. Prior Art (La Pointe)

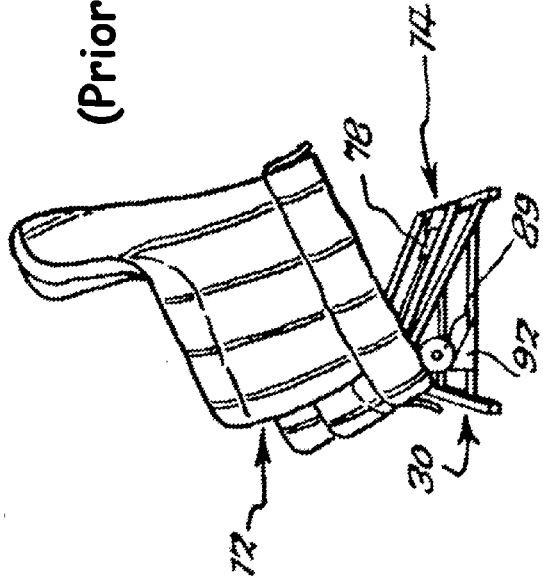
Fig. 8
(Prior Art, Rudes)
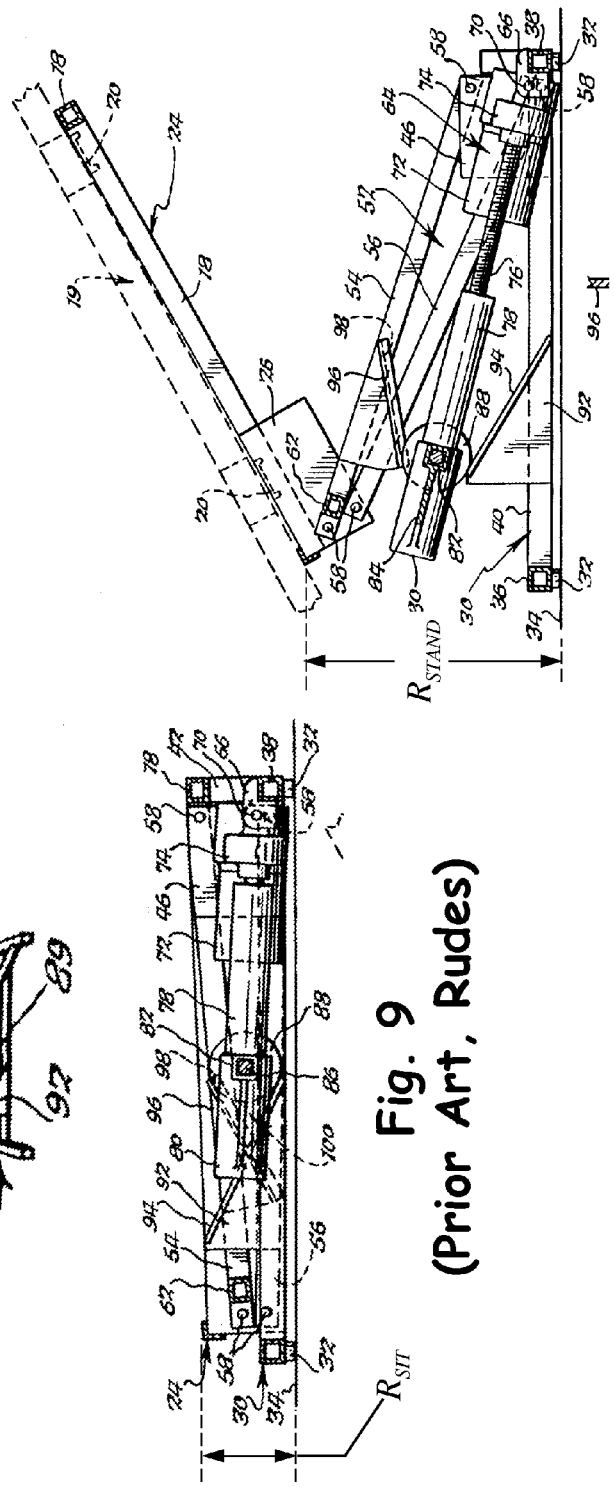
Fig. 9
(Prior Art, Rudes)
Fig. 10
(Prior Art, Rudes)

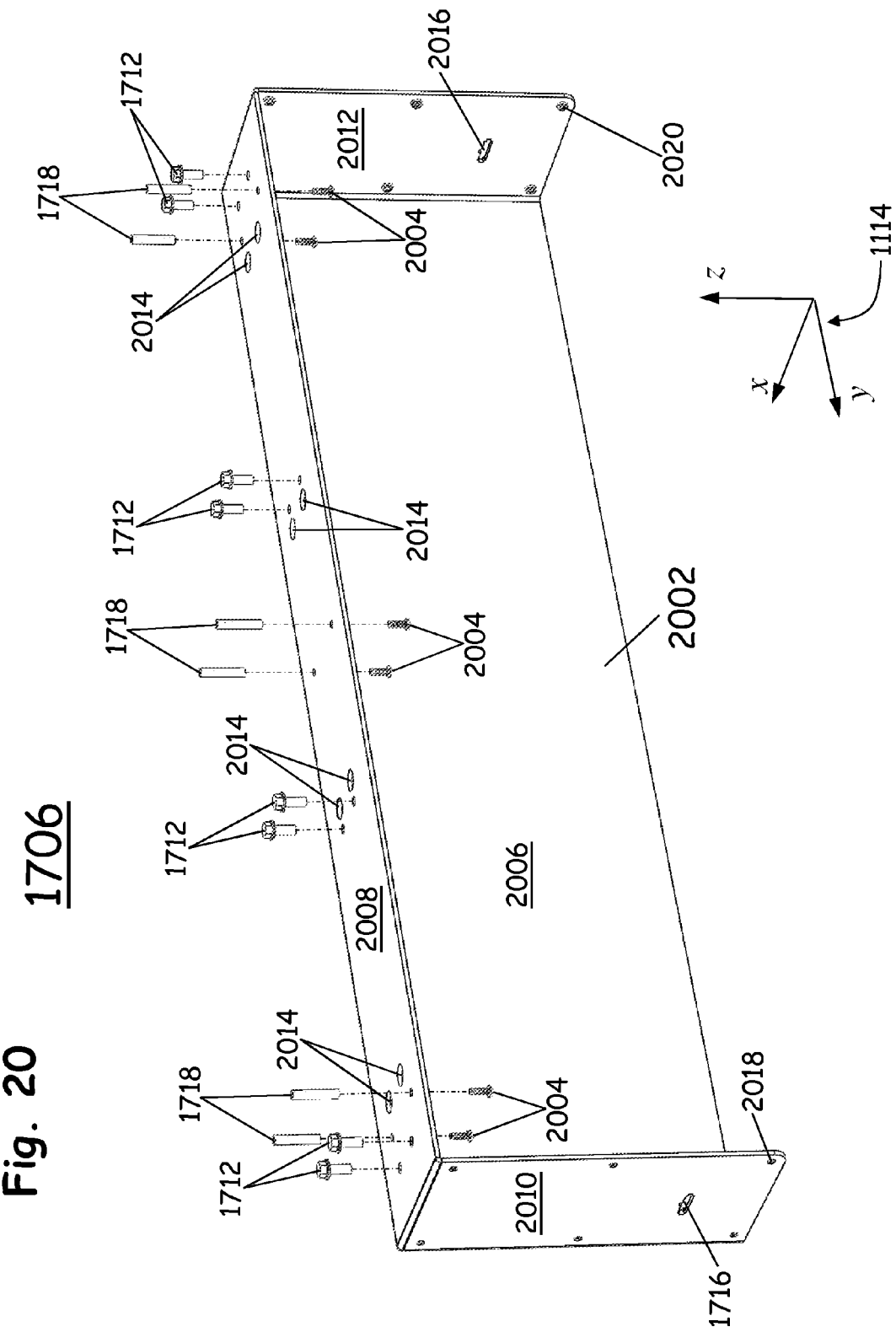

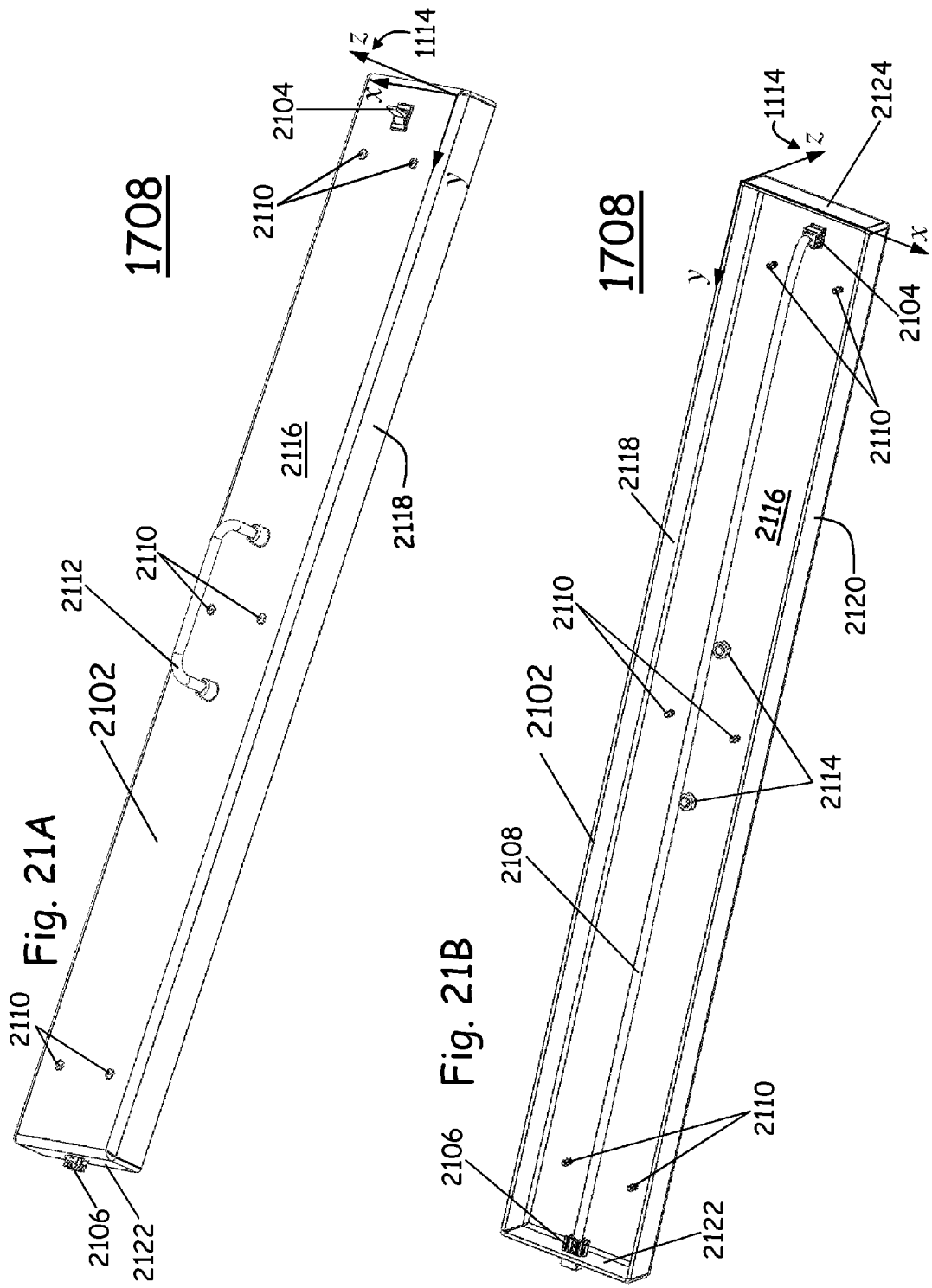

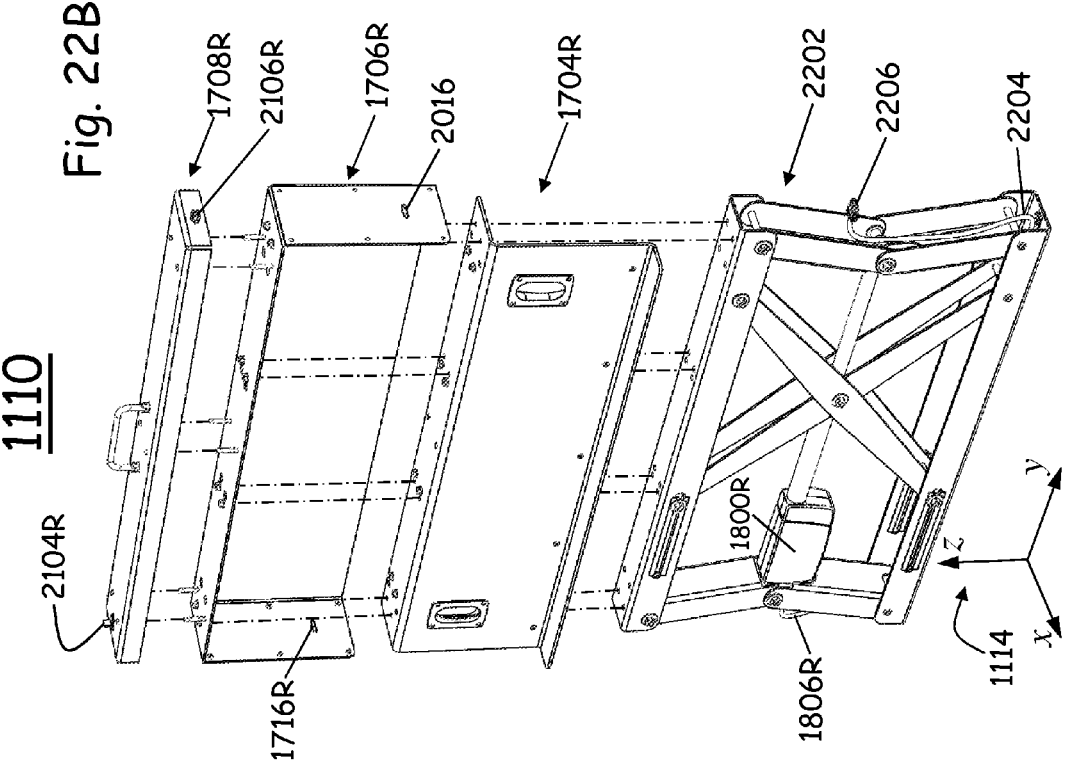
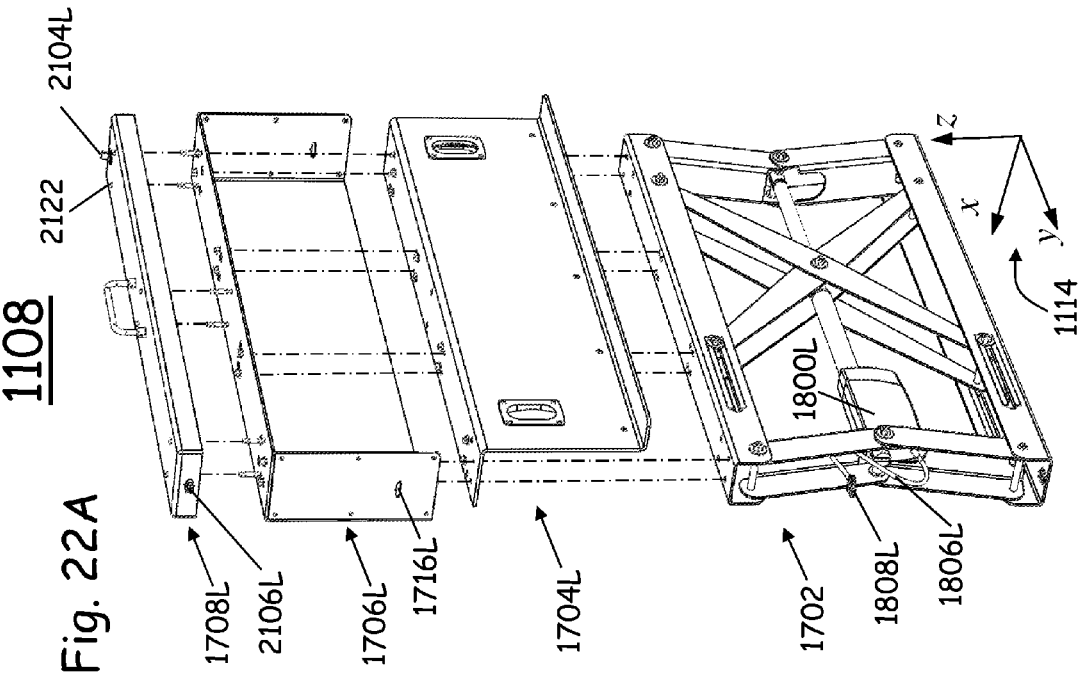

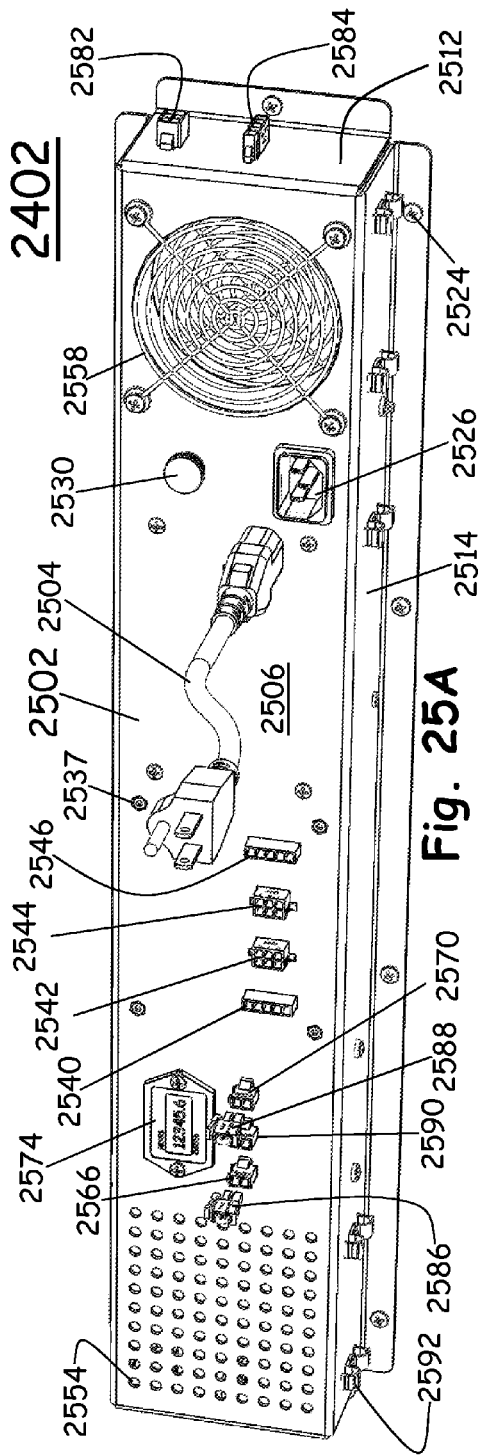
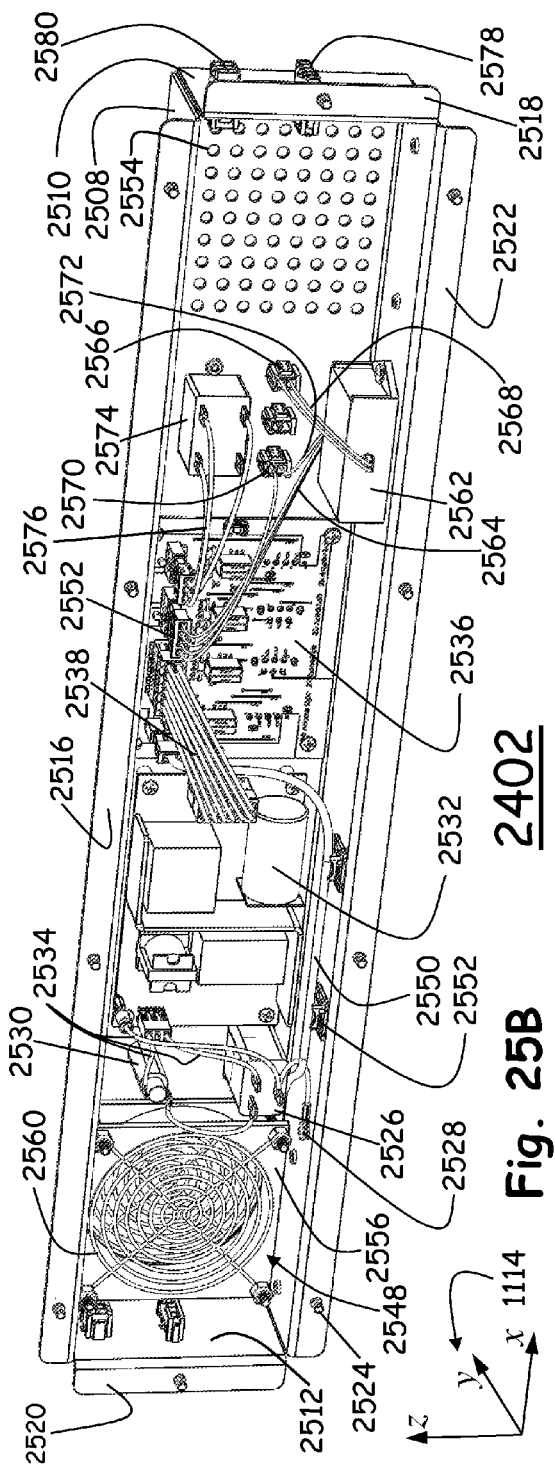
Fig. 25A
Fig. 25B

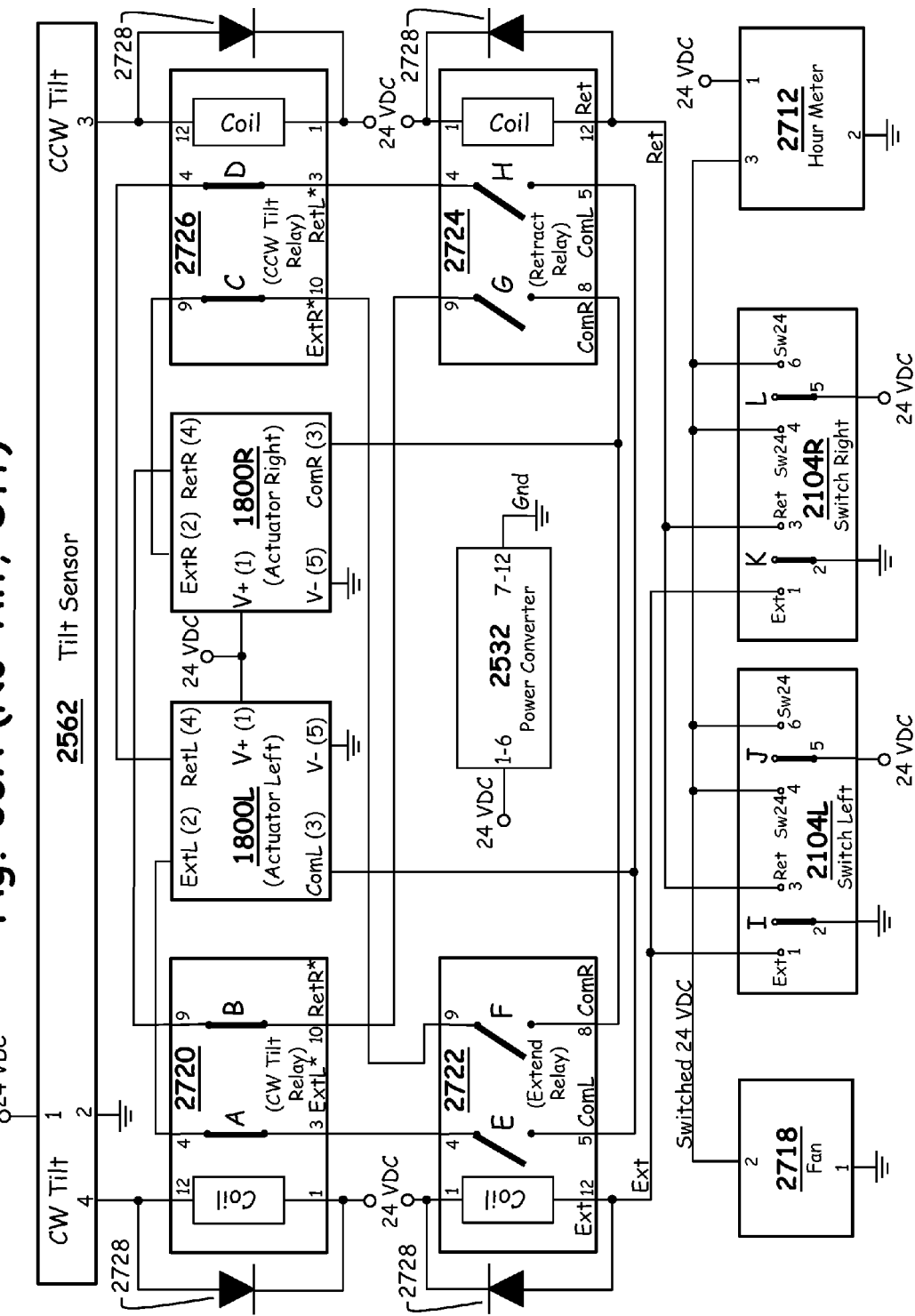
Fig. 36A (No Tilt, Off)

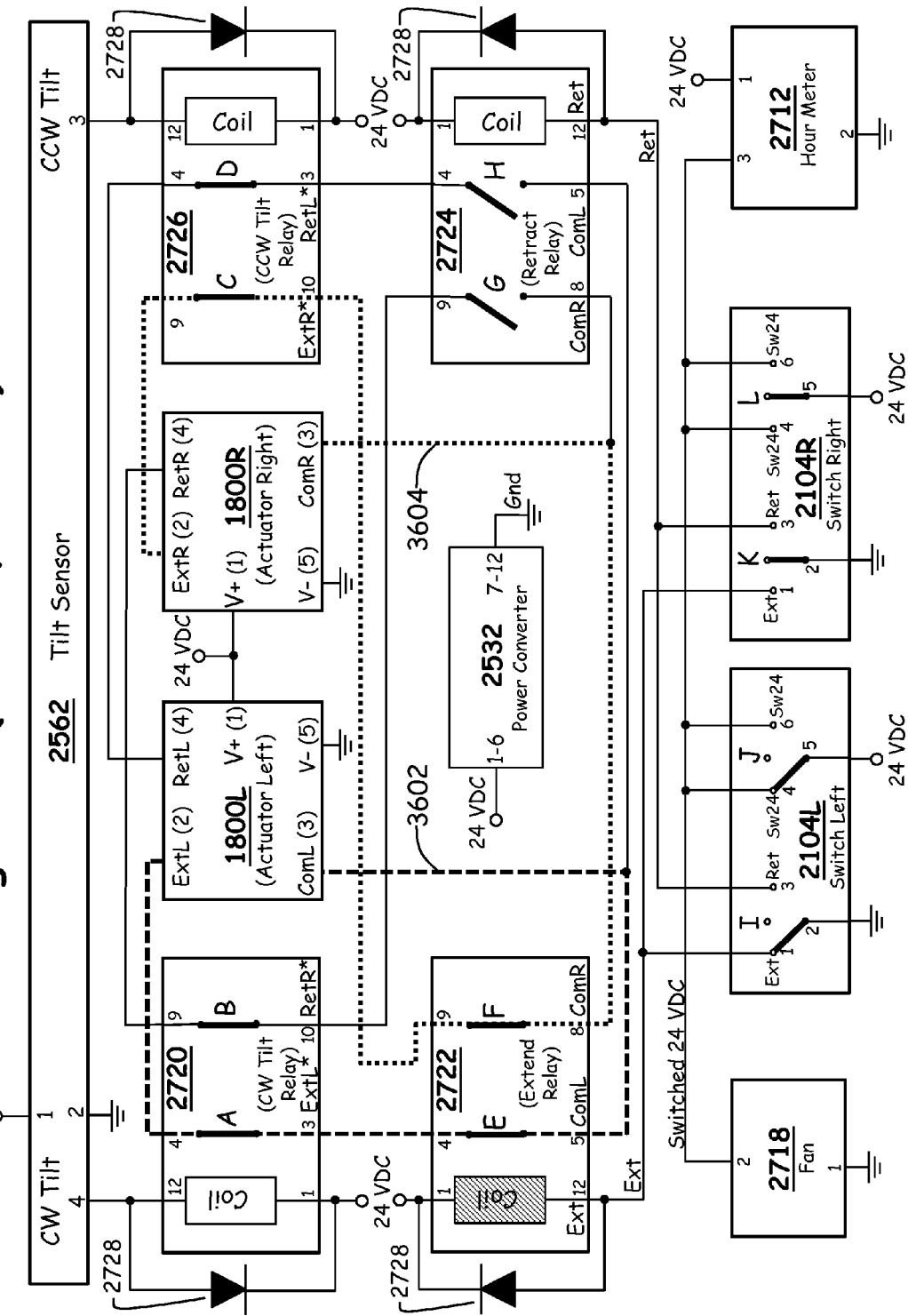
Fig. 36B (No Tilt, Extend)

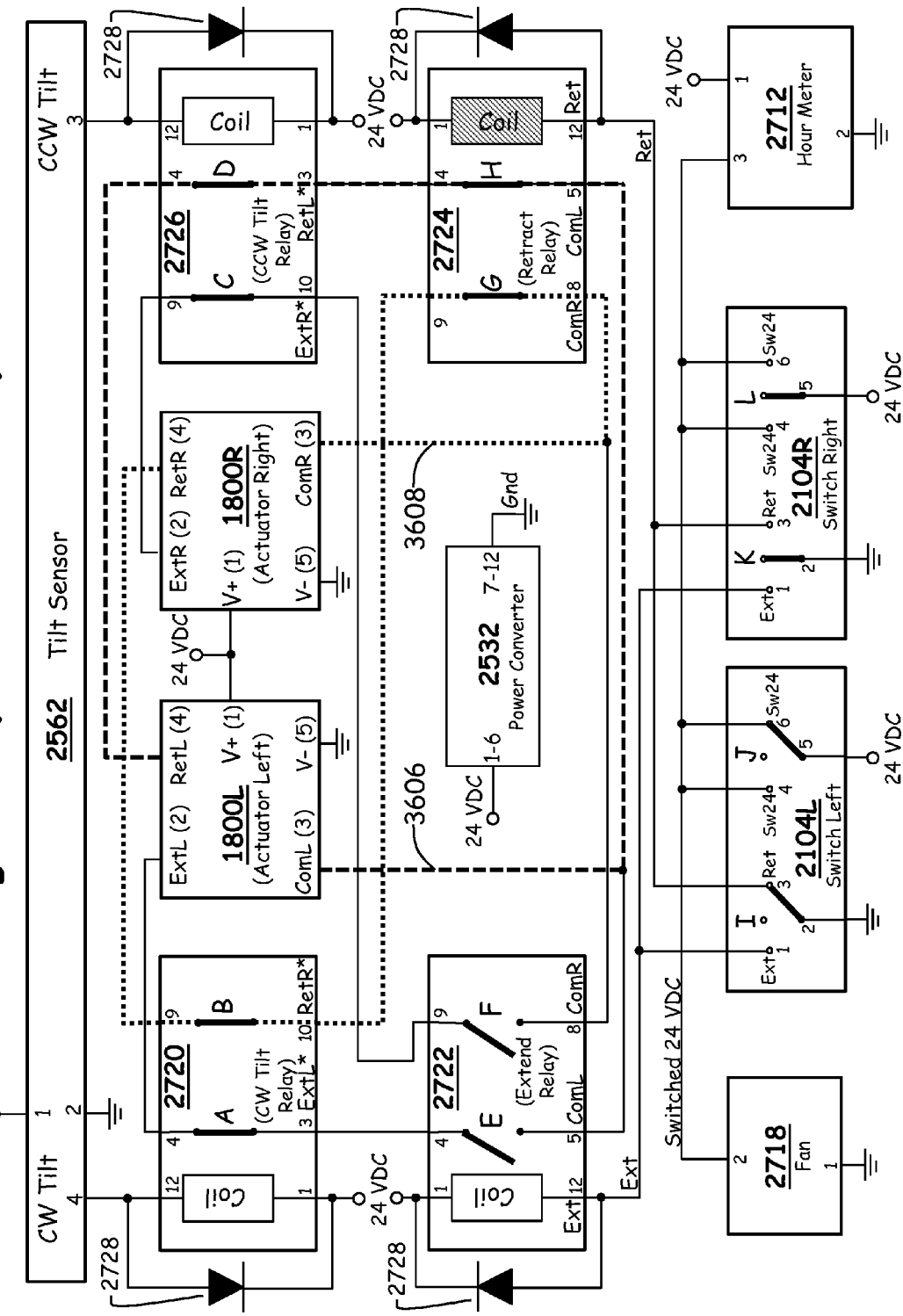
Fig. 36C (No Tilt, Retract)

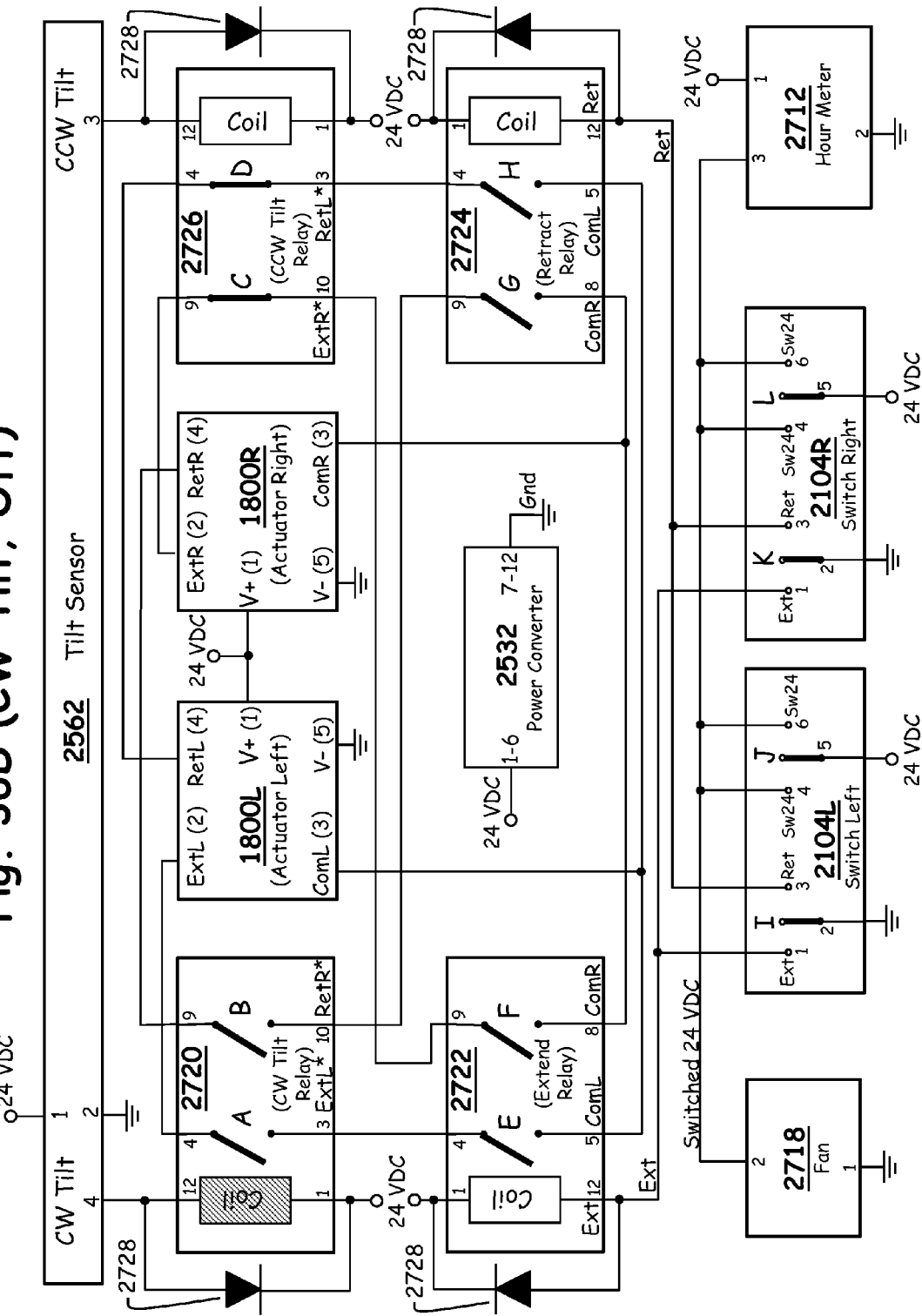
Fig. 36D (CW Tilt, Off)

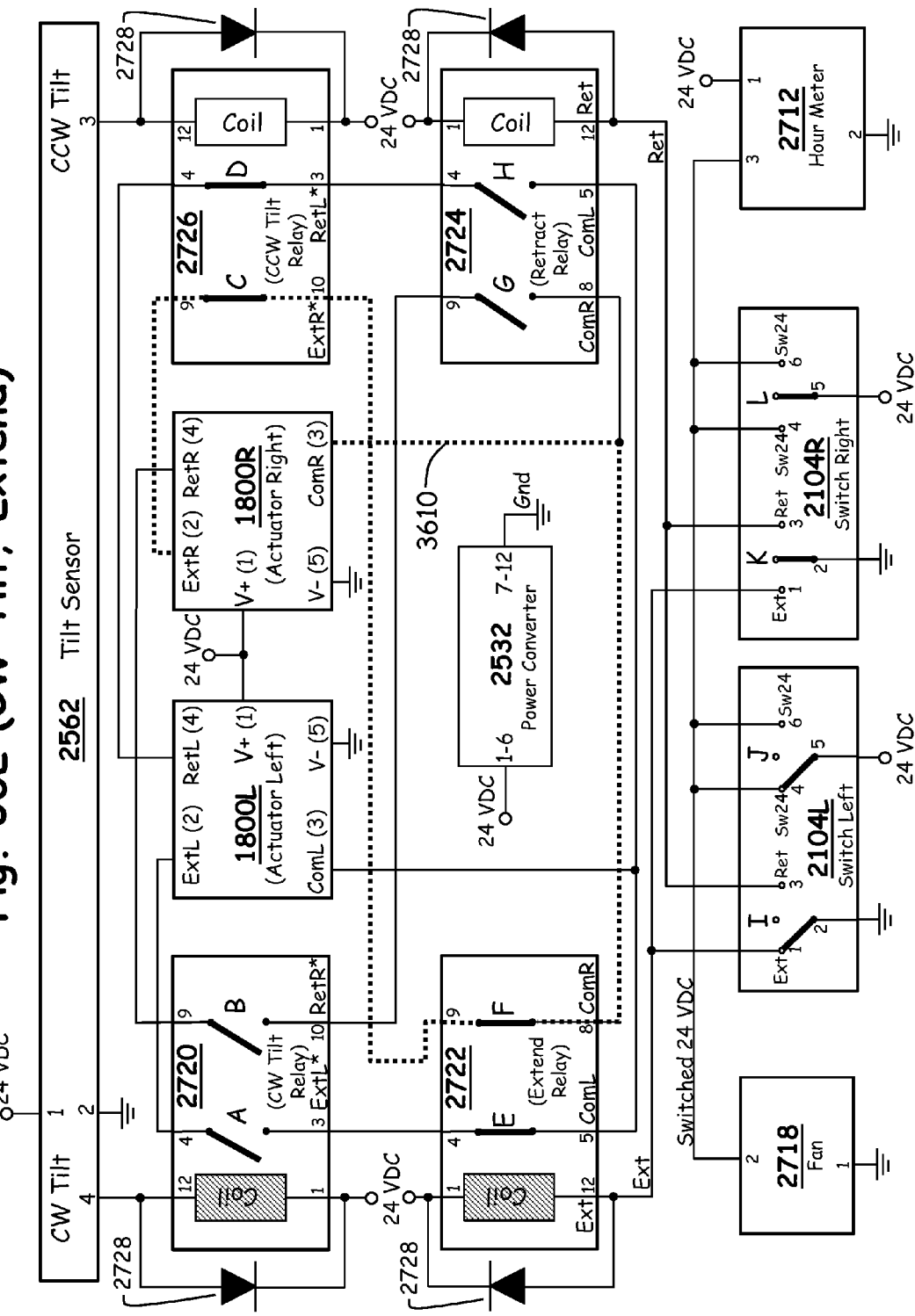
Fig. 36E (CW Tilt, Extend)

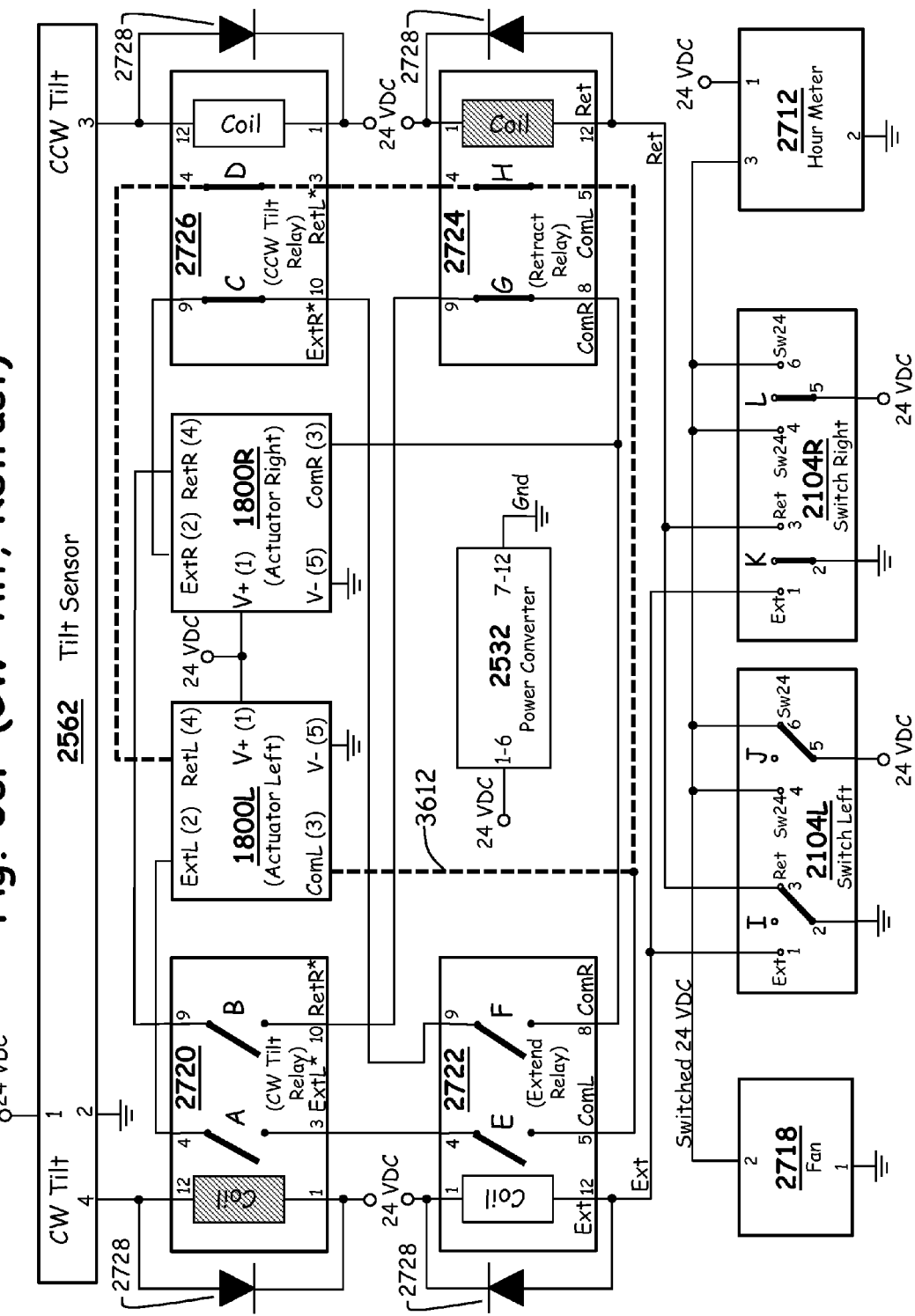
Fig. 36F (CW Tilt, Retract)

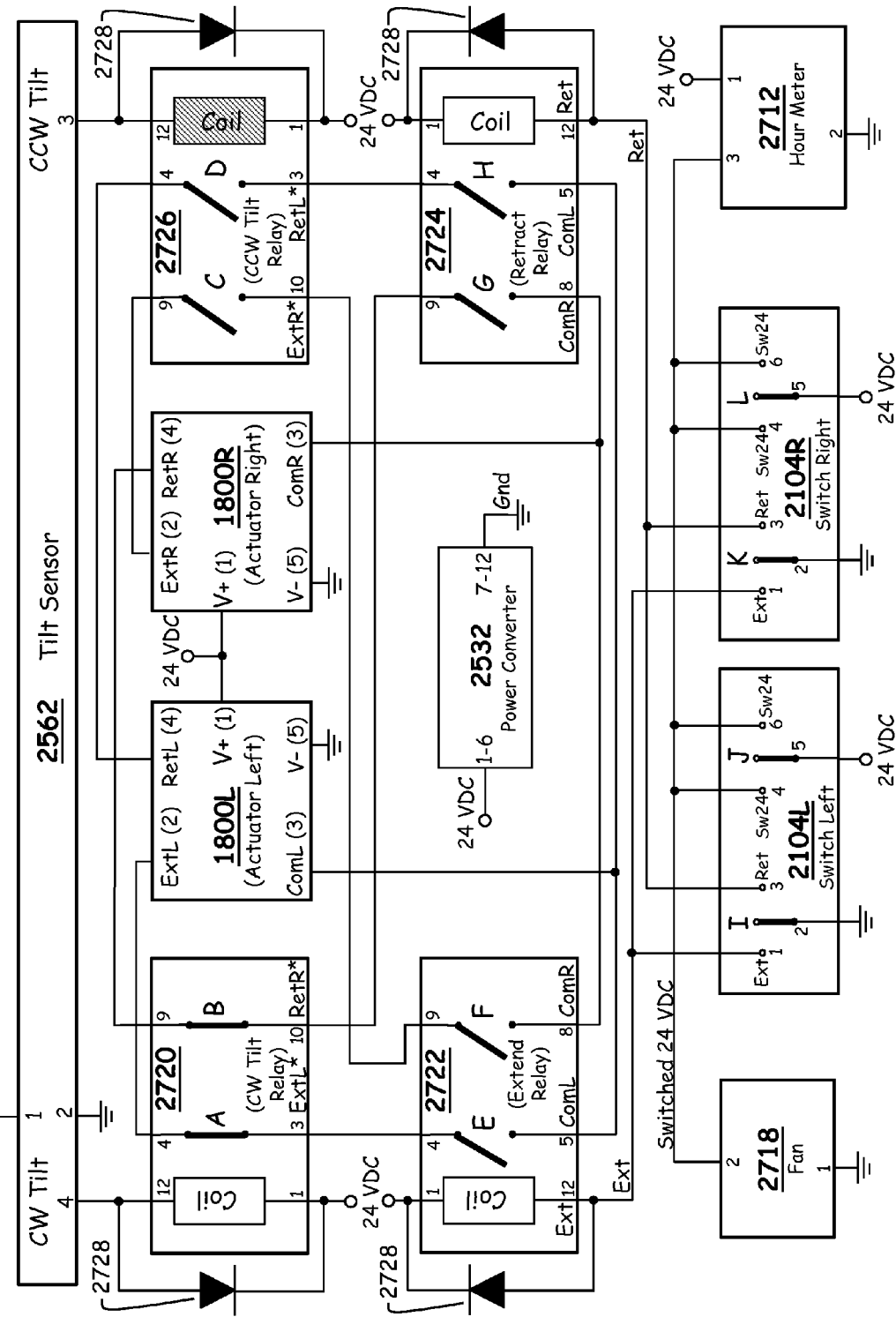
Fig. 36G (CCW Tilt, Off)

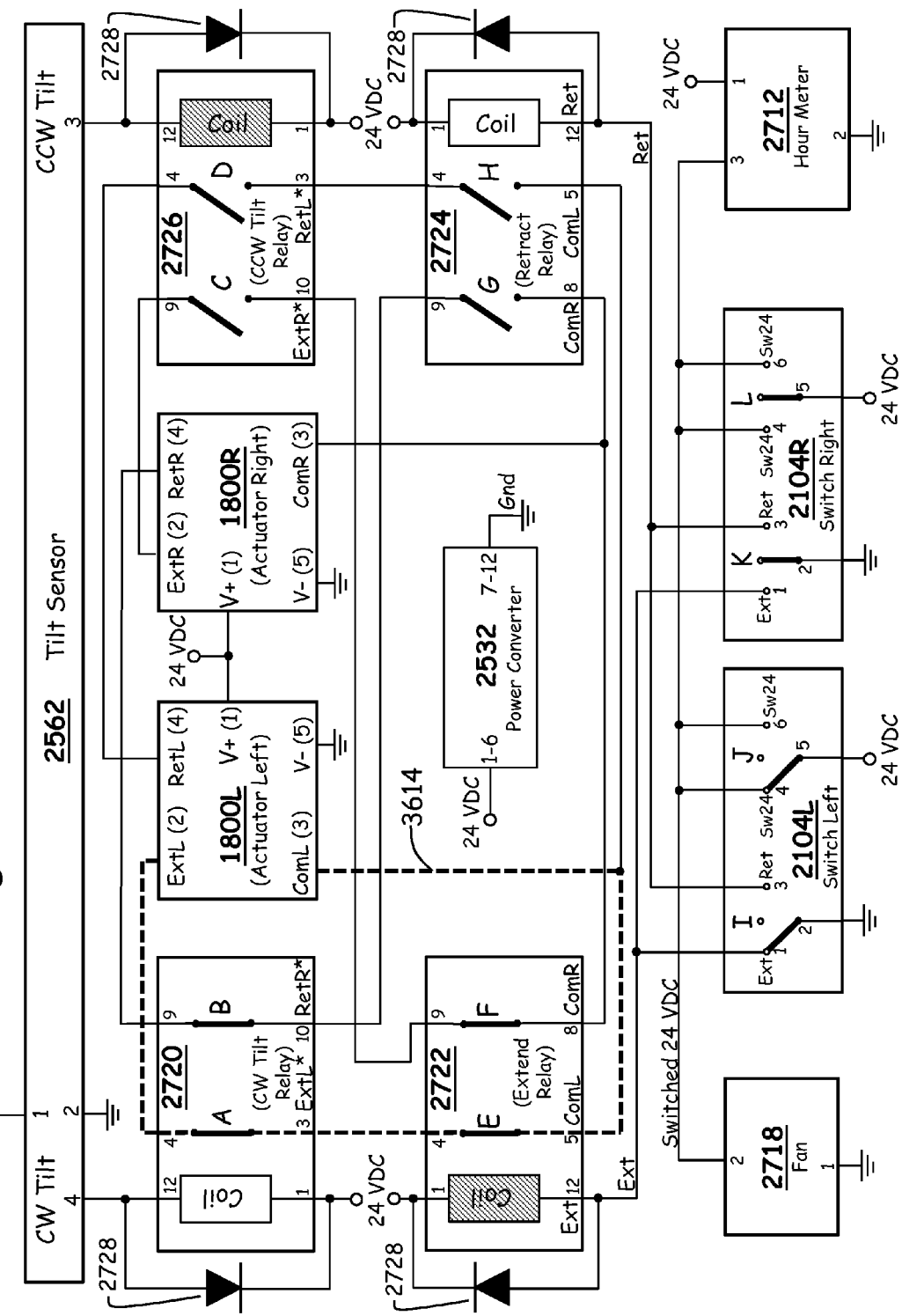
Fig. 36H (CCW Tilt, Extend)

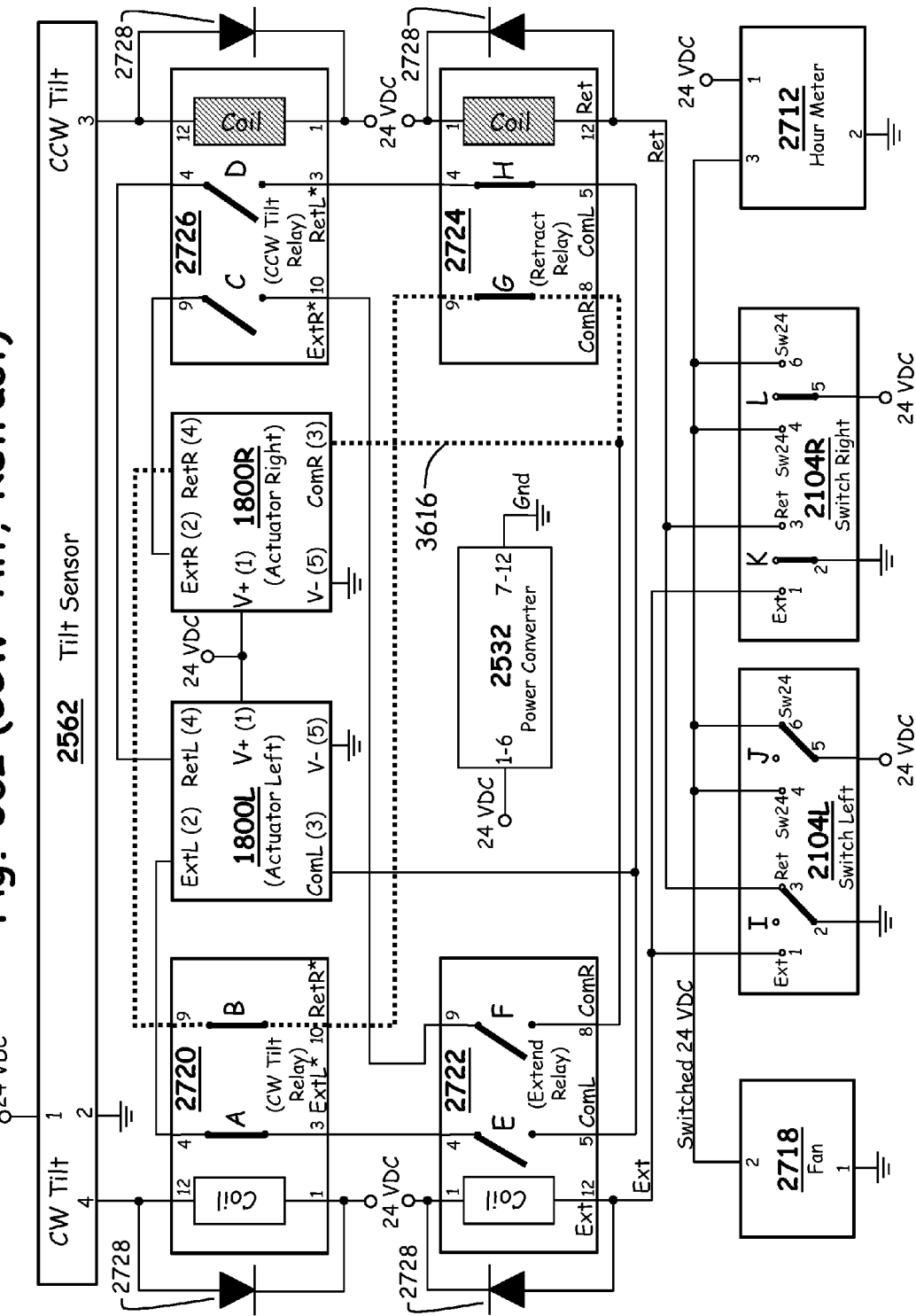
Fig. 36I (CCW Tilt, Retract)

Fig. 37

| Fig. # | Tilt Status | User Command | A | B | C | D | E | F | G | H | I, J | 2720 (CW) | 2722 (Ext) | 2724 (Ret) | 2726 (CCW) |
|---|---|---|---|---|---|---|---|---|---|---|---|---|---|---|---|
| 36A | No Tilt | Off | • | • | • | • | | | | | Off | | | | |
| 36B | No Tilt | Extend | • | • | • | • | • | • | • | | Ext | | ▓ | | |
| 36C | No Tilt | Retract | • | • | • | • | • | • | | • | Ret | | | ▓ | |
| 36D | CW Tilt | Off | | | • | • | | | | | Off | | | | |
| 36E | CW Tilt | Extend | | | • | • | • | • | • | | Ext | ▓ | ▓ | | |
| 36F | CW Tilt | Retract | | | • | • | • | • | | • | Ret | ▓ | | ▓ | |
| 36G | CCW Tilt | Off | • | • | | | | | | | Off | | | | ▓ |
| 36H | CCW Tilt | Extend | • | • | | | • | • | • | | Ext | | ▓ | | ▓ |
| 36I | CCW Tilt | Retract | • | • | | | • | • | | • | Ret | | | ▓ | ▓ |

Switches (• = Closed)  Relays (▓ = Energized)

APPARATUS FOR LIFTING A CHAIR

1. BACKGROUND AND PRIOR ART

The following is a tabulation of some prior art that presently appears relevant:

U.S. Patents

| Pat. No. | Kind Code | Issue Date | Patentee |
|---|---|---|---|
| 4,083,599 | | Apr. 11, 1978 | Gaffney |
| 4,786,107 | | Nov. 22, 1988 | Crockett |
| 4,946,222 | | Aug. 07, 1990 | Matson |
| 4,993,777 | | Feb. 19, 1991 | LaPointe |
| 5,061,010 | | Oct. 29, 1991 | LaPointe |
| 5,165,753 | | Nov. 24, 1992 | Henderson |
| 5,294,179 | | Mar. 15, 1994 | Rudes, et. al. |
| 5,466,046 | | Nov. 14, 1995 | Komorowski, et. al. |
| 5,984,411 | | Nov. 16, 1999 | Galumbeck |
| 8,398,171 | B2 | Mar 19, 2011 | Lin and Tsai |
| 8,403,409 | B2 | Mar 26, 2013 | Pollard and Olcheski |

A person who is infirm, either during recovery from a medical procedure, due to disease, or during old age, often has difficulty rising from a chair to a standing position upon a floor, a process known clinically as the "sit-to-stand task" or "sit-to-stand transfer", and commonly known as "standing up" or "standing".

Many prior-art devices address this problem, typically by raising the height of a chair's seat when a user of the chair wishes to stand. The effectiveness of raising a chair's seat to assist with sit-to-stand transfers is well known, as described at length in "Revolutionary advances in adaptive seating systems for the elderly and persons with disabilities that assist sit-to-stand transfers", by Richard Edlich, Cynthia L. Heather, and Michael H. Galumbeck, appearing in the *Journal of Long-Term Effects of Medical Implants*, 2003, 13(1): 31:39, which is included herein in its entirety by reference, and also in "Determinants of the Sit-to-Stand Movement: A Review", by Wim G M Janssen, Hans B J Bussmann, and Henk J. Stam, *Journal of the American Physical Therapy Association and the Dutch Royal Society for Physical Therapy*, 2002; 82:866-879, which is also included herein in its entirety by reference.

Prior-art devices for assisting with sit-to-stand transfer are separable into two categories; namely, a first category comprising specialty lift chairs that are built specifically for this purpose, and a second category comprising retrofittable devices that may be added to existing, ordinary chairs. Prior-art examples in the first category include U.S. Pat. No. 4,946,222 (Matson, 1990), U.S. Pat. No. 5,061,010 (LaPointe, 1991), U.S. Pat. No. 5,165,753 (Henderson, 1992), U.S. Pat. No. 5,466,046 (Komorowski, 1995), U.S. Pat. No. 5,984,411 (Galumbeck, 1999), U.S. Pat. No. 8,398,171 B2 (Lin and Tsai, 2011), and U.S. Pat. No. 8,403,409 B2 (Pollard and Olcheski, 2013). Prior-art examples in the second category include U.S. Pat. No. 4,786,107 (Crockett, 1988), U.S. Pat. No. 4,993,777 (LaPointe, 1991), and U.S. Pat. No. 5,294,179 (Rudes et al., 1994).

A third category of devices comprises retrofits to existing lift chairs that provide functions other than lifting. An example of this category is U.S. Pat. No. 4,083,599 (Gaffney, 1978), which provides rocking and wheeling functions for an existing lift chair. Devices in the third category are not germane to the current discussion because they themselves do not provide the chair-lifting function.

Devices in the first category—specialty lift chairs—are sold, for example, by La-Z-Boy® Incorporated of Monroe, Mich.; Pride Mobility Products of Exeter, Pa.; Golden Technologies of Old Forge, Pa.; AmeriGlide Inc. of Raleigh, N.C.; Easy Comforts of Oshkosh, Wis.; and others. Unfortunately, some infirm and older people who replace a favorite, comfortable, ordinary chair, such as a recliner, with one of the rising-and-tilting models are disappointed because of reduced comfort. Comfort in seating is highly individual; infirmity should not force a person to replace a favorite chair with a less-comfortable lifter chair, particularly if sit-to-stand assistance is needed only for a limited time, such as following a knee-replacement operation, as described in Edlich et al. previously cited, or following a posterior hip-replacement operation to avoid excessive hip flexion, as described in "Flexion reminder device to discourage recurrent posterior dislocation of a total hip replacement: a case report", by King Wong et al., *Journal of Medical Case Reports*, 2008, 2:250. Consequently, there is a need for a device that may be retrofitted to a normal chair—any chair of the user's choice—to provide sit-to-stand assistance.

Such is the motivation for devices in the second category—retrofittable devices that may be added to an existing, ordinary chair that normally rests upon a floor. Such an ordinary chair typically has a seat that is a fixed height above the floor. A typical, prior-art retrofit allows a user of the ordinary chair, when the user wishes to stand up, to increase the seat height from a low position used for sitting to a high position. This helps the user to stand. Conversely, the retrofit allows the user, when wishing to sit down, to decrease the seat height from the high position to the low position. This helps the user to sit.

Definitions

Let $H$ = A vertical distance from the floor to a seat surface of the chair, also called "the seat", measured at the front of the seat. (1)

$R$ = For a chair-lifting retrofit, a vertical distance from the floor to a base plane defined by a base of the chair, measured on a line defined by the intersection of the base plane with a vertical plane through the front of the seat. (2)

$H_0$ = The value of H for a chair without a retrofit. (3)

$H_{SIT}$ = The value of H for a chair with the retrofit in its low position. (4)

$H_{STAND}$ = The value of H for a chair with the retrofit in its high position. (5)

$R_{SIT}$ = The value of R when the retrofit is in its low position; that is, the low-position "overhead" of the retrofit. (6)

$R_{STAND}$ = The value of R when the retrofit is in its high position. (7)

$\Delta R = R_{STAND} - R_{SIT}$ = Amount by which the retrofit raises the base plane of the chair, measured at the front of the seat, as the retrofit moves from the low position to the high position. (8)

$\Delta H = H_{STAND} - H_{SIT}$ = Amount by which the retrofit raises the seat of the chair, measured at the front of the seat, as the retrofit movies from the low position to the high position. (9)

From these definitions, it follows that $H_{SIT} = H_0 + R_{SIT}$, (10)

$H_{STAND} = H_0 + R_{STAND}$, (11)

$\Delta H = \Delta R$. (12)

Note that definitions (3) through (12) above are deliberately stated in terms of the height of the chair at the front of the seat, because this is what matters most in helping the user to stand. Standing may be accomplished only when the user's center of gravity moves forward of the heels of his or her feet, as described in Edlich et. al. cited earlier. Consequently, if the user's buttocks remain toward the rear of the seat, far behind the heels, standing is more difficult, because the body's center of mass is too far back, requiring a greater forward-leaning angle of the torso. Rather, the user should move his or her body's center of mass forward as much as possible, before attempting to stand, by sliding the buttocks forward toward the front of the seat. This also insures that the user's feet will remain in contact with the floor as the seat rises, as required for safety. Such a strategy is often recommended for people with bad backs and for pregnant women (e.g. http://my.clevelandclinic.org/healthy_living/back_health/hic_posture_for_a_healthy_back.aspx); in general, it is a task that many infirm people are able to accomplish easily and without assistance in typical chairs. Once the buttocks are repositioned toward the front of the chair, the height of the rear portion of the seat doesn't matter because the user is no longer in contact with the rear of the seat. Moreover, once the buttocks are repositioned toward the front, the forward tilt of the seat (provided by many specialty lifter chairs as well as prior-art retrofits) doesn't substantially matter either, for the same reason. Only the height of the front portion of the seat matters.

First Desirable Attribute

Consequently, a first desirable attribute of a chair-lifting retrofit is that the amount of seat rise provided, measured at the front of the seat, be large. That is, $\Delta R$ (=$\Delta H$) should be large. If not-so-demanding users requires less change in seat height than the amount $\Delta H$ provided by the retrofit, they are free to use less, because a retrofit chair lifter typically can move to any position within its range and stop on demand. To determine how large $\Delta H$ should be for the most demanding users, consider results reported by Edlich et al., previously cited: for normal chairs, average seat heights vary from $$H_0 = 381 \text{ mm} = 15" \text{ for living rooms} \tag{13}$$

to $$H_0 = 422 \text{ mm} = 16.6" \text{ for nursing homes,} \tag{14}$$

whereas sit-to-stand performance is aided by lifting the seat height to as much as $$H_{STAND} = 610 \text{ mm} = 24". \tag{15}$$

An adequate value for $\Delta H$ may be computed from $$\Delta H = \Delta R = H_{STAND} - H_{SIT} = H_{STAND} - (H_0 + R_{SIT}), \tag{16}$$

where the latter equality uses equation (10). Thus, for an ideal retrofit in which the low-position "overhead" $R_{SIT}$ is zero (see "Second Desirable Attribute", below), $$\Delta H = H_{STAND} - H_0 \text{ (for ideal case } R_{SIT} = 0\text{),} \tag{17}$$

whence, using the values in equations (15) and (13), an adequate amount of seat rise is $$\Delta H = \Delta R = (610 - 381) \text{mm} = 229 \text{mm} = 9.0". \tag{18}$$

Consequently, prior-art retrofits that fail to raise the front portion of the seat at least this much are deficient.

Second Desirable Attribute

A second desirable attribute of a chair-lifting retrofit is that the low-position "overhead" imposed by the retrofit, $R_{SIT}$, defined by equation (6), be as close to zero as possible, because the user, sitting for extended periods of time with the retrofit in the low position, is likely to be very uncomfortable when $R_{SIT}$ is considerably larger than zero, inasmuch as his or her feet may be unsupported, or only partially supported, on the floor, particularly if his or her lower legs are short.

Consider how large a value of $R_{SIT}$ is acceptable. Although seat heights vary considerably from person to person, the presumption in designing a chair-lifting retrofit must be that the user's own chair is comfortable for the user; that is, the seat height $H_0$ is comfortable. Thus, when in the low position, the retrofit should alter $H_0$ as little as possible, because the user's comfort is indeed quite sensitive to the value of the $H_{SIT}$.

As stated by ergonomics experts (http://ergo.human.cornell.edu/dea3250notes/sitting.html): "Minimum height [of a seat] should be 15" (38 cm) ... Fixed height should be 17" (43 cm). This is a compromise. A chair that is too high leads to increased pressure at the popliteal fold (underside of knees), decreasing blood circulation and increasing pressure on the nerve. A chair that is too low increases weight on the ischial tuberosities [the sitting bones]". Note how closely the values stated in this passage agree with equations (13) and (14). It is concluded that variation beyond the 50-mm (2-inch) range sited by these sources is unacceptable. Thus, a chair-lifting retrofit must be limited to at most $$R_{SIT} \leq 50 \text{ mm } (2"), \tag{19}$$

and the closer $R_{SIT}$ is to zero, the better.

Third Desirable Attribute

A third desirable attribute of a chair-lifting retrofit is that, at the front of the chair where the feet are placed, there should be no obstructions at or near floor level when the retrofit is in the high position, so that the user's feet may be placed rearward of the front of the seat prior to standing. Define an available foot space F as F=Horizontal distance, projected onto the plane of the floor, measuring rearward from the projected front edge of the chair's seat to the nearest element of the retrofit that, in its high position, abuts or is near the floor in a manner that may prevent the user from moving his or her feet rearward. (20)

For a chair-lifting retrofit, F is important because moving the feet rearward at the onset of standing, known as "posterior foot placement", minimizes the forward rotation of the torso required to position the body's center of gravity forward of the heels. That is, allowing posterior foot placement (i.e. larger F) helps the user to stand. This is discussed in Edlich et al. (previously cited), citing a study by Kawagoe (Kawagoe, S., Tajimi N, Chosa E., "Biomechanical analysis of foot placement with varying chair height on the motion of standing up", *J. Orthop Sci* 2000; 5:124-133). Edlich concludes: "in addition to being of adequate height, chairs should have enough space beneath the seat to permit posterior foot placement." Thus, F should be large enough to allow any user as much room as desired to move the feet rearward.

To estimate an adequate value for F, let $\theta_{KNEE}$=Backwardly inclined angle of lower leg with respect to vertical, (21)

and assume that, in the high position of the retrofit, the back of the user's legs, backwardly inclined at angle $\theta_{KNEE}$, are, to aid standing as much as possible, snuggly against the front edge of the retrofit's supporting platform located distance $R_{STAND}$ from the floor. Assuming the platform to be relatively thin, the user's heels are therefore rearward of the front of the platform by an amount $$F = R_{STAND} \tan \theta_{KNEE}. \tag{22}$$

Literature (e.g. Camargos et. Al., "The Effects of Foot Position on the Performance of Sit-to-Stand Movement with Chronic Stroke Subjects", *Arch. Phys. Med. Rehabil*, Vol. 90, February 2009) suggests that a typical backwardly inclined knee angle during the sit-to-stand movement is $$\theta_{KNEE}=15°. \tag{23}$$

Assuming equation (18) with the ideal case $R_{SIT}=0$ yields $R_{STAND}=229$ mm, whence the value of F required to avoid interference with the posterior foot placement is estimated, using equations (22) and (23), to be $$F=(229 \text{ mm})\tan 15°=61 \text{ mm}. \tag{24}$$

Consequently, it is desirable that a chair-lifting retrofit provide at least this much clear space at floor level rearward of the front of the chair seat.

Fourth, Fifth, and Sixth Desirable Attributes

A fourth desirable attribute of a chair-lifting retrofit is that it be universally applicable to all types of chairs without custom engineering, and without modifying the chair.

A fifth desirable attribute of a chair-lifting retrofit is that its mechanism should avoid occupying space between the base of the chair and the underside of its seat. A retrofit lacking this attribute lacks general usefulness, because for many chairs, including most popular recliner models, no such space is available—the mechanism of the chair itself already occupies virtually all the space between its base and its seat.

A sixth desirable attribute of a chair-lifting retrofit is that it should be easily deployed and easily un-deployed. This is important, for example, if the retrofit is used with a given chair only for a short time, on a rental basis for example, implying that the retrofit must be redeployed repeatedly with different chairs. Consequently, as for the fourth desirable attribute, deployment should not involve modifying the chair, such as penetrating its members with fasteners. Moreover, the retrofit should disassemble into a small number of pieces, each of which is compact and easily manageable.

Shortcomings of Prior Art

Every prior-art chair-lifting retrofit suffers from one or more of the following shortcomings:

(a) It fails to have the first desirable attribute; that is, ΔR is too small. Thus the prior-art retrofit fails to provide sufficient sit-to-stand assistance, the very task it purports to accomplish.

(b) It fails to have the second desirable attribute; that is, $R_{SIT}$ is too large. Thus the prior-art retrofit makes sitting uncomfortable.

(c) It fails to have the third desirable attribute; that is, F is too small. Thus the prior-art retrofit is less effective at helping the user stand because it does not allow sufficient posterior foot placement.

(d) It fails to have the fourth desirable attribute; that is, it requires custom adaptation to be effectively and safely used with different types of chairs. For example, some prior-art retrofits, as will be shown, cause the chair to tilt forward. To avoid danger in such cases, the chair must be well secured to the retrofit. Yet each chair is different, so a custom scheme must be developed to secure it to the retrofit. Consequently, prior-art retrofits that tilt forward lack general usefulness, because they cannot be adapted to a wide variety of chairs without costly and time-consuming custom engineering. Moreover, in most cases, the chair must be modified to achieve safe retrofit-to-chair attachment; for example, the chair's frame members must be penetrated by fasteners such as screws, which is undesirable.

(e) It fails to have the fifth desirable attribute; that is, its mechanism fails to avoid occupying some of the space between the base of the chair and the underside of the seat. Such a retrofit lacks general usefulness, because for many chairs, including most popular recliner models, no such space is available—the mechanism of the chair itself already occupies virtually all the space between floor and seat. Typically, prior-art retrofits suffer from shortcoming (e) because they attempt thereby to avoid shortcoming (b).

(f) It fails to have the sixth desirable attribute; that is, it cannot be easily deployed and un-deployed, for one or more reasons. It may require modification of the chair, or otherwise involve difficult and time-consuming assembly. It may be monolithic and therefore be too cumbersome and heavy to move easily. Conversely, it may disassemble into too many pieces, and therefore be difficult to manage.

With regard to these six shortcomings (a) through (f), consider specifically each piece of previously cited prior art in the second category (i.e. retrofits), including U.S. Pat. No. 4,786,107 (Crockett, 1988), U.S. Pat. No. 4,993,777 (LaPointe, 1991), and U.S. Pat. No. 5,294,179 (Rudes et al., 1994). To summarize, Crockett's retrofit suffers from shortcomings (a), (b), (c), (d) and (f); LaPointe's retrofit suffers from shortcomings (a), (e), (f) and to some extent from (b) and (c); and Rudes's retrofit suffers from shortcoming (a), (b), (d), and (f), and may suffer from (c).

Specific Prior Art: Crockett (U.S. Pat. No. 4,786,107) (FIGS. 1 through 3)

Crockett's chair-lifting retrofit suffers from shortcoming (b): $R_{SIT}$ is too large. Consider Crockett's FIGS. 1, 4 and 5, duplicated herewith annotations as FIGS. 1, 2, and 3, respectively. FIGS. 2 and 3 illustrate side views of Crockett's retrofit: FIG. 2 shows the retrofit in a high position; FIG. 3 shows it in a low position. In the low position, the mechanism adds seat-height overhead $R_{SIT}$ to the normal seat-height of the chair seat. Crockett does not state a value for $R_{SIT}$, but it must be large enough to accommodate a certain minimum angle of the riser arm (Crockett's reference numeral 64), this angle being denoted θ on FIG. 3; otherwise, the force required from Crockett's power means (reference numeral 44 of Crockett's FIG. 2, not shown here), would become so large that no practical power means could deliver it, inasmuch as the required force varies as the cotangent of angle θ, which rises to infinity as θ approaches zero. Moreover, Crockett's value of $R_{SIT}$ must be large enough to accommodate the power means itself. For both these reasons, Crockett's value of $R_{SIT}$ is estimated to be 75 mm or more, which violates the requirement (19), which states that $R_{SIT}$ should be limited to 50 mm, and preferably be smaller. Consequently, Crockett's retrofit fails to provide comfortable sitting for the user.

Crockett's retrofit further suffers from shortcoming (a); that is, ΔR is too small. Crockett does not state a typical value of ΔR achieved by his apparatus, but scaling in FIGS. 2 and 3 shows $$\frac{\Delta R}{R_{SIT}} = \frac{R_{STAND} - R_{SIT}}{R_{SIT}} = 1.59 \text{ (Crockett).} \tag{25}$$

Assuming the value $R_{SIT}=75$ mm estimated in the previous paragraph implies $$\Delta R=119 \text{ mm}=11.9 \text{ cm}=4.7\text{"(Crockett).} \tag{26}$$

This value of ΔR is far less than the desired value of 229 mm (9.0") stated in equation (18). Consequently, Crockett's retrofit provides insufficient sit-to-stand assistance for many users.

Crockett's retrofit further suffers from shortcoming (c), because front base member 26, which remains at floor level even when the retrofit is in the high position (FIG. 2), traverses the entire width of the apparatus, as shown in FIG. 1.

Consequently, it forms an obstruction that may prevent the user from the desired posterior foot placement. Crockett does not state a value of F, and the position of the front of the chair seat is with respect to Crockett's front base member 26 is unclear. However, assuming the front of the chair seat aligns with the front bracket 48, as shown by the dashed line 202, scaling in FIG. 2 shows $$\frac{F}{R_{SIT}} = 0.54 \text{ (Crockett).} \tag{27}$$

Using the value $R_{SIT}$=75 mm assumed above implies $$F=40 \text{ mm (Crockett).} \tag{28}$$

This is somewhat less than the value of 61 mm stated in requirement (24), so Crockett's retrofit may well interfere with posterior foot placement. The result depends on the assumed position of dashed line 202. Nevertheless, a lifter assembly without a front base member such as Crockett's 26 would be superior, because it would rule out any possibility of interference with posterior foot placement.

Crockett's retrofit also suffers from shortcoming (d). As stated in Crockett's column 2, lines 54-57: "The attachment means . . . may be replaced with clips, straps, bands, bolts, screws, etc. to accommodate a particular seating structure's . . . or user's requirements." That is, deploying the retrofit safely requires a varied array of attachment solutions that must be separately engineered for various types of chairs, and likely involves altering the chair by penetration of fasteners and the like. The general usefulness of Crockett's retrofit is thereby compromised.

Finally, Crockett's retrofit suffers from shortcoming (f), not only because it may require modification of the chair, as already mentioned, but also because it is a monolithic structure which is likely to be too heavy and cumbersome to be easily moved and stored.

Specific Prior Art: La Pointe (U.S. Pat. No. 4,993,777) (FIGS. 4 through 7)

LaPointe's chair-lifting retrofit suffers from shortcoming (a). Consider LaPointe's FIGS. 1 and 2, which are reproduced here as FIGS. 4 and 5 respectively. Referring to these figures, La Pointe states the following at column 2, lines 55-58: "the height 21 of the seat 11 above the floor is about 17 inches in the seated position of [FIG. 5] and about 18 inches in the fully elevated position of [FIG. 4]." That is, the important portion of the seat—the front—is raised only by $$\Delta R = 1''=25 \text{ mm (LaPointe).} \tag{29}$$

This is far less than the required value of 229 mm stated in equation (18). To be sure, because of the forward tilt angle that LaPointe provides (29°), the rear of the seat is raised much more, but this is largely ineffective in helping the user to stand, because to be in contact with the rear portion of the seat, the user's center of gravity must be so far back that it cannot possibly be forward of the heels, which is required to achieve the sit-to-stand task. Thus, LaPointe's retrofit provides far too little seat rise to help appreciably with the sit-to-stand process.

LaPointe's retrofit is on the borderline of suffering from shortcoming (c). Consider LaPointe's FIG. 4, reproduced here as FIG. 6. Referring to this figure, La Pointe's base assembly 1 comprises a wooden front cross member 39 that extends across the front of the mechanism. Because the cross member rests nearly at floor level almost directly beneath the front edge of the seat 11, it may well violate requirement (24) that quantifies the requirement to avoid interference with posterior foot placement. LaPointe does not state a value of the foot clearance F, but it may be estimated by from FIG. 4, where by measurement $$\frac{F}{H_{BACK}} = 0.0427. \tag{30}$$

At column 2, lines 62-63, LaPointe says that dimension $H_{BACK}$=55.5", whence, from (30), $$F=2.37''=60 \text{ mm}, \tag{31}$$

which is only slightly in violation of requirement (24). At best, LaPointe's allowance for posterior foot placement is only minimally acceptable. Nevertheless, a lifter assembly without a front cross member such as LaPointe's 39 would be superior, because it would rule out any possibility of interference with posterior foot placement.

LaPointe's retrofit further suffers from shortcoming (e), and to some extent from (b), as stated in column 3, lines 15-19: "The mechanism to be described nests inside of the wooden frame member and the bottom of the chair 3 and . . . the assembly 1 is of low profile and increases the seat height by only about 2 inches." That is, LaPointe tries to minimize shortcoming (b), achieving $R_{SIT}$=2 inches (and thus barely satisfying requirement (19)), but he does so by introducing shortcoming (e), assuming unrealistically, as shown in his FIG. 6 (FIG. 7 herein), that his mechanism can protrude into space beneath the chair's seat. Although this assumption was apparently valid for the particular type of chair he was considering, as described (per LaPointe) in U.S. Pat. No. 4,367, 895, it is not valid for most chairs, particularly popular modern recliners, whose internal mechanisms already fill this space. Consequently, LaPointe's retrofit can only be used with a very limited subset of chairs.

Finally, LaPointe's retrofit suffers from shortcoming (f), not only because it requires modification of the chair, as already mentioned, but also because it is a monolithic structure which is likely to be too heavy and cumbersome to be easily moved and stored.

Specific Prior Art: Rudes et al. (U.S. Pat. No. 5,294,179) (FIGS. 8 through 10)

Rudes's chair-lifting retrofit suffers from shortcoming (a). Consider Rudes's FIGS. 1, 5, and 3, which are reproduced here as FIGS. 8, 9, and 10 respectively, annotated to show $R_{SIT}$ on FIG. 9 and $R_{STAND}$ on FIG. 10. Scaling shows that $$\frac{R_{STAND}}{R_{SIT}} = 2.73 \text{ (Rudes),} \tag{32}$$

whence $$\Delta R = R_{SIT}\left(\frac{R_{STAND} - R_{SIT}}{R_{SIT}}\right) = R_{SIT}\left(\frac{R_{STAND}}{R_{SIT}} - 1\right) = 1.73 R_{SIT} \text{ (Rudes).} \tag{33}$$

At column 2, lines 27-37, Rudes states that "the present invention . . . [has] the advantage of an unusually compact lifting and tilting device with a retracted height of only about 4.5 inches." In other words, $$R_{SIT}=4.5''=114 \text{ mm (Rudes).} \tag{34}$$

Substituting equation (34) into equation (33), $$\Delta R=197 \text{ mm}=7.8'' \text{ (Rudes).} \tag{35}$$

This violates the requirement (18). Consequently, Rudes's retrofit provides insufficient sit-to-stand assistance for certain users.

Rudes's chair-lifting retrofit further suffers from shortcoming (b) as revealed by the same passage just cited, at column 2, lines 27-37, which is expressed as equation (34). Although Rudes describes his seat-height overhead of 4.5 inches as "unusually compact", this overhead is actually very large, being seriously in violation of requirement (19). Consequently, Rudes retrofit will produce great discomfort while the user is sitting.

Regarding shortcoming (c), Rudes does not show clearly the fore-to-aft placement of the chair upon the retrofit. Consequently, it is hard to access whether Rudes's retrofit suffers from shortcoming (c); that is, whether it violates requirement (24) and thus interferes with posterior foot placement by the user. FIGS. 8-10 certainly suggests that it will violate requirement (24), inasmuch as the frontal support bar 36 (identified in FIG. 10) extends at floor level across the entire width of the retrofit, and this frontal support bar lies forward of the frontal portion 24 of the platform. In FIG. 10, reference numeral 19 is "the bottommost part of the chair frame", but it is unclear from this drawing where the front of the chair's seat is located vis-à-vis the frontal portion 24 of the platform. In any case, a lifting apparatus without such a floor-level frontal bar 36 would be superior, because it would rule out any interference with posterior foot placement.

Rudes's retrofit further suffers from shortcoming (d), in that it causes the chair to tilt forward, and, as previously mentioned, a retrofit providing forward tilting requires, for safety reasons, means to secure the chair to the retrofit. This makes it highly unlikely that such a retrofit can be universally adapted to a wide variety of chairs. Indeed, although Rudes contends, in column 1, lines 45-46, that his retrofit is "universal adaptable to most previously manufactured chairs", the scheme he actually describes is hardly universally adaptable. That is, at column 4, lines 4-8, he states that "The peripheral edge of the bottommost part of chair frame 19 [FIG. 10 herein], shown in partial view by broken lines, is bolted to platform 16 through multiple mounting flanges 20 having expanded openings 22 for threaded connectors". This is not adaptable, for example, to chairs with four legs rather than a base frame. Nor is it adaptable to rocker-style recliners with round bases. Even upholstered chairs with rectangular base frames—the type of chair Rudes attempts to accommodate—are unlikely to have frame members that line up with the "expanded openings" of a particular platform design; to accommodate the large number of base-frame sizes in the marketplace, many platform variations would have to be manufactured. Thus, much custom engineering and expense is required to adapt Rudes retrofit to a wide variety of chairs, thereby compromising its general usefulness. Moreover, even if a chair happens to accommodate Rudes attachment scheme, alteration of the chair itself is still required, in the form of the "threaded connectors" that must be driven into the wooden frame of the chair. This is undesirable; it is preferable not to alter the chair at all.

Finally, Rudes's retrofit suffers from shortcoming (f), not only because it requires modification of the chair, as just mentioned, but also because it is a monolithic structure that is likely to be too heavy and cumbersome to be easily moved and stored.

2. SUMMARY

In accordance with one or more embodiments, a lifting apparatus is described for raising and lowering a payload along an imaginary z axis of an imaginary, right-handed Cartesian xyz coordinate system comprising an imaginary x axis defining a +x direction and a −x direction, an imaginary y axis defining a +y direction and a −y direction, and the imaginary z axis defining a +z direction and a −z direction, these axes also defining an imaginary xy plane spanned by the x and y axes, in which context the lifting apparatus comprises:

a. a platform whose projection upon the xy plane is substantially rectangular, the platform comprising a substantially planar platform top surface facing the +z direction upon which the payload is placed, a left platform portion near a +x edge of the platform that is also known as the left edge, a right platform portion near a −x edge of the platform that is also known as the right edge, a front platform portion near a −y edge of the platform that is also known as the front edge, and a rear platform portion near a +y edge of the platform that is also known as the rear edge;

b. a left lifter assembly comprising a left base member that rests on a reference surface such as a floor that is substantially parallel to the xy plane, a left lifting member affixed to the left platform portion, and a left actuator capable of raising and lowering the left lifting member with respect to the left base member, c. a right lifter assembly comprising a right base member that rests on the reference surface, a right lifting member affixed to the right platform portion, and a right actuator capable of raising and lowering the right lifting member with respect to the right base member, d. power means capable of powering both the left actuator and the right actuator, the left actuator receiving either Forward Power to raise the left platform portion toward +z, or Reverse Power to lower the left platform portion toward −z, or No Power to leave the left platform portion stationary, and similarly, the right actuator receiving either Forward Power to raise the right platform portion toward +z, or Reverse Power to lower the right platform portion toward −z, or No Power to leave the right platform portion stationary;

e. control means capable of issuing commands denoted Extend, Retract, and Off, these commands causing a delivery of either Forward Power, Reverse Power, or No Power, respectively, to the left and right actuators simultaneously, whereby both the left and right lifting members, as well as the platform affixed thereto, execute a motion in the z direction, either ascending substantially in unison toward +z, descending substantially in unison toward −z, or remaining stationary, in accordance with the Extend, Retract, and Off commands, respectively, such that a distance R from the reference surface to a representative point on the front edge may be increased or decreased, in a substantially continuous fashion, between a minimum value $R_{SIT}$ defining a low position of the lifting apparatus and a maximum value $R_{STAND}$ defining a high position of the lifting apparatus.

In one or more embodiments, for example, the payload is a seating device, hereafter referred to as a "chair", as well as a person using it, hereafter referred to as "the user", the chair comprising a seat upon which the user sits, and each of the two lifter assemblies comprises a hex-plus-X linkage as described in co-pending patent application Ser. No. 13/668,340 by me, Shawn Anthony Hall, entitled "Mechanical Linkage for Lifting", which is included herein in its entirety by reference, and which is subsequently referred to as "Hall (2012)".

In one or more of such embodiments, for example, including a prototype embodiment that is reduced to practice as a working model, the two lifter assemblies and the platform suspended therebetween are designed so that $$R_{SIT} \approx 12 \text{ mm} \approx 0.47; R_{STAND} \approx 255 \text{ mm} \approx 10.04'', \quad (36)$$

whereby the distance in the z direction from the floor to the platform top surface may be modulated by an amount $$\Delta R = R_{STAND} - R_{SIT} \approx 243 \text{ mm} \approx 9.57'', \quad (37)$$

and consequently a distance H in the z direction from the floor to the seat is likewise modulated by an amount $$\Delta H = \Delta R \approx 243 \text{ mm} \approx 9.57''. \quad (38)$$

Because modulation ΔH of seat height H is bidirectional, a user may use the apparatus not only to increase H from a low value to a high value while standing up, but also to decrease H from a high value to a low value while sitting down.

None of the specific values stated in equations (36) through (38), nor the example payload stated above (chair plus user), nor the example linkage stated above (hex-plus-X) are meant to be limiting; these merely exemplify one or more aspects of certain embodiments. Moreover, although the embodiments described herein do not produce forward tilting the platform, about the x axis, the description above includes this possibility; the lifter assemblies may be designed to produce such tilting if desired.

Because the lifting apparatus uses two actuators, the possibility that one actuator may fail while the other keeps working must be considered. If unaddressed, this eventuality could lead to a large, dangerous sideways tilt of the chair. Referring to the previously mentioned Cartesian coordinate system, this sideways tilt, which is rotation about the y axis, should not be confused with the forward tilt referred to in Section 1, which is rotation about the x axis. To prevent dangerous sideways tilt, in accordance with one or more embodiments, a tilt-correcting lifting apparatus is described comprising:

a. a platform whose projection upon the xy plane is substantially rectangular, the platform comprising a substantially planar platform top surface facing the +z direction upon which the payload is placed, a left platform portion near a +x edge of the platform that is also known as a left edge, a right platform portion near a −x edge of the platform that is also known as a right edge, a front platform portion near a −y edge of the platform that is also known as a front edge, and a rear platform portion near a +y edge of the platform that is also known as a rear edge;

b. a left lifter assembly comprising a left base member that rests on a reference surface such as a floor that is substantially parallel to the xy plane, a left lifting member affixed to the left platform portion, and a left actuator denoted LA that is capable of raising and lowering the left lifting member with respect to the left base member;

c. a right lifter assembly comprising a right base member that rests on the reference surface, a right lifting member affixed to the right platform portion, and a right actuator denoted RA that is capable of raising and lowering the right lifting member with respect to the right base member;

d. power means capable of powering both the left actuator LA and the right actuator RA, the left actuator receiving either Forward Power to raise the left platform portion toward +z, or Reverse Power to lower the left platform portion toward −z, or No Power to leave the left platform portion stationary, and similarly, the right actuator receiving either Forward Power to raise the right platform portion toward +z, or Reverse Power to lower the right platform portion toward −z, or No Power to leave the right platform portion stationary;

e. control means capable of asserting commands denoted Extend, Retract, and Off, the Extend command requesting that the left and right platform portions be raised in unison toward +z, the Retract command requesting that the left and right platform portions be lowered in unison toward −z, and the Off command requesting that the left and right platform portions both remain stationary, the control means thereby defining a command status having the value of Extend, Retract, or Off, respectively;

f. tilt-sensing means capable of detecting sideways rotation of the platform, about the y axis, and asserting either CW Tilt, or CCW Tilt, or No Tilt, wherein CW Tilt is asserted if the tilt-sensing means detects a clockwise tilt of the platform about the y axis beyond a pre-determined tilt-angle threshold defined with respect to the xy plane, implying that the left edge of the platform is substantially further toward +z than is the right edge of the platform; CCW Tilt is asserted if the tilt-sensing means detects a counterclockwise tilt of the platform about the y axis beyond the tilt threshold, implying that the right edge of the platform is substantially further toward +z than is the left edge of the platform; and No Tilt is asserted if the tilt sensor detects that the platform is substantially parallel to the xy plane with respect to rotation about the y axis; the tilt-sensing means thereby defining a tilt status having the value of CW Tilt, CCW Tilt, or No Tilt, respectively;

g. tilt-correction means that, depending on the command status and the tilt status, cause power to be applied to the left and right actuators according to an algorithm defined as follows: first, if the command status is Off, supply No Power to both LA and RA regardless of the tilt status; second, if the tilt status is No Tilt and the command status is Extend, supply Forward Power to both LA and RA; third, if the tilt status is No Tilt and the command status is Retract, supply Reverse Power to both LA and RA; fourth, if the tilt status is CW Tilt and the command status is Extend, supply Forward Power to RA and No Power to LA; fifth, if the tilt status is CW Tilt and the command status is Retract, supply Reverse Power to LA and No Power to RA; sixth, if the tilt status is CCW Tilt and the command status is Extend, supply Forward Power to LA and No Power to RA; and seventh, if the tilt status is CCW Tilt and the command status is Retract, supply Reverse Power to RA and No Power to LA;

whereby the apparatus always remains stationary when Off is asserted, but otherwise exhibits either a normal behavior when the tilt status is No Tilt, or a tilted behavior otherwise, where the normal behavior comprises powering both actuators in unison, applying Forward Power to both actuators when Extend is asserted or applying Reverse Power to both actuators when Retract is asserted, thereby allowing a motion of the platform in the z direction wherein a distance R from the reference surface to a representative point on the front edge is increased or decreased, respectively, in a substantially continuous fashion, between a minimum value $R_{SIT}$ defining a low position of the lifting apparatus and a maximum value $R_{STAND}$ defining a high position of the lifting apparatus, with the front edge of the platform remaining substantially parallel to the xy plane throughout the motion, whereas the tilted behavior comprises powering only one of the two actuators when Extend or Retract is asserted, in order to eliminate a clockwise or counterclockwise tilt of the platform about the y axis beyond a predetermined threshold, as represented by the assertion of CW Tilt or CCW Tilt, respectively, thereby to eliminate the tilt and to re-establish approximate parallelism between the platform top surface and the reference surface, whereupon, if both actuators remain capable of the normal behavior, such behavior is immediately and seamlessly resumed, or, if either actuator is not capable thereof, excessive tilt beyond the tilt threshold, both clockwise and counterclockwise, is prevented.

3. ADVANTAGES

Accordingly, when the lifting apparatus is employed as a chair lifter retrofitted to an existing chair or other seating device, several advantages of one or more aspects are as follows; these advantages address item-for-item the prior-art shortcomings (a) through (f) described in Section 1:

(a) In the high position, the important part of the chair seat—the front, as explained in Section 1 above—is raised by an amount sufficient to allow even a demanding user to accomplish the sit-to-stand task. For example, in the prototype embodiment, the chair seat is lifted by $\Delta H \approx 243$ mm, as stated in equation (38). This more than satisfies the requirement expressed by equation (18), namely $\Delta H \geq 229$ mm. Consequently, unlike all prior-art retrofittable chair lifters known, the lifting apparatus provides adequate seat rise $\Delta H$ even for demanding users.

(b) In the low position, where the user of the chair must sit for extended periods, the lifter assembly produces a seat height that is only slightly higher than normal, by an amount $R_{SIT} \approx 11$ mm. This far surpasses the requirement expressed by equation (19), namely $R_{SIT} \leq 50$ mm, and approaches the ideal value, $R_{SIT}=0$. Consequently, unlike all prior-art retrofittable chair lifters known—except for those that side-step the issue by introducing shortcoming (e), thereby ruling out applicability to many existing chairs—the lifting apparatus described herein causes no sitting discomfort because $R_{SIT}$ is so small. Not only are the user's feet fully supported on the floor, but the seated height is imperceptibly different from that of the un-retrofitted chair—almost as if the lifting apparatus were absent.

(c) In the high position, no element of the lifting apparatus prevents the user's feet from moving rearward, which is important for standing as explained in Section 1. This advantage accrues because the first and second lifter assemblies are, in typical embodiments, located to the left and right of the chair rather than under the chair as in prior art. Consequently, in the high position, unlike all prior-art retrofittable chair lifters known, no element of the apparatus crosses from left to right at or near floor level, so the user is free to place his or her feet posteriorly as much as desired.

(d) The lifting apparatus is universally retrofittable to all types of chairs, because the chair is simply placed on the platform. The top surface of the platform is substantially planar, so it acts as a surrogate floor. Chairs that are very wide may require a wider platform, but that is all; no additional, chair-specific engineering is necessary. Because the lifting apparatus does not cause the chair to tilt, the chair does not have to be secured to the platform, so again, no chair-specific engineering is required; at most, shifting of the chair on the platform in the y direction may be eliminated by simple adhesive pads affixed to the platform. The chair is not altered in any way.

(e) The lifting apparatus does not use any space between the base of the chair and the seat, because the platform on which the chair rests is substantially flat over the entire footprint of the chair. Nothing projects upward from it; it is a surrogate floor.

(f) The lifting apparatus is easily deployable, movable and storable, for two reasons. First, it does not require any attachment to the chair or modification thereof. Second, it separates into a few relatively light, manageable pieces that may be easily move and stored.

Other advantages of one or more aspects will be apparent from a consideration of the drawings and the ensuing description.

4. BRIEF DESCRIPTION OF THE DRAWINGS

FIG. 1 illustrates a perspective view of a prior-art, retrofittable chair-lifting device described by Crockett, together with a chair.

FIG. 2 illustrates a side view of the prior-art, retrofittable chair-lifting device described by Crockett, shown in a high position.

FIG. 3 illustrates a side view of the prior-art, retrofittable chair-lifting device described by Crockett, shown in a low position.

FIG. 6 illustrates a perspective view of the prior-art, retrofittable chair-lifting device described by LaPointe, shown in the high position.

FIG. 7 illustrates a vertical section through the prior-art, retrofittable chair-lifting device described by LaPointe, shown in the low position, together with the chair.

FIG. 8 illustrates a perspective view of a prior-art, retrofittable chair-lifting device described by Rudes et al., shown in a high position, together with the chair.

FIG. 9 illustrates a side view of the prior-art, retrofittable chair-lifting device described by Rudes et al., shown in a low position.

FIG. 10 illustrates a side view of the prior-art, retrofittable chair-lifting device described by Rudes et al., shown in the high position.

FIG. 20 illustrates an exploded view of a shroud assembly 1706.

FIG. 21A illustrates a top perspective view of a switch-tunnel assembly 1708.

FIG. 21B illustrates a bottom perspective view of the switch-tunnel assembly 1708.

FIG. 22A illustrates an exploded view of the left lifter assembly 1108, comprising the left linkage assembly 1702 shown in the high position.

FIG. 22B illustrates an exploded view of a right lifter assembly 1110, comprising a right linkage assembly 2202 shown in a high position.

FIG. 25A illustrates an exterior perspective view of an electronics assembly 2402.

FIG. 25B illustrates an interior perspective view of the electronics assembly 2402.

FIG. 36A is an electrical schematic diagram for a first case denoted "(No Tilt, Off)".

FIG. 36B is an electrical schematic diagram for a second case denoted "(No Tilt, Extend)".

FIG. 36C is an electrical schematic diagram for a third case denoted "(No Tilt, Retract)".

FIG. 36D is an electrical schematic diagram for a fourth case denoted "(CW Tilt, Off)".

FIG. 36E is an electrical schematic diagram for a fifth case denoted "(CW Tilt, Extend)".

FIG. 36F is an electrical schematic diagram for a sixth case denoted "(CW Tilt, Retract)".

FIG. 36G is an electrical schematic diagram for a seventh case denoted "(CCW Tilt, Off)".

FIG. 36H is an electrical schematic diagram for a eighth case denoted "(CCW Tilt, Extend)".

FIG. 36I is an electrical schematic diagram for a ninth case denoted "(CCW Tilt, Retract)".

FIG. 37 is a table summarizing the nine cases shown in FIGS. 36A through 36I.

Figure 4:
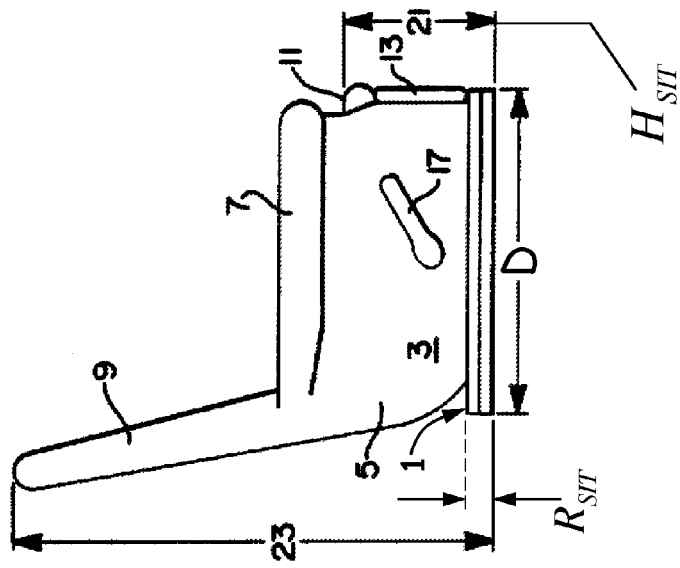
FIG. 4 illustrates a side view of a prior-art, retrofittable chair-lifting device described by LaPointe, shown in a high position, together with the chair.
Figure 5:
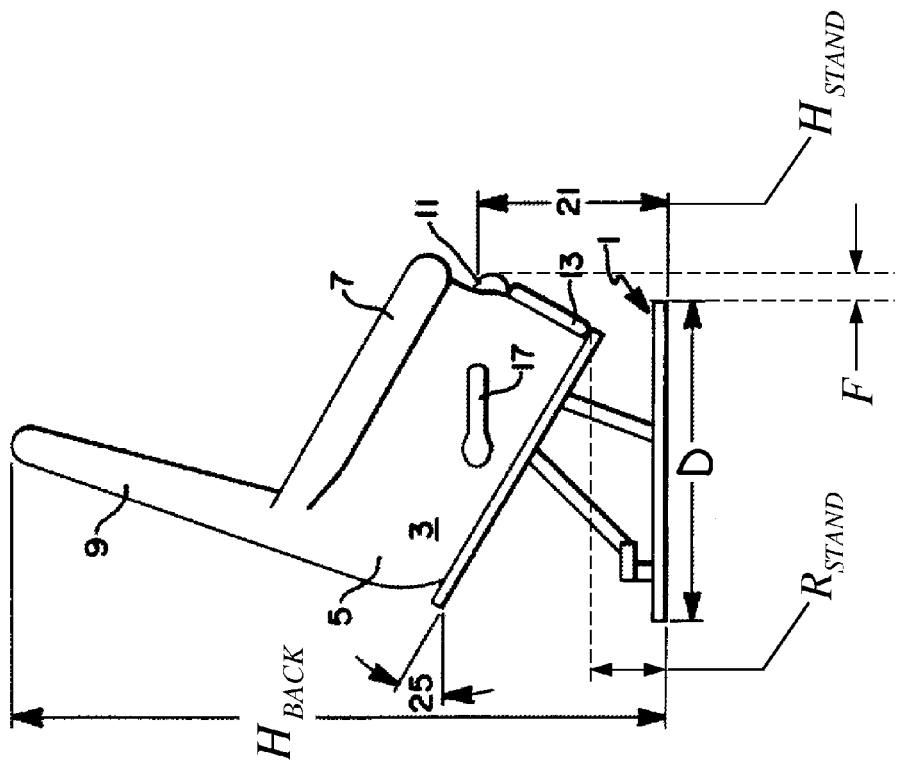
FIG. 5 illustrates a side view of the prior-art, retrofittable chair-lifting device described by LaPointe, shown in a low position, together with the chair.

5. REFERENCE NUMERALS FOR FIGS. 11 through 39

1100 Lifting apparatus
1102 Chair
1104 Reference surface, typically a floor
1106 Platform assembly
1108 Left lifter assembly
1110 Right lifter assembly
1112 Rear assembly
1114 Coordinate system
1602 Platform
1604 Base flange of platform 1602
1606 Top surface of base flange 1604
1608 Left flange of platform 1602
1610 Right flange of platform 1602
1612 Front flange of platform 1602
1614 Rear flange of platform 1602
1616 Fasteners for left flange 1608 of platform 1602
1618 Clearance holes in left flange 1608 of platform 1602
1620 Fasteners for right flange 1610 of platform 1602
1622 Clearance hole in right flange 1610 of platform 1602
1702 Left linkage assembly
1704 Z-plate assembly
1704L Left instance of the Z-plate assembly 1704
1704R Right instance of the Z-plate assembly 1704
1706 Shroud assembly
1706L Left instance of the shroud assembly 1706
1706R Right instance of the shroud assembly 1706
1708 Switch-tunnel assembly
1708L Left instance of the switch-tunnel assembly 1708
1708R Right instance of the switch-tunnel assembly 1708
1710 Fasteners attaching the Z-plate assembly 1704 to the linkage assembly 1702
1712 Fasteners attaching the shroud assembly 1706 to the Z-plate assembly 1704
1714 Fasteners attaching the switch-tunnel assembly 1708 to the shroud assembly 1706
1716 Cutout in shroud for electrical connector 1808
1716L Instance of cutout 1716 in shroud used for left lifter assembly
1716R Instance of cutout 1716 in shroud used for right lifter assembly
1718 Standoffs in shroud assembly 1706
B1 Lower bar of linkage assembly 1702
B2 First lower V-bar of linkage assembly 1704
B3 First upper V-bar of linkage assembly 1704
B4 Top bar of linkage assembly 1704
B5 Second upper V-bar of linkage assembly 1704
B6 Second lower V-bar of linkage assembly 1704

B7 First X bar of linkage assembly 1704
B8 Second X bar of linkage assembly 1704
B9 Third X bar of linkage assembly 1704
B10 Fourth X bar of linkage assembly 1704
J1 Rotating joint at intersection of bars B1 and B2
J2 Rotating joint at intersection of bars B2 and B3
J3 Rotating joint at intersection of bars B3 and B4
J4 Rotating joint at intersection of bars B4 and B5
J5 Rotating joint at intersection of bars B5 and B6
J6 Rotating joint at intersection of bars B6 and B1
J7 Rotating joint at intersection of bars B1 and B7 and B9
J8 Rotating joint at intersection of bars B4 and B8 and B10
J9 Rotating-and-sliding joint at intersection of bars B4 and B7 and B9
J10 Rotating-and-sliding joint at intersection of bars B1 and B8 and B10
J11 Rotating joint at intersection of bars B7 and B8
J12 Rotating joint at intersection of bars B9 and B10
1800 Linear actuator
1800L Instance of linear actuator 1800 in left linkage assembly
1800R Instance of linear actuator 1800 in right linkage assembly
1801 Piston of linear actuator 1800
1802 Slot in bars B1 and B4
1804 Wear-resistant U-channels
1806 Actuator cable
1806L Instance of actuator cable 1806 in left linkage assembly
1806R Instance of actuator cable 1806 in right linkage assembly
1808 Electrical connector terminating actuator cable 1806
1808L Instance of connector 1808 in left linkage assembly
1808R Instance of connector 1808 in right linkage assembly
1810 Mating fasteners for fasteners 1710
1812 Mating fasteners for fasteners 1712
1902 Z-plate
1904 Pull handle
1906 Pull-handle fastener
1908 First horizontal flange of Z-plate 1902
1910 Vertical flange of Z-plate 1902
1912 Second horizontal flange of Z-plate 1902
1914 Clearance holes in second horizontal flange 1912 for fasteners 1710
1916 Cutouts for pull handles 1904
1918 Mating fasteners for attaching Z-plate 1902 to platform 1602
1920 Clearance holes for shroud-to-linkage fasteners 1712
1922 Head-clearance holes for fasteners 2004
2002 Shroud
2004 Fasteners for standoffs 1718
2006 Main flange of shroud 2002
2008 Top flange of shroud 2002
2010 Rear flange of shroud 2002
2012 Front flange of shroud 2002
2014 Head-clearance holes for fasteners 1710
2016 Cutout for electrical connector 2206 (used for right lifter assembly)
2018 Holes for attachment of rear assembly (used for left lifter assembly)
2020 Holes for attachment of rear assembly (used for right lifter assembly)
2102 Switch tunnel
2104 Double-pole, three-throw switch
2104L Instance of switch 2104 used in left lifter assembly
2104R Instance of switch 2104 used in right lifter assembly
2106 Switch-tunnel connector
2106L Instance of switch-tunnel connector in left lifter assembly
2106R Instance of switch-tunnel connector in right lifter assembly
2108 Switch-tunnel cable
2110 Fasteners to attach switch-tunnel assembly to standoffs 1718
2112 Carrying handle
2114 Fasteners for carrying handle 2112
2116 Main flange of switch tunnel 2102
2118 First side flange of switch tunnel 2102
2120 Second side flange of switch tunnel 2102
2122 First end flange of switch tunnel 2102
2124 Second end flange of switch tunnel 2102
2202 Right linkage assembly
2204 Actuator-extension cable
2206 Connector terminating one end of actuator-extension cable 2204
2302 Connector terminating the other end of actuator-extension cable 2204, mating with connector 1808R
2304 Cable tie-down device
2402 Electronics assembly
2404 Rear strut
2406 Electronics-to-left-actuator cable assembly
2408 Electronics-to-left-switch cable assembly
2410 Electronics-to-right-switch cable assembly
2412 Electronics-to-right-actuator cable assembly
2414 Connector terminating a first end of cable assembly 2406
2416 Connector terminating a second end of cable assembly 2406
2418 Connector terminating a first end of cable assembly 2408
2420 Connector terminating a second end of cable assembly 2408
2422 Connector terminating a first end of cable assembly 2410
2424 Connector terminating a second end of cable assembly 2410
2426 Connector terminating a first end of cable assembly 2412
2428 Connector terminating a second end of cable assembly 2412
2430 Fasteners for attaching the rear assembly 1112 to the left and right lifter assemblies 1108 and 1110
2432 Double, half-U cable tie down
2434 Pass-through cutout for connector 2416
2436 Pass-through cutout for connector 2428
2502 Chassis
2504 Line cord
2506 Main flange of chassis 2502
2508 Top flange of chassis 2502
2510 Left flange of chassis 2502
2512 Right flange of chassis 2502
2514 Bottom flange of chassis 2502
2516 Top mounting flange of chassis 2502
2518 Left mounting flange of chassis 2502
2520 Right mounting flange of chassis 2502
2522 Bottom mounting flange of chassis 2502
2524 Fasteners for mounting chassis 2502 to rear strut 2404
2526 Power inlet module
2528 Ground screw
2530 Fuse-and-fuse-holder assembly
2532 Power supply
2534 Line-voltage wiring
2536 printed-circuit-board (PCB) assembly
2537 PCB stand-off 2538 Power-supply-to-PCB cable
2540 PCB-to-left-actuator connector
2542 PCB-to-left-switch connector
2544 PCB-to-right-switch connector
2546 PCB-to-right-actuator connector
2548 Fan assembly
2550 Fan cable
2552 Cable tie-downs for fan cable 2550
2554 Air-inlet holes
2556 Fan
2558 External finger guard
2560 Internal finger guard
2562 Tilt sensor
2564 Cable from PCB to tilt-sensor
2566 First tilt-sensor programming connector
2568 Cable from tilt sensor to first programming connector
2570 Second tilt-sensor programming connector
2572 Cable from tilt sensor to second programming connector
2574 Hour meter
2576 Cable from PCB to hour meter
2578 First dummy connector
2580 Second dummy connector
2582 Third dummy connector
2584 Fourth dummy connector
2586 First shorting connector
2588 Second shorting connector
2590 Fifth dummy connector
2592 Double-half-U cable tie down for cables 2406, 2408, 2410, 2412
2600 Printed circuit board (PCB)
2602 First face of PCB
2604 Fasteners to attach PCB 2602 to chassis 2502
2606 Copper traces on first face 2602 of PCB
2608 Wide trace on first face 2602 of PCB, carrying 24VDC
2610 Wide trace on first face 2602 of PCB, carrying 24VDC
2702 Second face of PCB
2706 Copper traces on second face 2702 of PCB
2708 Wide trace on second face 2702 of PCB, carrying Gnd
2710 Wide trace on second face 2702 of PCB, carrying Gnd
2712 PCB connector to hour meter 2574
2714 PCB connector to tilt sensor 2562
2716 PCB connector to power supply 2532
2718 PCB connector to fan 2556
2720 Relay that responds to an assertion of CW Tilt
2722 Relay that responds to an assertion of Extend
2724 Relay that responds to an assertion of Retract
2726 Relay that responds to an assertion of CCW Tilt
2728 Diode
2730 First fuse
2732 Second fuse
2902 Dashed lines indicating attachment of left lifter assembly 1108 to platform assembly 1106
2904 Dashed lines indicating attachment of right lifter assembly 1110 to platform assembly 1106
2906 Dashed lines indicating attachment of rear assembly 1112 to left lifter assembly 1108
2908 Dashed lines indicating attachment of rear assembly 1112 to right lifter assembly 1110
3102 First side member of a base frame of the chair 1102
3104 Second side member of the base frame of the chair 1102
3106 First set of adhesive pads for preventing sliding of the chair 1102
3108 Second set of adhesive pads for preventing sliding of the chair 1102
3402 Point on an exemplary Lift-Time-vs.-Lift-Distance graph, at full lift, zero load
3404 Point on the Lift-Time-vs.-Lift-Distance graph, at full lift, full load
3406 Point on the Lift-Time-vs.-Lift-Distance graph, 40% lift, full load
3408 Point on the Lift-Time-vs.-Lift-Distance graph, 60% lift, full load
3410 Point on the Lift-Time-vs.-Lift-Distance graph, 80% lift, full load
3412 Point on the Lift-Time-vs.-Lift-Distance graph, full load, lift time=22 seconds
3414 Point on the Lift-Time-vs.-Lift-Distance graph, zero load, lift time=22 seconds
3602 Path shorting signal ExtL to signal ComL, for case (No Tilt, Extend)
3604 Path shorting signal ExtR to signal ComR, for case (No Tilt, Extend)
3606 Path shorting signal RetL to signal ComL, for case (No Tilt, Retract)
3608 Path shorting signal RetR to signal ComR, for case (No Tilt, Retract)
3610 Path shorting signal ExtR to signal ComR, for case (CW Tilt, Extend)
3612 Path shorting signal RetL to signal ComL, for case (CW Tilt, Retract)
3614 Path shorting signal ExtL to signal ComL, for case (CCW Tilt, Extend)
3616 Path shorting signal RetR to signal ComR, for case (CCW Tilt, Retract)
3800 Second embodiment of a lifter apparatus
3806 Monolithic platform assembly
3808 Modified left lifter assembly
3810 Modified right lifter assembly
3812 Monolithic platform
3814 Fasteners to attach the left horizontal flange 3824 of the monolithic platform to the modified left lifter assembly 3808
3816 Fasteners to attach the right horizontal flange 3824 of the monolithic platform to the modified right lifter assembly 3810
3818 Base flange of monolithic platform 3812
3820 Left vertical flange of monolithic platform 3812
3822 Right vertical flange of monolithic platform 3812
3824 Left horizontal flange of monolithic platform 3812
3826 Right horizontal flange of monolithic platform 3812
3828 Rear flange of monolithic platform 3812
3830 Front flange of monolithic platform 3812
3832 Slots in left and right horizontal flanges of monolithic platform 3812, for handles 2112
3834 Notches in left and right horizontal flanges of monolithic platform 3812, for switches 2104
3836 Modified switch-tunnel assembly
3836L Instance of 3836 used in modified left lifter assembly 3808
3836R Instance of 3836 used in modified right lifter assembly 3810
4000 Third embodiment of a lifter apparatus
4002 Chair with foot-rest
4004 Foot-rest
4004a Foot-rest in a first, stored position
4004b Foot rest in a second, deployed position
4006 Dotted lines showing foot-rest extension path

6. DETAILED DESCRIPTION OF FIRST EMBODIMENT

6.1 Top-Level-Assembly Views of the Lifting Apparatus 1100 (FIGS. 11-15)

Figure 11:
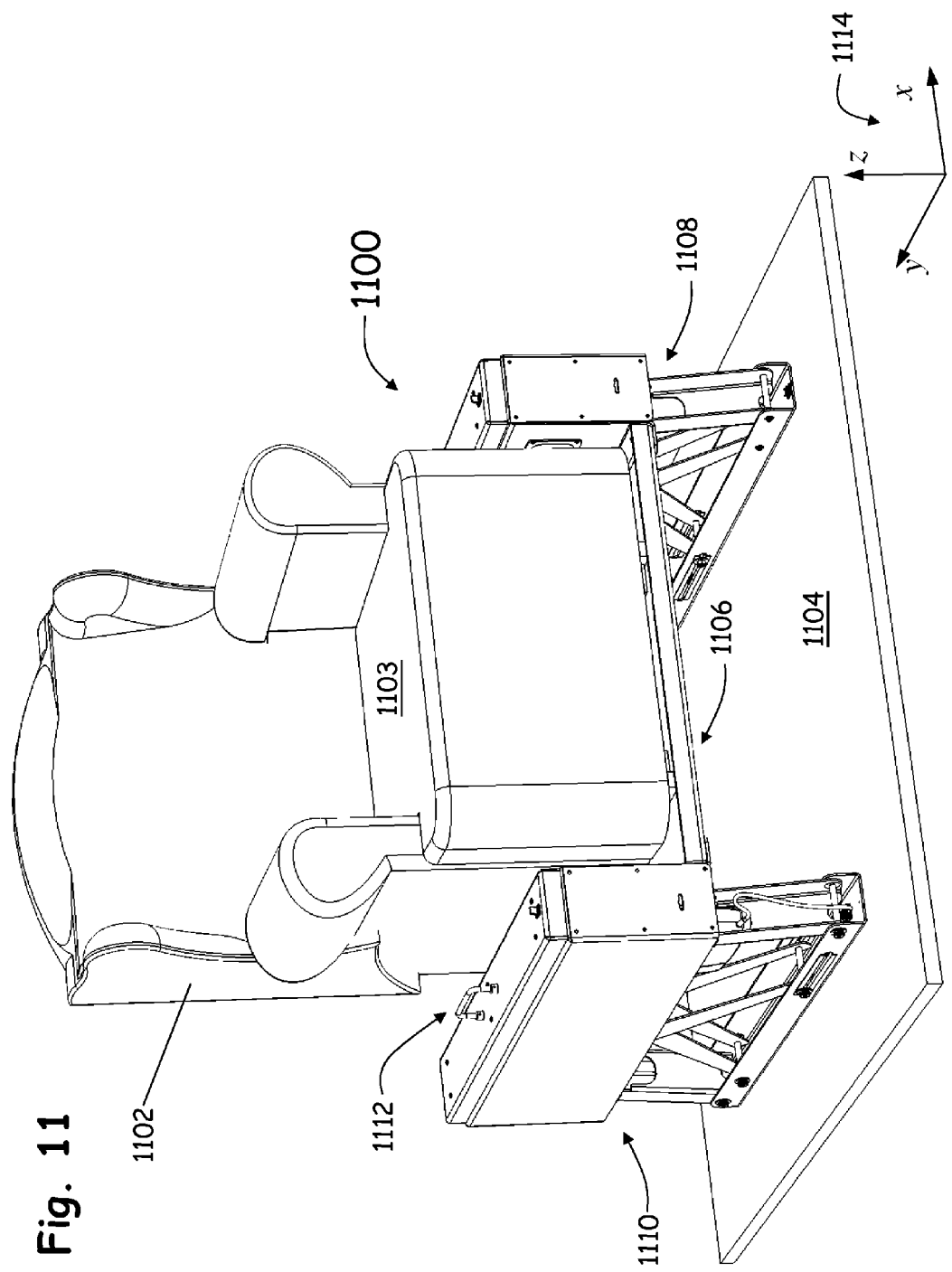
FIG. 11 illustrates a front perspective view of a lifter apparatus 1100 according to a first embodiment, shown resting on a floor 1104, and with a chair 1102 as payload.

FIG. 11 illustrates a first embodiment of a lifting apparatus 1100, together with a chair 1102 representing a payload that is lifted by the lifting apparatus from a low position to a high position with respect to a reference surface 1104, typically a floor, upon which the lifting apparatus rests. The chair has a seat surface 1103. The payload would typically comprise not only the chair 1102 but also a person using the chair, hereafter called "the user". Other types of payloads are possible, such as materiel. When the payload is a chair and its user, the low position of the apparatus is typically most comfortable for the user while sitting in the chair; the high position of the apparatus, illustrated in FIG. 11, is designed to help an infirm user to stand. After standing, the user may let the apparatus remain in the high position; when wishing to sit again, the user begins in the high position and proceeds to the low position. Thus, the lifting apparatus aids with both standing and sitting, although standing is typically the more difficult task.

In accordance with the first embodiment, the lifting apparatus comprises four main sub-assemblies:
- A platform assembly 1106
- A left lifter assembly 1108
- A right lifter assembly 1110
- A rear assembly 1112, where "left" and "right" are defined from the point of view of the user seated in the chair 1102. Because FIG. 11 shows the lifting apparatus in the high position, some internal structure of the lifter assemblies 1108 and 1110 are revealed. In FIG. 11, the rear assembly 1112 is obscured by the chair. FIG. 11 also shows, for reference, an imaginary, Cartesian xyz coordinate system 1114 comprising an x axis, a y axis and a z axis, all mutually orthogonal. The coordinate system 1114 defines an xy plane that is spanned by the x axis and the y axis, and which is substantially parallel to the floor 1104. Coordinate system 1114 will be shown on subsequent figures, sometimes with a floating origin, but always with consistent axis directions. Generally, the directions toward +z and −z will be referred to as "up" and "down" respectively or "high" and "low" respectively; the directions toward +x and −x will be referred to as "left" and "right" respectively (to agree with the user's perspective when sitting in the chair); and the directions toward +y and −y will be referred to as "rear" and "front" respectively.

Figure 12:
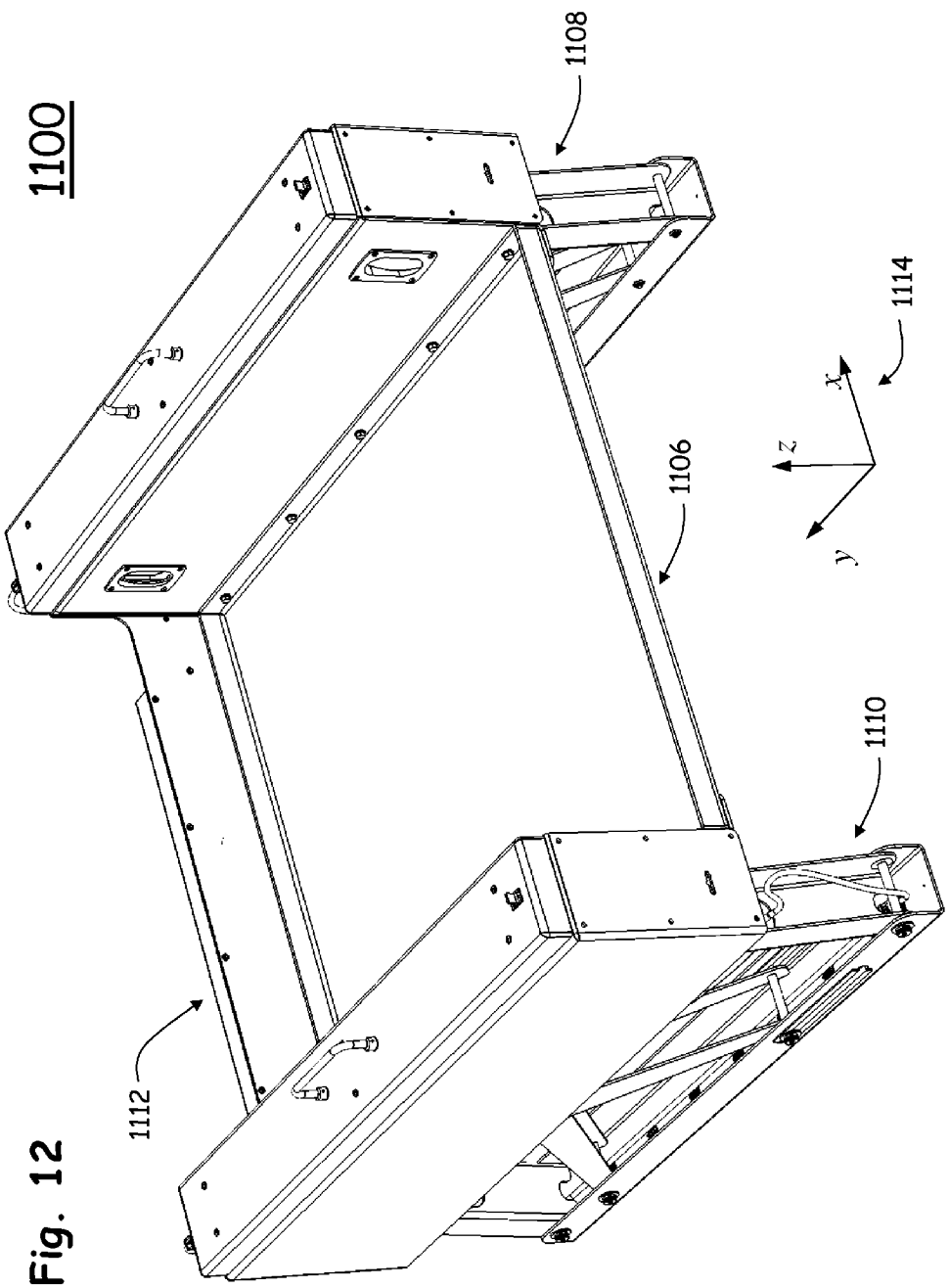
FIG. 12 illustrates a front perspective view of the lifter apparatus 1100.

FIG. 12 illustrates a front-perspective view of the lifting apparatus 1100 alone, with the chair 1102 and the floor 1104 hidden, and with the lifting apparatus in the high position. This view partially reveals the rear assembly 1112.

Figure 13:
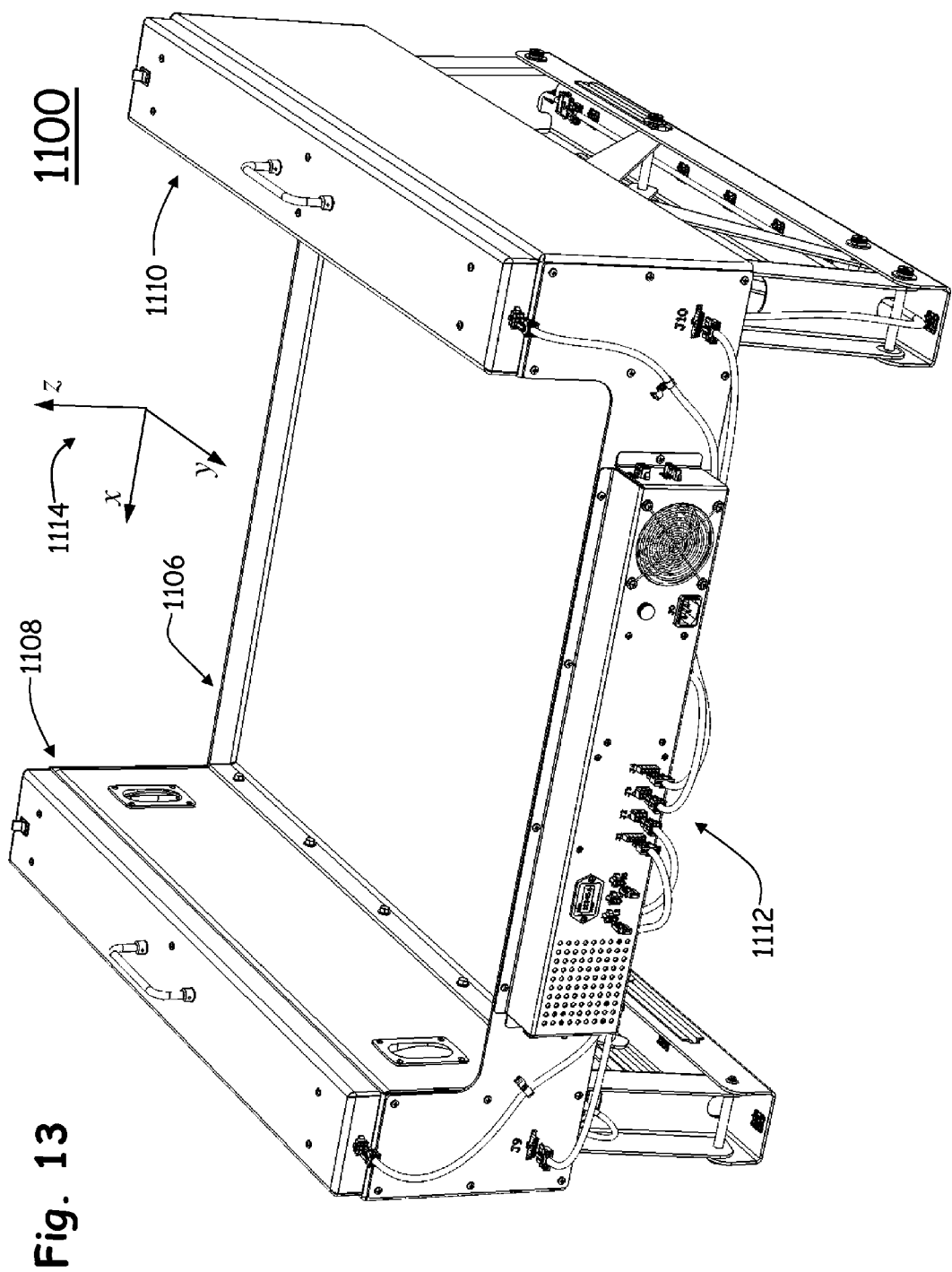
FIG. 13 illustrates a rear perspective view of the lifter apparatus 1100 in a high position.

FIG. 13 illustrates a rear-perspective view of the lifting apparatus 1100, with the lifting apparatus in the high position. This view more fully reveals certain details of the rear assembly 1110.

Figure 14:
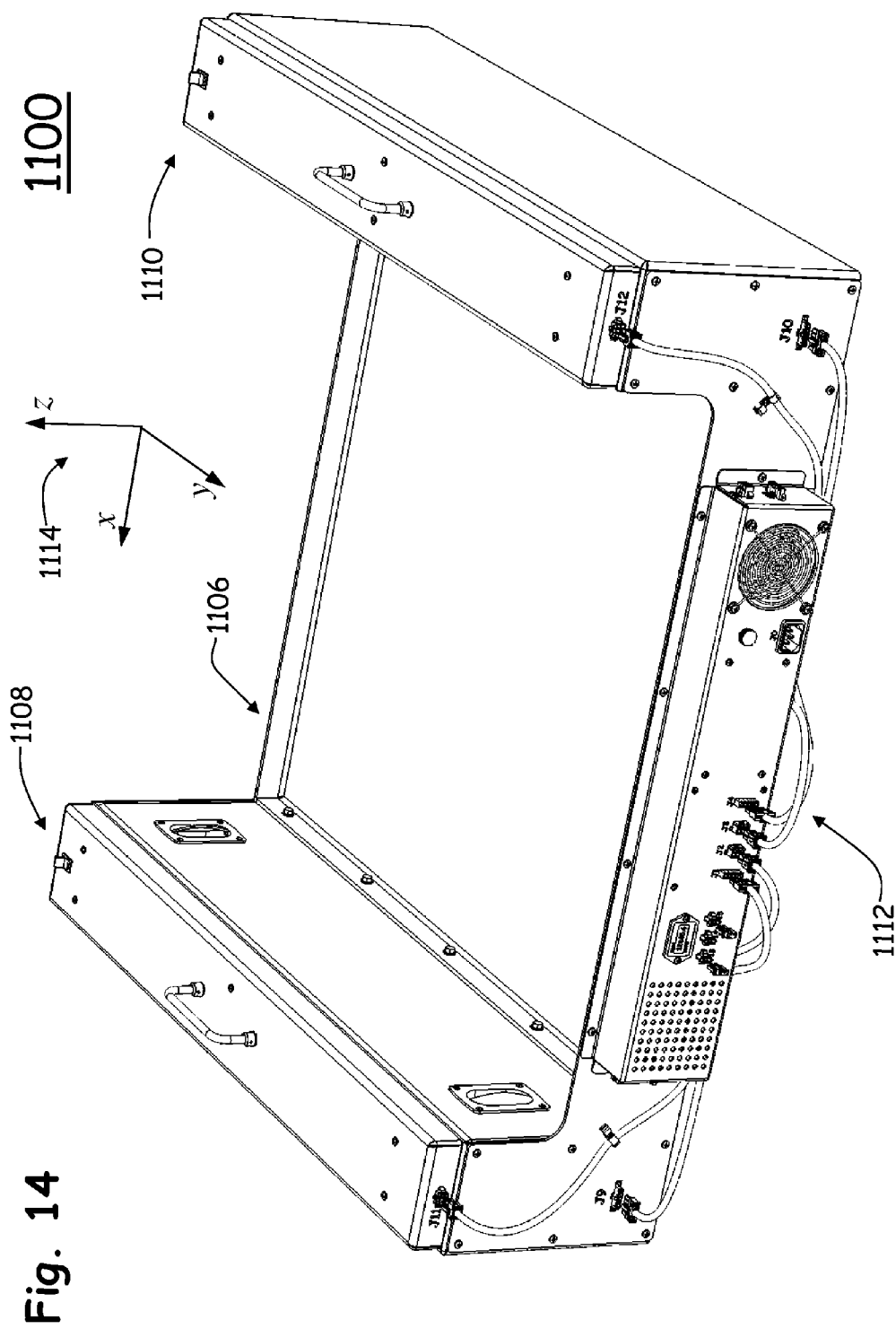
FIG. 14 illustrates a rear perspective view of the lifter apparatus 1100 in a low position.

FIG. 14 illustrates the same rear-perspective view as FIG. 13, but with the lifting apparatus in the low position.

Figure 15:
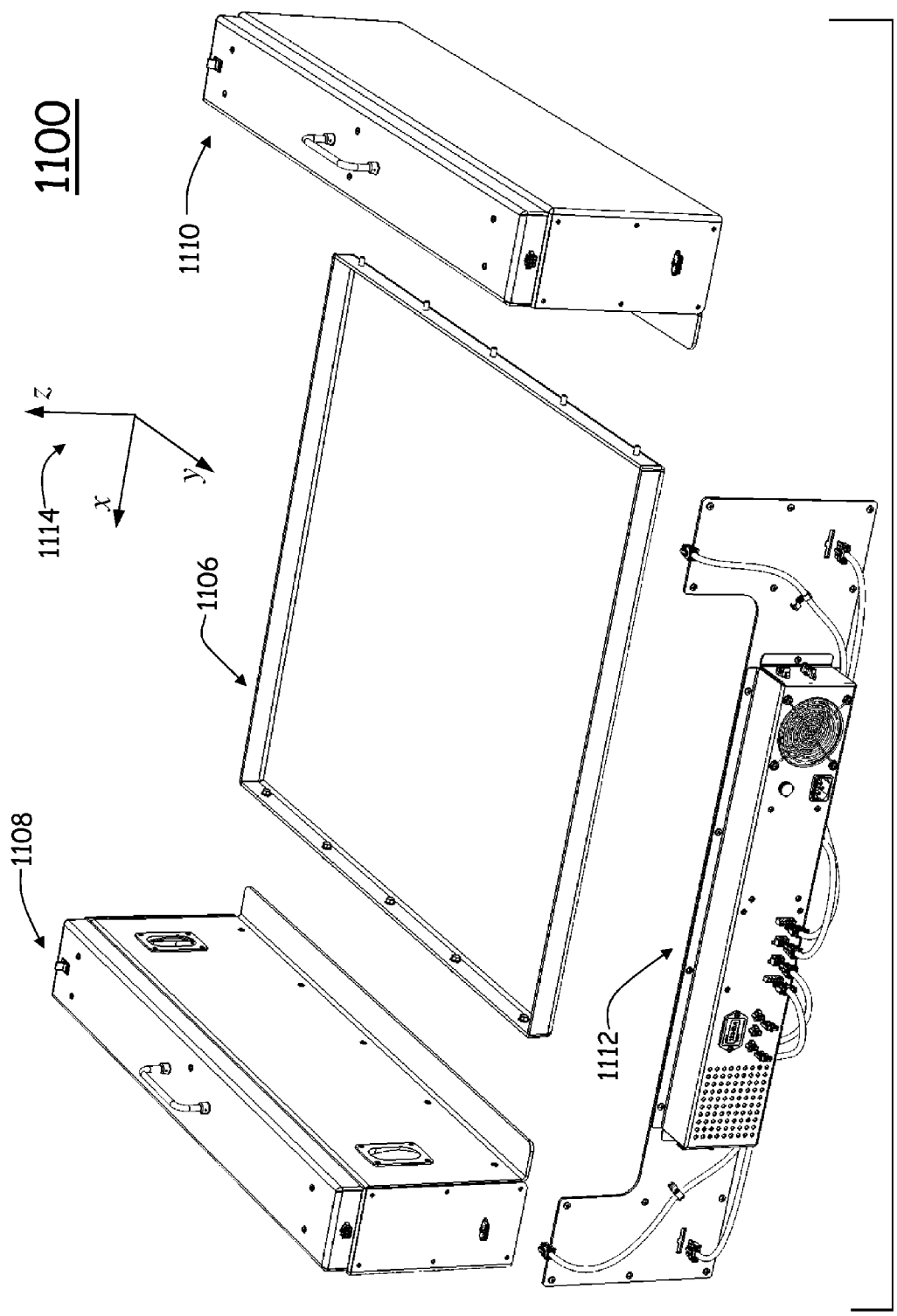
FIG. 15 illustrates a rear-perspective, exploded view of the lifter apparatus 1100.

FIG. 15 illustrates the lifting apparatus, in the low position, exploded into the four main subassemblies enumerated above in connection with FIG. 11; namely, the platform assembly 1106, the left lifter assembly 1108, the right lifter assembly 1110, and the rear assembly 1112. When the lifter assembly is deployed, these are the four entities that are assembled; when it is un-deployed, these are the entities that are disassembled. The assembly process is described in Section 7.1. Each of the main subassemblies is of manageable size and weight, thereby facilitating their deployment and transport.

The following sections describe each of the four main subassemblies in detail.

Figure 16:
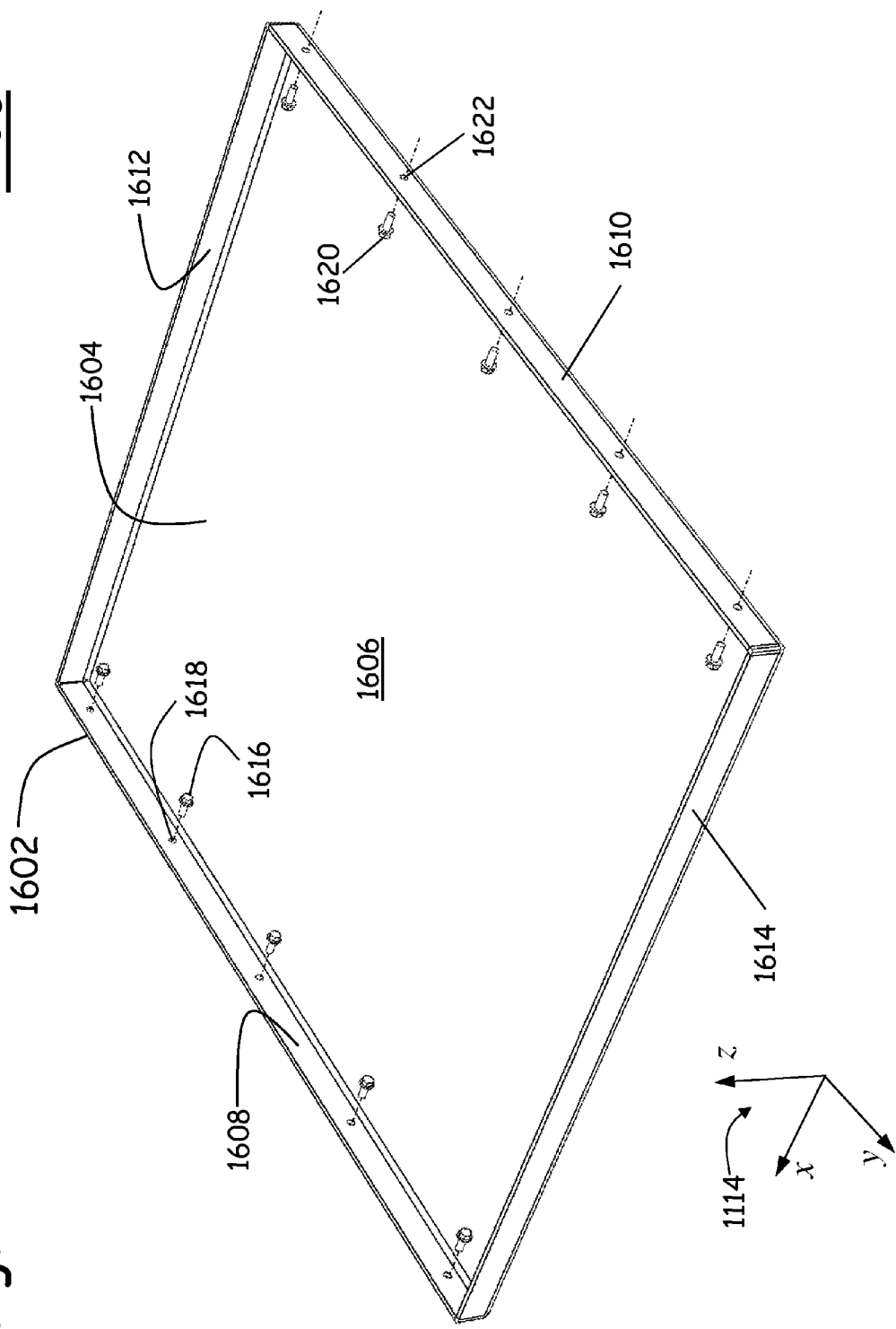
FIG. 16 illustrates an exploded view of a platform assembly 1106.

6.2 Platform Assembly 1106 (FIG. 16)

FIG. 16 is an exploded view of the platform assembly 1106, which comprises, according to the first embodiment, a platform 1602. The platform 1602 comprises a base flange 1604 having a top surface 1606, a left flange 1608, a right flange 1610, a front flange 1612, and a rear flange 1614. For example, the platform 1602 may be composed of sheet metal such as aluminum or steel, and the flanges 1608, 1610, 1612, and 1614 may be bent upward at a substantially 90-degree angle.

The platform assembly 1106 further comprises a plurality of fasteners 1616, for example threaded fasteners, that pass through a corresponding plurality of clearance holes 1618 in the left flange 1608 and engage suitable mating features in the left lifter assembly 1108. For example, if the fasteners 1616 are threaded, the mating features are holes with mating threads. Likewise, the platform assembly further comprises a plurality of right-side platform fasteners 1620 that pass through a corresponding plurality of clearance holes 1622 in the right flange 1610 and engage mating features in the right lifter assembly 1110.

Figure 17:
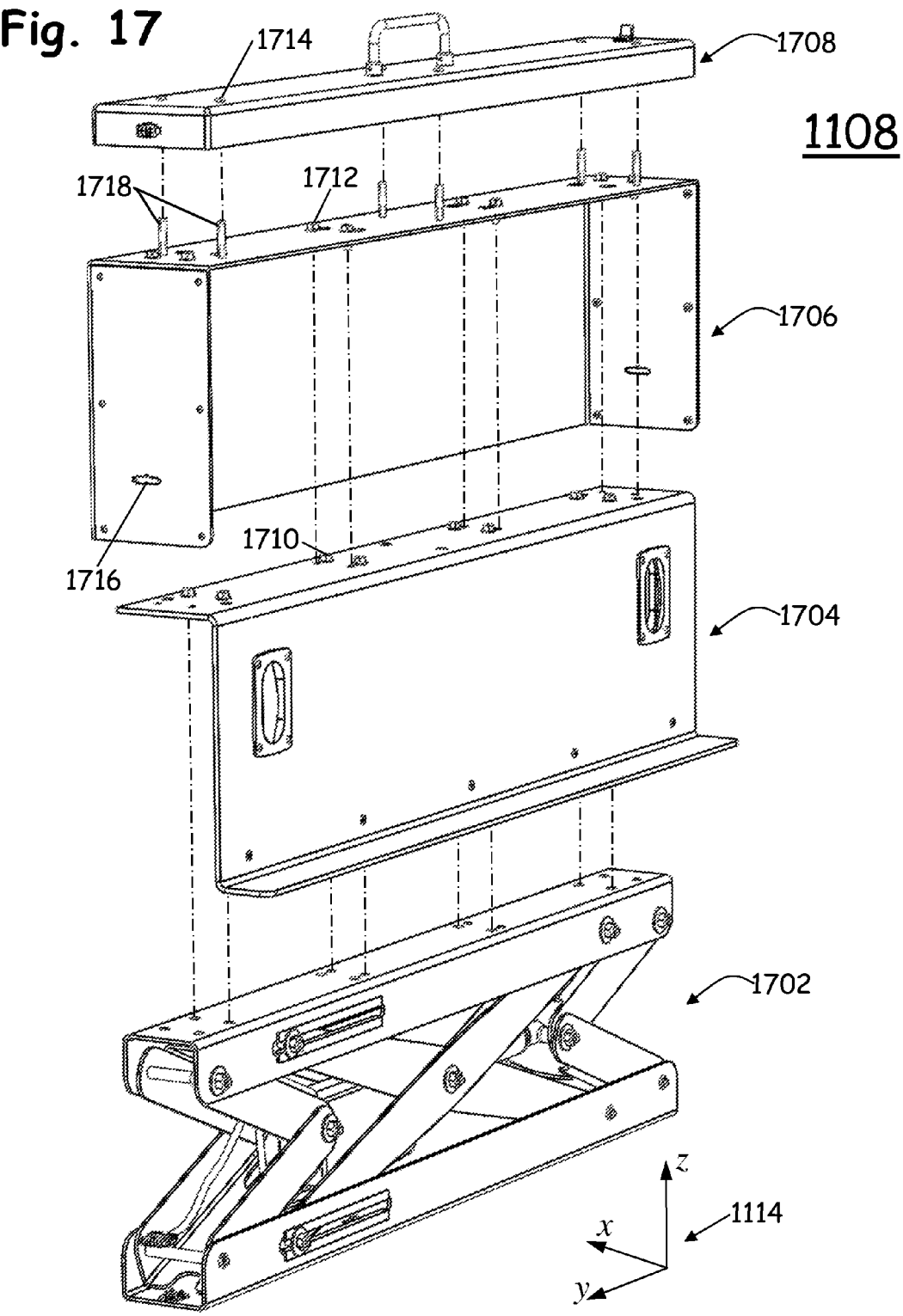
FIG. 17 illustrates an exploded view of a left lifter assembly 1108, comprising a left linkage assembly 1702 shown in a low position.

6.3 Left Lifter Assembly 1108 (FIGS. 17)

FIG. 17 is an exploded view of the left lifter assembly 1108 according to the first embodiment. It comprises four subassemblies: a left linkage assembly 1702, a Z-plate assembly 1704, a shroud assembly 1706, and a switch-tunnel assembly 1708. Assembly of these four subassemblies proceeds as follows: first, the Z-plate assembly 1704 is attached to the left linkage assembly 1702 with a plurality of fasteners 1710; second, the shroud assembly 1706 is attached to the left linkage assembly 1702 with a plurality of fasteners 1712; and third, the switch-tunnel assembly 1708 is attached to the shroud assembly 1706 with a plurality of fasteners 1714 that engage a plurality of threaded standoffs 1718. Each of the four subassemblies 1702, 1704, 1706, and 1708 will now be described in detail.

Figure 18:
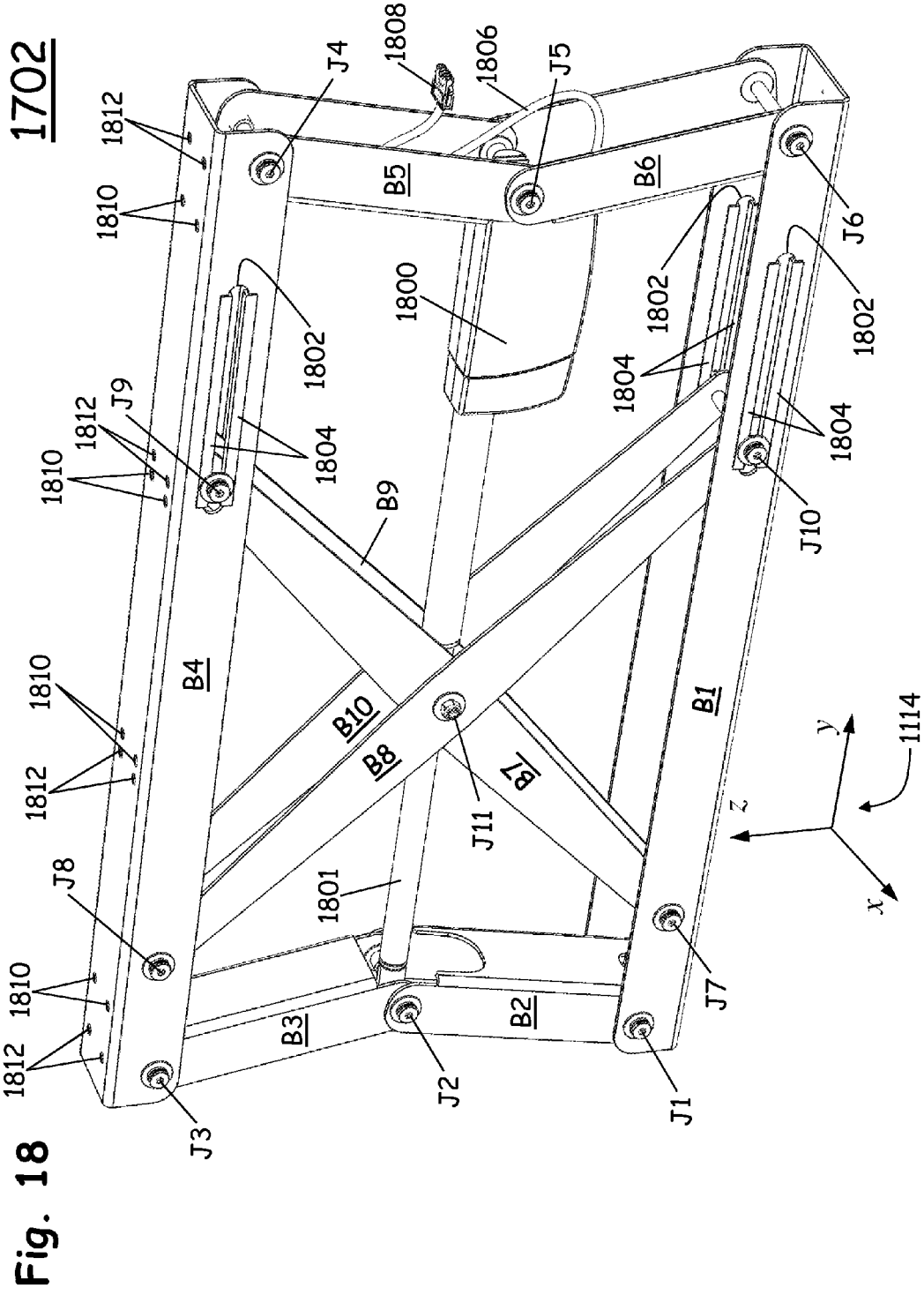
FIG. 18 illustrates a perspective view of the left linkage assembly 1702 shown in a high position

6.3.1 Left Linkage Assembly 1702 (FIG. 18)

FIG. 18 is a close-up view of the left linkage assembly 1702, which is an embodiment of the hex-plus-X linkage assembly described in detail in Hall (2012) (i.e. co-pending patent application Ser. No. 13/668,340), which has been previously cited in Section 2 ("Summary") and included herein in its entirety by reference. The xyz coordinate system on FIG. 18 is oriented to be consistent with other figures herein; this orientation differs from that in Hall (2012).

The left linkage assembly 1702 combines aspects of the first, second and ninth embodiments described in Hall (2012). That is, the structure is primarily as described in the first embodiment of Hall (2012), comprising bars B1, B2, B3, B4, B5, B6, B7 and B8, as well as a linear actuator 1800 comprising an extendable piston 1801, the bars being connected by rotating joints J1, J2, J3, J4, J5, J6, J7, J8, and J11 and by rotating-and-sliding joint J9 and J10, where bars B7 and B8 are connected to bars B1 and B4 on the inner surfaces of the first side flanges thereof, as described in the ninth embodiment of Hall (2012). Assembly 1702 also comprises bars B9 and B10, which are attached to the inner surfaces of the second side flanges of bars B1 and B4, and also attached to each other at a joint J12, as also described in the ninth embodiment of Hall (2012). Assembly 1702 employs slots 1802 through both walls of each of bars B1 and B4 to form the sliding joints J9 and J10, as suggested in the second embodiment of Hall (2012). In linkage assembly 1702, the slots are protected by wear-resistant U-channels 1804, applied along the bottom surface of each slot 1802, and also along the top surface of each slot, to protect bars B1 and B4 from the wear discussed in section 7.5 of Hall (2012). For example, in the prototype, the wear-resistant U-channels are available from McMaster-Carr of Robbinsville, N.J. as part number 8672K41. Also in linkage assembly 1702, the X-bars are wider at the center than at the ends, which helps to resist bending moments caused by the asymmetrical loading discussed in Hall (2012) at the end of section 7.5.

Referring to FIG. 18 in conjunction with FIG. 17, cable 1806 (FIG. 18) transmits electrical power and signals to and from a left linear actuator 1800, as described in Hall (2012). For example, in the prototype of the first embodiment described herein, the linear actuator 1800 is manufactured by Thomson Industries of Wood Dale, Ill., under the name WhisperTrak™, part number W2402-58A30-ES1B. The actuator 1800 is denoted by reference numeral 1002 on FIG. 10 of Hall (2012). By extension of its piston 1801, the actuator 1800 raises bar B4 in the z direction parallel to bar B1. A proximal end of cable 1806 is built into the actuator 1800; a distal end of cable 1806 is terminated by electrical connector 1808, which is, for example, a panel-mountable connector that snaps into a cutout 1716 in the shroud assembly 1706 (FIG. 17). In the prototype, connector 1808 is a MiniFit Jr.™ connector, available from Molex Corporation of Lisle, Ill. as part number 39-01-4053.

Still referring to FIG. 18 in conjunction with FIG. 17, attachment of the Z-plate assembly 1704 to the left linkage assembly 1702 is accomplished by attaching the plurality of fasteners 1710 (FIG. 17) at a corresponding plurality of mating fasteners 1810 (FIG. 18). For example, if fasteners 1710 are threaded machine screws or bolts, then each of the mating fasteners 1810 comprises a mating female thread, which may be provided, for example, by a PEM nut available from Penn Engineering Corporation of Danboro, Pa., the PEM nut being swaged to the bottom surface of bar B4.

Still referring to FIG. 18 in conjunction with FIG. 17, attachment of the shroud assembly 1706 to the left linkage assembly 1702 is accomplished by attaching the plurality of fasteners 1712 (FIG. 17) at a corresponding plurality of mating fasteners 1812 (FIG. 18). For example, if fasteners 1712 are threaded machine screws or bolts, then each of the mating fasteners 1812 comprises a mating female thread, which may be provided, for example, by a PEM nut as explained in the preceding paragraph.

Figure 19:
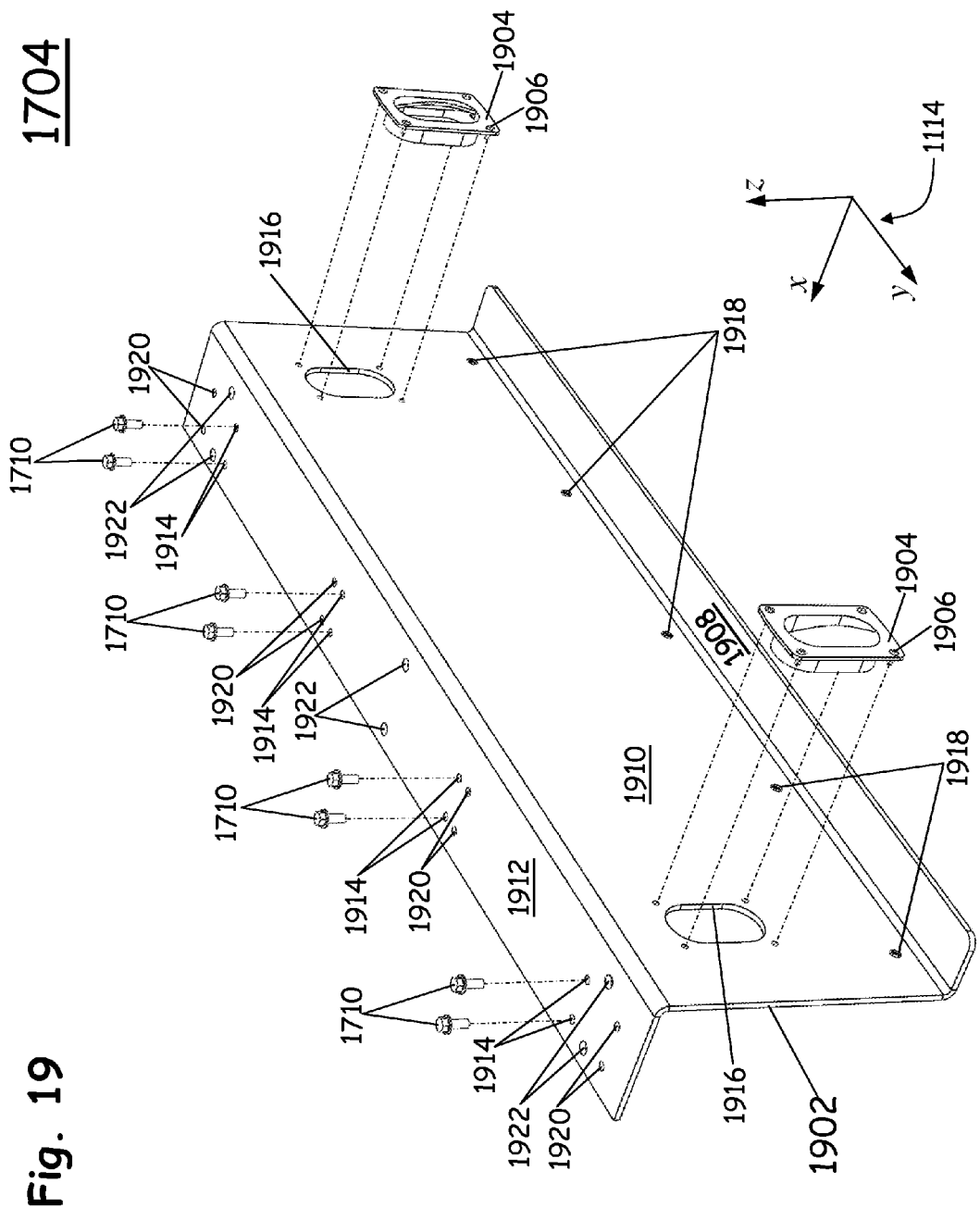
FIG. 19 illustrates an exploded view of a Z-plate assembly 1704

6.3.2 Z-Plate Assembly (FIG. 19)

FIG. 19 is an exploded view of the Z-plate assembly 1704, which comprises a Z plate 1902, the plurality of the fasteners 1710 for attaching the Z plate 1902 to the top of bar B4 of the left linkage assembly 1702 (see FIG. 17), and optional pull handles 1904 and their appropriate fasteners 1906. The pull handles may be useful for positioning the lifting apparatus 1100 on the floor 1104. The Z plate comprises a first horizontal flange 1908 upon which the platform rests (see FIG. 15), whereby the Z plate is also known as "the lifting member" of the lifter assembly, a vertical flange 1910, and a second horizontal flange 1912 that rests atop bar B4 of the left linkage assembly 1702 and is affixed thereto by the fasteners 1710, which pass through a plurality of clearance holes 1914 in the second horizontal flange 1912 and engage mating fasteners 1810 of the left linkage assembly 1702 (FIG. 18). The optional pull handles 1904 mount in cutouts 1916. A plurality of fasteners 1918, such as PEM nuts swaged to the far side of vertical flange 1910, engage the mating fasteners 1616 of the platform assembly (FIG. 16). A plurality of clearance holes 1920 allows the plurality of fasteners 1712 (FIG. 17) to pass through the second horizontal flange 1912 and engage the mating fasteners 1812 of the left linkage assembly 1702 (FIG. 18). The plurality of holes 1922 provides clearance for the heads of fasteners 2004 shown in FIG. 20.

6.3.3 Shroud Assembly (FIG. 20)

FIG. 20 is an exploded view of the shroud assembly 1706, which comprises a shroud 2002, the plurality of fasteners 1712 for attaching the shroud 2002 to the top of bar B4 of the left linkage assembly 1702 (see FIG. 17), the plurality of standoffs 1718, and a corresponding plurality of fasteners 2004 used to fasten the standoffs 1718 to the shroud 2002. The shroud comprises a main flange 2006, a top flange 2008, a rear flange 2010, and a front flange 2012, where flanges 2008, 2010, and 2012 are substantially perpendicular to the main flange 2006.

In the top flange 2008 are clearance holes for fasteners 1712 and for fasteners 2004, as shown by the dashed lines drawn between each fastener and the corresponding hole. Also in the top flange is a plurality of holes 2014 to provide clearance for the heads of fasteners 1710 shown in FIG. 19.

In the rear flange 2010 is the cutout 1716 for receiving the electrical connector 1808 mentioned above in connection with FIG. 18. Also in the rear flange is a plurality of holes 2018 with fasteners such as PEM nuts (these PEM nuts not visible in FIG. 20), for attaching the rear assembly to the shroud of the left lifter assembly.

In front flange 2012 is a cutout 2016 similar to 1716, and a plurality of holes 2020 similar to 2018 and similarly populated with fasteners such as PEM nuts. Cutout 2016 and holes 2020 are not used for the left lifter assembly 1108, but are used with the right lifter assembly 1110 (see FIG. 11). The reason to have both cutouts 1716 and 2016 in the shroud 2002, as well as both sets of holes 2018 and 2020, is that the same shroud can then be used for both the left and right lifter assemblies, being rotated 180 degrees about the z axis for use in the right lifter assembly, as will be further explained later. This is advantageous in manufacturing, because it minimizes the number of different parts. It is, however, optional. For aesthetic reasons, it may be preferable to have a left-handed shroud and a right-handed shroud, where the left-handed shroud, used with the left lifter assembly, has cutout 1716 and holes 2018, but has neither cutout 2016 nor holes 2020; and conversely, the right-handed shroud, used with the right lifter assembly, has cutout 2016 and holes 2020, but has neither cutout 1716 nor holes 2018. Having left- and right-handed shrouds is inconvenient in manufacturing, but it prevents unsightly extraneous cutouts and holes that are otherwise visible at the front of the lifting apparatus; see for example FIG. 11 and FIG. 12.

6.3.4 Switch-Tunnel Assembly (FIGS. 21A and 21B)

FIG. 21A and FIG. 21B are two views of the switch-tunnel assembly 1708: as indicated by the coordinate system 1114 on each figure, FIG. 21A is viewed substantially from above, whereas FIG. 21B is viewed substantially from below. Referring to both of these figures, the switch-tunnel assembly 1708 comprises a switch tunnel 2102, a double-pole, three-throw switch 2104, a switch-tunnel connector 2106, a switch-tunnel cable 2108 that connects the switch 2104 to the connector 2106, a plurality of fasteners 2110 used to attach the switch-tunnel assembly 1708 to the stand-offs 1718 (FIG. 17), and an optional carrying handle 2112 attached to the switch tunnel 2102 with fasteners 2114. The switch tunnel comprises a main flange 2116, a first side flange 2118, a second side flange 2120, a first end flange 2122, and a second end flange 2124. The switch 2104 is mounted in the main flange 2116 so that it may be manually operated from above. The switch has three positions: a default "Off" position, a momentary "Extend" position, and a momentary "Retract" position. A three-position, momentary-off-momentary-style rocker switch is shown, but other types of switches may be used, including wireless remote switches. In the prototype, the switches used are from NKK Switches of Kawasaki-shi, Japan, part number M2028TJW01-GA-1A. The connector 2106 is mounted in the first end flange 2122 so that a mating connector may be attached when the switch tunnel assembly is mounted upon the shroud assembly, as shown in FIG. 15. The optional carrying handle 2112 may be provided for convenience in deploying and un-deploying the lifting apparatus 1100; that is, when the lifting apparatus is disassembled into the four main subassemblies shown in FIG. 15, the carrying handle allows each of the lifter assemblies 1108 and 1110 to be easily carried.

Figure 23:
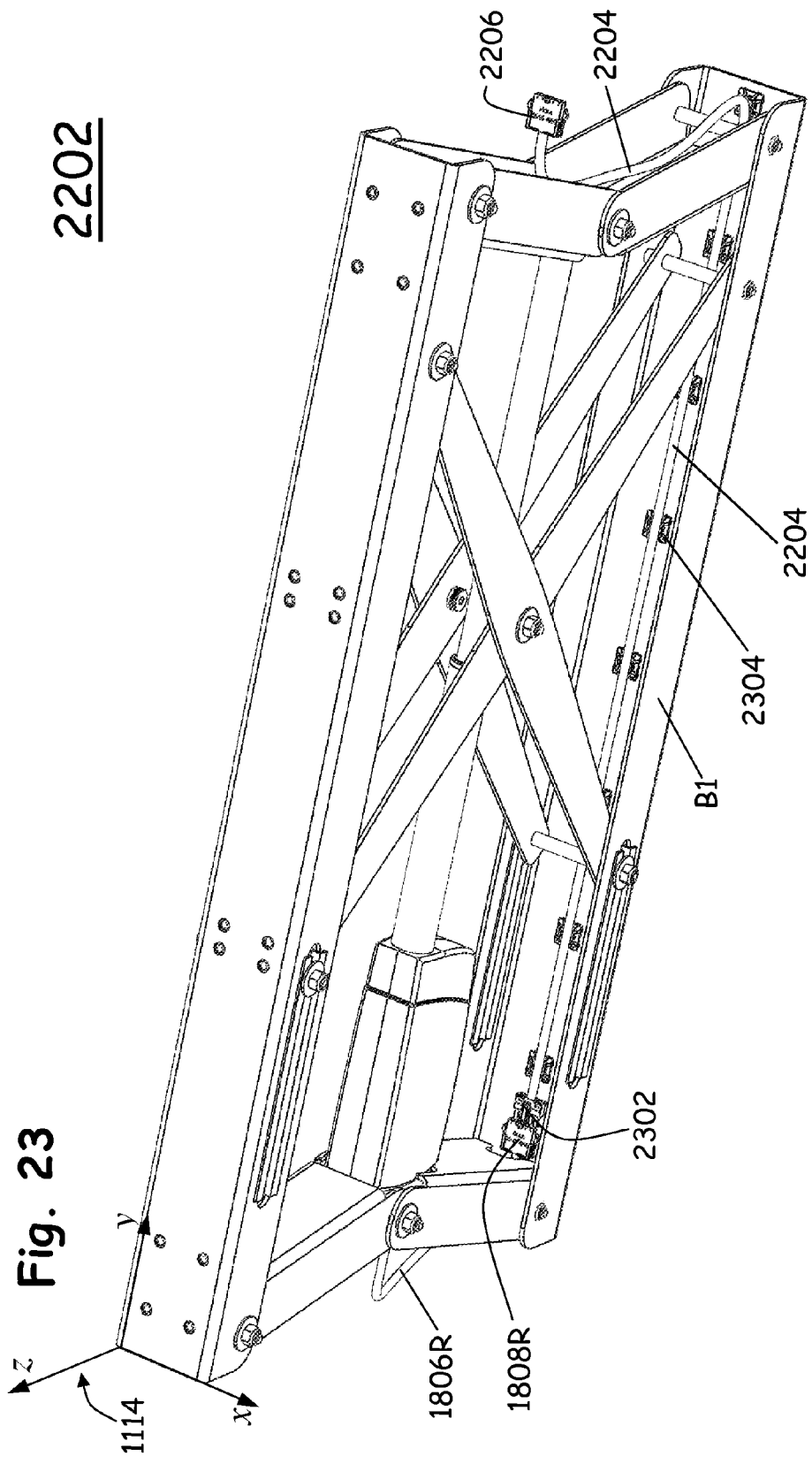
FIG. 23 illustrates the right linkage assembly 2202, showing a cable extension 2204.

6.4 Right Lifter Assembly 1110 and Comparison to Left Lifter Assembly 1108 (FIGS. 22A, 22B, and 23)

FIGS. 22A and 22B illustrate exploded views of the left lifter assembly 1108 and the right lifter assembly 1110, respectively. The left lifter assembly 1108 has been described above, referring to FIGS. 17-21. The right lifter assembly 1110 is nearly identical to the left lifter assembly 1108, which is very convenient in manufacturing. To distinguish instances of identical parts or sub-assemblies appearing in the left and right lifter assemblies, reference numerals will sometimes be appended with suffix "L" or "R" respectively, for clarity. For example, the shroud assembly was previously identified, on FIG. 17, as reference numeral 1706. This assembly is identical in both the right and left lifter assemblies. To distinguish between the two instances of the shroud assembly, the instance appearing in the left lifter assembly is subsequently referred to as "1706L", whereas the instance appearing in the right lifter assembly is referred to as "1706R". Parts or assemblies in the right lifter assembly that differ from those in the left lifter assembly are designated by separate reference numerals.

FIG. 22B is an exploded view of the right lifter assembly 1110 according to the first embodiment. It comprises four sub-assemblies: a right linkage assembly 2202, the Z-plate assembly 1704R previously described as 1704 in Section 6.3.2 in connection with FIG. 19, the shroud assembly 1706R previously described as 1706 in Section 6.3.3 in connection with FIG. 20, and the switch-tunnel assembly 1708R previously described as 1708 in Section 6.3.4 in connection with FIG. 21. Assembly of these four subassemblies proceeds as for the left lifter assembly, as described in the first paragraph of Section 6.3.

There are two differences between the left lifter assembly 1108 and the right lifter assembly 1110. These two differences may best be visualized by imagining what would be required to "convert" the left lifter assembly 1108 into the right lifter assembly 1110. Imagine that the exploded assembly 1108 in FIG. 22A is rotated clockwise about the z axis (looking from the top) and is overlaid on the corresponding exploded assembly 1110 in FIG. 22B. Only two things don't "match"; these two mismatches represent the differences between the left and right lifter assemblies.

The first difference involves the orientation of switch-tunnel assembly 1708. In both left and right lifter assemblies, the switch 2104 must be near the front of the lifting apparatus (toward −y), so the user can access it. Consequently, in the imaginary conversion of a left lifter assembly into a right lifter assembly, the orientation of the switch-tunnel assembly would have to be inverted by removing six screws 2122, rotating the switch-tunnel assembly by 180 degrees about the z axis, and reinstalling the six screws 2122. The switch-tunnel assembly 1708 and the shroud assembly 1706 are designed in a symmetrical fashion to allow just such a conversion, so that right lifter assemblies and left lift assemblies may be manufactured from the same parts.

The second difference involves the left linkage assembly 1702 vis-à-vis the right linkage assembly 2202. It is convenient to assemble the mechanical parts of left and right linkage assemblies identically, as shown in FIG. 18, with the actuator 1800 facing the same way; namely, with its body near joint J5. Consequently, referring to FIG. 22A, in the left linkage assembly 1702, the body of the left actuator 1800L is near the rear of the lifter assembly (toward the +y direction, referring to the coordinate system 1114 in FIG. 22A), so the electrical connector 1808L terminating actuator cable 1806L, when installed in the cutout 1716L, is in the correct, rearward position to be connected to the rear-mounted rear assembly 1112 (FIG. 15). However, the same is not true in right linkage assembly 2202: in this case, the right actuator body 1800R is near the front of the lifter assembly (toward the −y direction, referring to the coordinate system 1114 in FIG. 22B), so the electrical connector terminating actuator cable 1806R must not be installed in cutout 1716R in FIG. 22B, because that cutout, located at the front of the lifter assembly, is not suitable for connection to the rear-mounted rear assembly 1112. Rather, the cable 1806R must be extended by an actuator-extension cable 2204, which is terminated in a connector 2206 that is identical to connector 1808. Connector 2206 is installed in cutout 2016 of the right switch-tunnel assembly 1706R, which is in the correct, rearward position to be connected to the rear-mounted rear assembly 1112 (FIG. 15).

FIG. 23 illustrates in more detail the extension cable 2204 located in right linkage assembly 2202. Toward the front (−y) end of the linkage assembly 2202, the extension cable 2204 is terminated in a connector 2302. The connector 2302 mates with the connector 1808R that terminates the actuator cable 1806R. Toward the rear (+y) end of the linkage assembly 2202, the extension cable 2204 is terminated in the connector 2206. The extension cable 2204 is secured to the bar B1 with a plurality of cable-tie-down devices 2304. In the prototype, connector 2206, like connector 1808, is Molex part number 39-01-4053; connector 2302 is Molex part number 39-01-4051; and the cable tie-down 2304 is available from Richco Incorporated of Morton Grove, Ill. as part number FTH-5A-RT-C.

Figure 24:
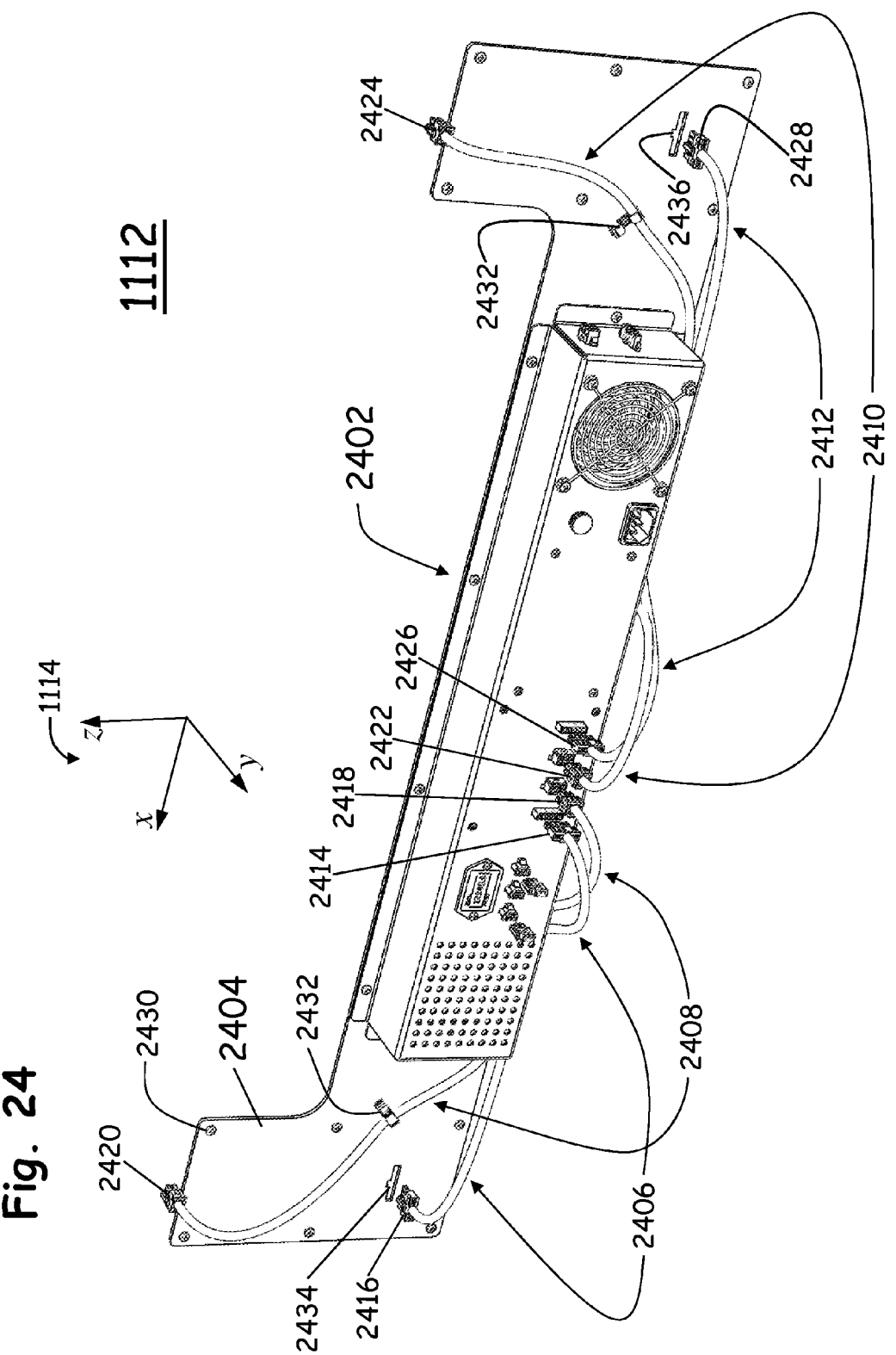
FIG. 24 illustrates a rear assembly 1112.

6.5 Rear Assembly 1112 (FIGS. 24, 25A, and 25B)

FIG. 24 illustrates the rear assembly 1112, which comprises an electronics assembly 2402, a rear strut 2404 upon which the electronics assembly is mounted, an electronics-to-left-actuator cable assembly 2406, an electronics-to-left-switch cable assembly 2408, an electronics-to-right-switch cable assembly 2410, an electronics-to-right-actuator cable assembly 2412, a plurality of fasteners 2430 for attaching the rear strut 2404 to the shroud assemblies 1706L and 1706R, and cable clamps 2432 for retaining cables 2408 and 2410. The following sections describe the electronics assembly in detail. The electronics-to-left-actuator cable assembly 2406 is terminated at a first end by connector 2414 and at a second end by connector 2416. The electronics-to-left-switch cable assembly 2408 is terminated at a first end by connector 2418 and at a second end by connector 2420. The electronics-to-right-switch cable assembly 2410 is terminated at a first end by connector 2422 and at a second end by connector 2424. The electronics-to-right-actuator cable assembly 2412 is terminated at a first end by connector 2426 and at a second end by connector 2428. The rear strut 2404 comprises a cutout 2434 to allow connector 2416 to pass therethrough, and a cutout 2436 to allow the connector 2428 to pass therethrough.

6.5.1 Electronics Assembly 2502 (FIGS. 25A and 25B)

FIGS. 25A and 25B illustrate two views of the electronics assembly 2302: FIG. 25A illustrates an external view whereas FIG. 25B illustrates an internal view. The coordinate system 1114 indicates the orientation of FIG. 25 B. Referring to FIGS. 25A and 25B, the electronics assembly comprises a chassis 2502, an array of electronic components, and a line cord 2504 for conveying external AC (alternating current) power to the electronics assembly from an external power source (not shown). The chassis 2502 comprises a main flange 2506, a top flange 2508, a left flange 2510, a right flange 2012, a bottom flange 2514, a top mounting flange 2516, a left mounting flange 2518, a right mounting flange 2520, and a bottom mounting flange 2522. The flanges 2506, 2508, 2510, 2512, and 2514 create an internal cavity to house the array of electronic components. Cutouts in flanges 2506, 2510, 2512, and 2514 allow the array of electronic components to be mounted thereto. A plurality of holes in the mounting flanges 2516, 2518, 2520, and 2522 allow the electronics assembly 2302 to be mounted to the rear strut 2404 using fasteners 2524. The array of electronics components comprises:

- a power-inlet module 2526 for receiving the line cord 2504 that brings external power into the internal cavity, and for providing earth ground to the lifter assembly 1100 via connection to a ground screw 2528 affixed to the bottom flange 2514;
- a fuse-and-fuse-holder assembly 2530 to limit the AC line current;
- a power supply 2532, which receives AC line power from the power-inlet module 2526 and from the fuse-and-fuse-holder assembly 2530 via line-voltage wiring 2534, and which creates a DC (direct-current) voltage;
- a printed-circuit-board (PCB) assembly 2536, fastened to the chassis 2502 with PCB standoffs 2537, that receives the DC voltage from the power supply 2532 via a cable 2538, the PCB assembly comprising a PCB-to-left-actuator connector 2540, a PCB-to-left-switch connector 2542, a PCB-to-right-switch connector 2544, a PCB-to-right-actuator connector 2546, and other components specified in Section 6.5.2.
- a fan assembly 2548 connected to the PCB assembly 2536 via a cable 2550 retained by cable tie-downs 2552, the fan assembly 2548 being used for the purpose of cooling electronics within the internal cavity via air-inlet holes 2554, and comprising a fan 2556, an external finger guard 2558, an internal finger guard 2560, and appropriate mounting hardware;
- a tilt sensor 2562 that is connected to the PCB assembly via a cable 2564, to a first tilt-sensor-programming connector 2566 via a cable 2568, and to a second tilt-sensor-programming connector 2570 via a cable 2572, the tilt sensor being optional in the sense that the rest of the circuit will continue to work in normal circumstances if it is disconnected or removed, although its presence provides safety in unusual circumstances, as described in Section 7.4;
- an hour-meter 2574 connected to the PCB assembly via a cable 2576, the hour meter being optional in the sense that the rest of the circuit will continue to work if it is disconnected or removed;
- a first dummy connector 2578 for accommodating the otherwise loose end of the left-actuator cable assembly 2406, shown in FIG. 24, when the rear assembly is disassembled from the rest of the lifting apparatus;
- a second dummy connector 2580 for likewise accommodating the otherwise loose end of the electronics-to-left-switch cable assembly 2408 shown in FIG. 24;
- a third dummy connector 2582 for likewise accommodating the otherwise loose end of the right-switch cable assembly 2410 shown in FIG. 24;
- a fourth dummy connector 2584 for likewise accommodating the otherwise loose end of the right-actuator cable assembly 2412 shown in FIG. 24;
- a first shorting connector 2586, which, during programming of the tilt sensor 2562, temporarily mates with the first tilt-sensor-programming connector 2566;
- a second shorting connector 2588, which is normally mated to the second tilt-sensor-programming connector 2570, but which is temporarily unmated during programming of the tilt sensor 2562;
- a fifth dummy connector 2590 used to hold the first shorting connector 2586 at times other than during tilt-sensor programming; and
- a plurality of double-half-U cable tie-downs 2592 for retaining the cables 2406, 2408, 2410, and 2412 to the undersurface of the bottom flange 2514.

Of these electronics components, the tilt sensor 2562 and the hour meter 2574 are optional; however, they are useful to enhance the safety and reliability of the lifting apparatus 1100, as will be further discussed in Section 7.

In the prototype of the first embodiment, the electronic components are as follows.

The line cord 2504 is manufactured by Schurter, Incorporated of Lucerne, Switzerland as part number 6051.2001. It incorporates a locking technology such that the line cord 2504 cannot be inadvertently disconnected from the power inlet module 2526.

The power inlet module 2526 is Schurter part number 5120.2207.0.21, which likewise incorporates the locking technology.

The fuse holder 2530 is manufactured by Littelfuse Corporation of Chicago, Ill. as part number 03453LF2H.

The power supply 2532 is manufactured by CUI, Incorporated of Tualatin, Oreg. as part number VMS-365-24. Its output voltage is 24 VDC; its power capability is 365 Watts.

The printed circuit board (PCB) 2536 is custom-made for the lifting apparatus.

The PCB standoffs 2537 are manufactured by Penn Engineering of Valencia, Calif. as part number SOS-632-6.

The left actuator connector 2540 and the right actuator connector 2546 are manufactured by Molex, Incorporated of Lisle, Ill. as part number 39-30-2056.

The left switch connector 2542 and the right switch connector 2544 are Molex part number 39-29-9066.

The cable tie-downs 2552 are manufactured by Richco, Incorporated of Morton Grove, Ill. as part number FTH-5A-RT-C.

The fan 2556 is manufactured by ebm Papst, Incorporated of Farmington, Conn. as part number 3414NM.

The finger guards 2558 and 2560 are distributed by McMaster Carr Incorporated of Robbinsville, N.J. as part number 19155K95.

The tilt sensor 2562 is manufactured by The Fredericks Company of Huntington Valley, Pa. as part number 0729-1758-99. It senses tilt about one axis, both clockwise and counterclockwise.

The first tilt-sensor programming connector 2566 and the second tilt-sensor programming connector 2570 are Molex part number 39-01-2026.

The hour meter 2574 is manufactured by Curtis Instruments of Mount Kisco, N.Y. as part number 701FR00101248D2060A.

The first and fourth dummy connectors, 2578 and 2584 respectively, are Molex part number 39-01-4053.

The second and third dummy connectors, 2580 and 2582 respectively, are Molex part number 39-01-2066.

The shorting connectors 2586 and 2588 are Molex part number 39-01-2025.

The fifth dummy connector 2590 is Molex part number 39-01-2026.

The double half-U cable tie-downs 2592 are Richco part number DHURCS-4-01.

The particular choice of parts listed above is not meant to be limiting; it is merely exemplary of parts that are suitable for the first embodiment, as reduced to practice in the prototype.

Figure 26:
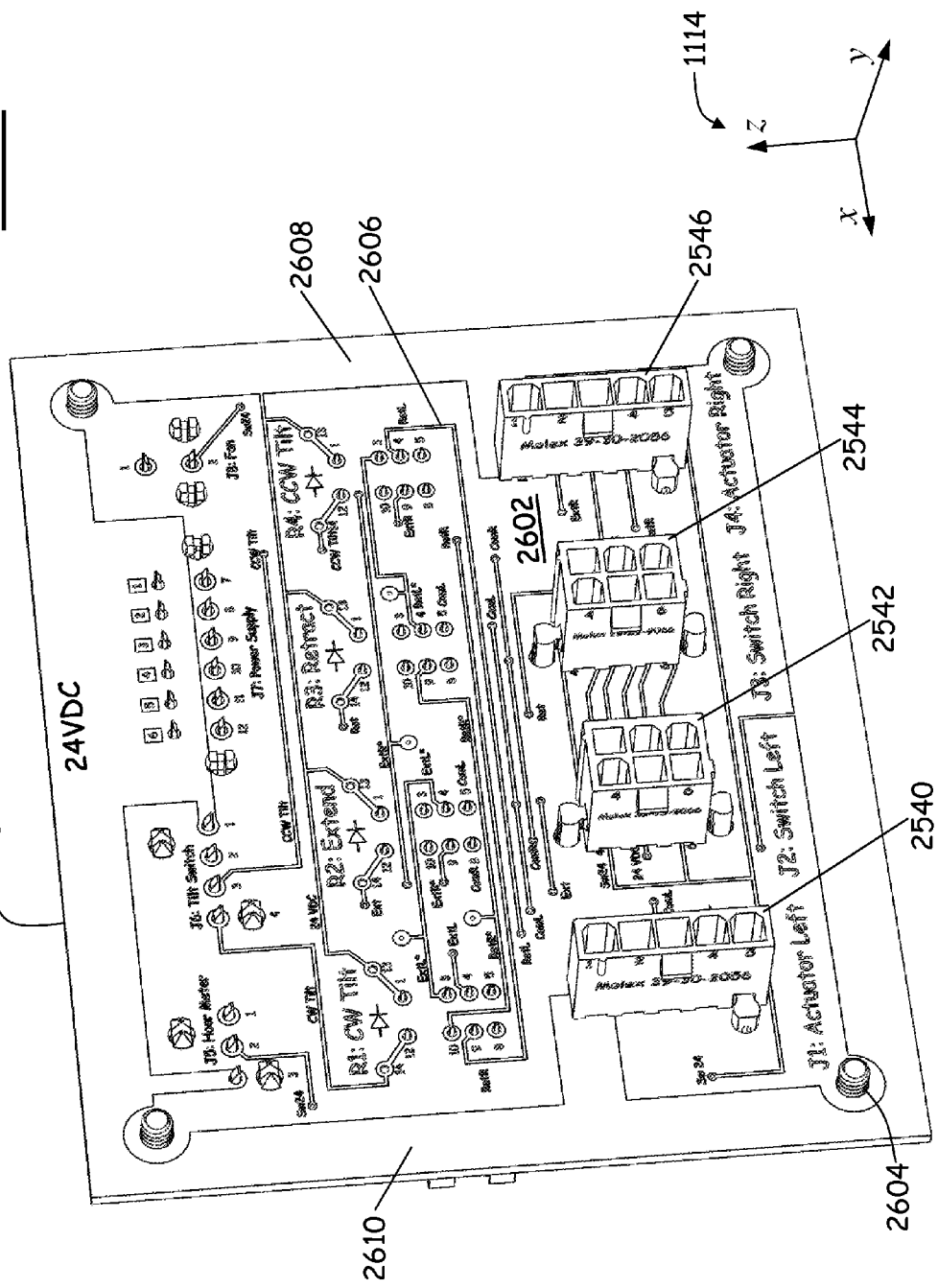
FIG. 26 illustrates a first perspective view of a printed-circuit-board assembly 2536.
Figure 27:
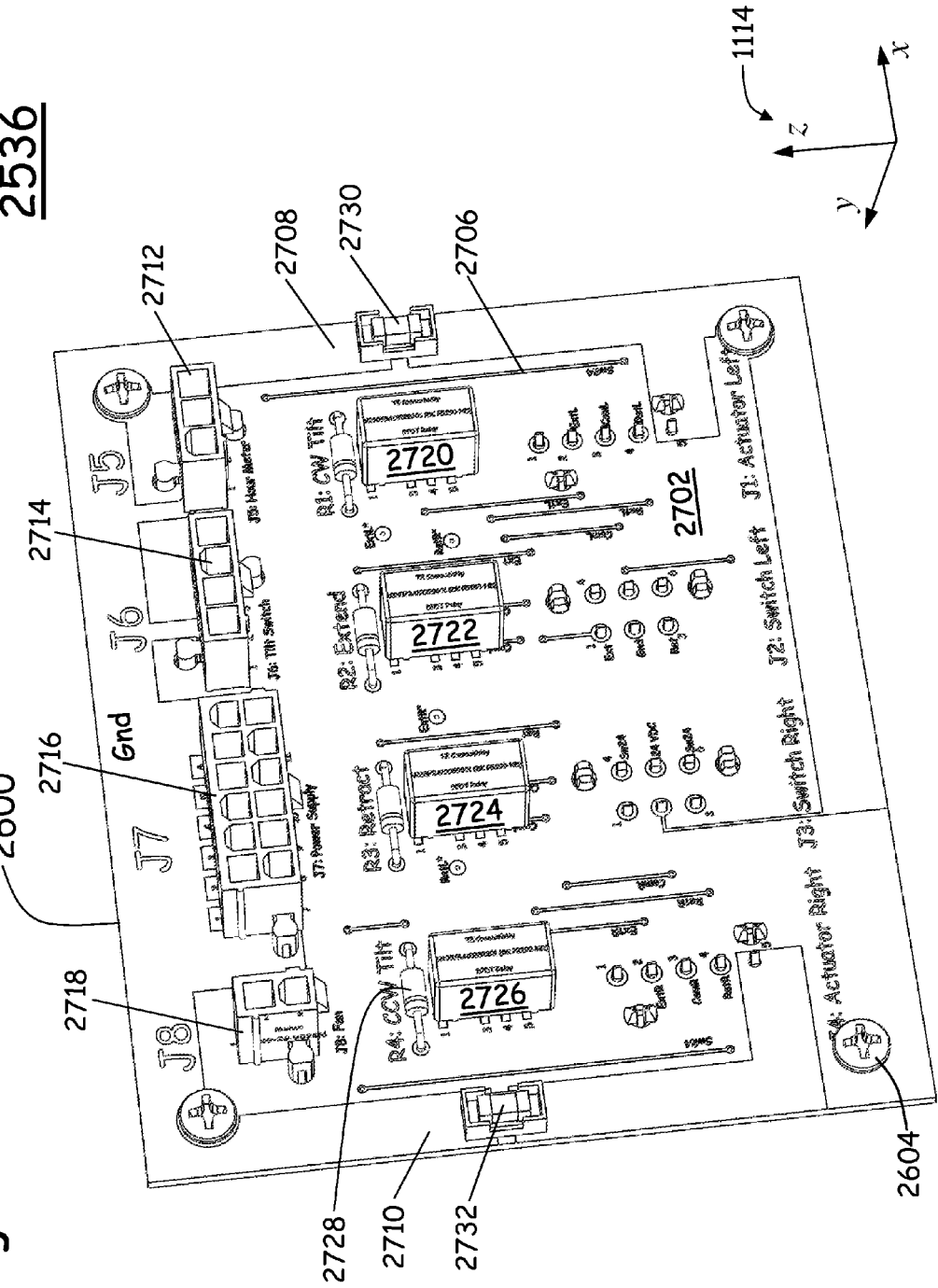
FIG. 27 illustrates a second perspective view of the printed-circuit-board assembly 2536.

6.5.2 Printed Circuit Card (PCB) 2536 (FIGS. 26 and 27)

FIGS. 26 and 27 illustrate two views of the PCB assembly 2536. The PCB assembly comprises a printed-circuit card 2600, also known as PCB 2600, having a first face 2602 that is visible in FIG. 26 and a second face 2702 that is visible in FIG. 27. The first face 2602 is mounted in the chassis 2502 upon the PCB standoffs 2537 (FIG. 25) using fasteners 2604, such that the second face 2702 is visible in FIG. 25. The first face 2602 of the PCB 2600 is etched with a first set of copper traces 2606 that implements a first portion of an electrical circuit described in Section 6.5.3, and the second face 2702 of the PCB 2600 is etched with a second set of copper traces 2706 that implements a second portion of the electrical circuit. The first set of copper traces comprises wide traces such as 2608 and 2610 that carry a signal known as "24VDC", which refers to a high-voltage level provided to the PCB 2600 by the power supply 2532; the second set of copper traces comprises wide traces such as 2708 and 2710 that carry a signal known as "Gnd", which refers to the low-voltage ("ground") level provided to the PCB 2600 by the power supply 2532. Electrical connection between the first set of copper traces 2606 and the second set of copper traces 2706 is made by plated-through holes, as is well known in the art of printed-circuit-board manufacture.

Referring to FIG. 26, the PCB assembly 2536 comprises the following components located on the first face 2602 of the PCB 2600 and soldered thereto:

the PCB-to-left-actuator connector 2540, also known as J1.M, which terminates a first end of the cable 2406 that leads to the left actuator 1800L;

the PCB-to-left-switch connector 2542, also known as J2.M, which terminates a first end of the cable 2408 that leads to the left switch 2104L;

the PCB-to-right-switch connector 2544, also known as J3.M, which terminates a first end of the cable 2410 that leads to the right switch 2104R; and the PCB-to-right-actuator connector 2546, also known as J4.M, which terminates a first end of the cable 2412 that leads to the right actuator 1800R.

Referring to FIG. 27, the PCB assembly 2536 further comprises the following components located on the second face 2702 of the PCB 2600 and soldered thereto:

an hour-meter connector 2712, also known as J5.M, that terminates the cable 2576 leading to the hour meter 2574;

a tilt-sensor connector 2714, also known as J6.M, that terminates the cable 2564 leading to the tilt sensor 2562;

a power-supply connector 2716, also known as J7.M, that terminates the cable 2538 leading to the power supply 2532;

a fan connector 2718, also known as J8.M, that terminates the cable 2550 leading to the fan 2556;

a first relay 2720, also known as R1, that responds to a signal known as "CW Tilt" that is asserted by the tilt sensor 2562 when it senses clockwise tilt;

a second relay 2722, also known as R2, that responds to an "Extend" command issued from either the left switch 2104L or the right switch 2104R;

a third relay 2724, also known as R3, that responds to a "Retract" command issued from either the left switch 2104L or the right switch 2104R;

a fourth relay 2726, also known as R4, that responds to a signal known as "CCW Tilt" that is asserted by the tilt sensor 2562 when it senses counterclockwise tilt;

four diodes 2728, one for each of the relays R1 through R4, to protect them from voltage spikes.

a first fuse 2730 that bridges between two disjoint segments of the wide Gnd trace 2708 leading to the connector 2540 (J1.M), for the purpose of breaking current to the left actuator 1800L if it draws too much current, a condition indicative of a failure; and a second fuse 2732 that bridges between two disjoint segments of the wide Gnd trace 2710 leading to the connector 2546 (J4.M), for the purpose of breaking current to the right actuator 1800R if it draws too much current, a condition indicative of a failure.

In the prototype of the first embodiment, the components soldered to the PCB are as follows (connectors 2540, 2542, 2544, and 2546 have already been identified in the discussion of FIG. 25):

the hour-meter connector 2712, also known as J5.M, is Molex part number 39-30-2036;

the tilt-sensor connector 2714, also known as J6.M, is Molex part number 39-30-2046;

the power-supply connector 2716, also known as J7.M, is Molex part number 39-29-9126;

the fan connector 2718, also known as J8.M, is Molex part number 39-29-9026;

the four relays 2720, 2722, 2724, and 2726 are manufactured by TE Connectivity of Berwyn, Pa. as part number V23079A1005B301;

the four diodes 2728 are manufactured by Vishay Intertechnology, Incorporated of Selb, Germany as part number 1N4004-E3-54;

the fuses 2730 and 2732 are Littelfuse series 0154.

6.6 Size of the Lifting apparatus vis-à-vis the Chair (FIGS. 28A, 28B, 28C, and 28D)

FIGS. 28A, 28B, 28C, and 28D illustrate, according to the first embodiment, certain dimensions of the lifting apparatus vis-à-vis the chair. As shown, let W1≡In the x direction, the width of a lower portion of the chair;

W2≡In the x direction, the distance between the inner-facing surfaces of flange 1910 of the left and right instances of Z plate 1902;

W3≡In the x direction, the maximum width of the chair including arms and other protruding structures;

W4≡In the x direction, the overall width of the lifter apparatus; that is, the distance between the outer-facing surfaces of flanges 2006 of the left and right instances of the shroud 2002;

W5≡In the x direction, the width dimension of the electronics chassis 2502 between the left and right flanges 2510 and 2512;

W6≡In the x direction, the width available on the rear strut 2402 for mounting the electronics chassis 2502 between the inside columns of fasteners 2430;

D1≡In the y direction, the overall depth of the chair;
D2≡In the y direction, the distance between the inside surfaces of the front flange 1612 and the rear flange 1614 of the platform 1602;
D3≡In the y direction, the distance between the outer surfaces of flanges 2010 and 2012 of the shroud 2002;

D4=In the y direction, the distance from the front of the shroud to the rearmost portion of the electronics assembly, exclusive of the line cord 2504;  (40)

H1≡In the z direction, the distance from the floor 1104 to the top of the electronics assembly 2402;
H2≡In the z direction, the distance from the floor 1104 to the top surface 2116 of the switch tunnel 2102;

H=In the z direction, the distance from the floor 1104 to the seat surface 1103, in accordance with the previous definition in equation (1).  (41)

For example, in the prototype of the first embodiment, and with a prototypical chair: W1=690 mm (27.2"), W2=780 mm (30.7"), W3=826 mm (32.5"), W4=1030 mm (40.5"), W5=599 mm (23.6"), W6=790 mm (31.1"), D1=760 mm (29.9"), D2=860 mm (33.9"), D3=894 mm (35.2"), D4=1030 mm (40.6"), H1=139 mm (5.5"), H2=283 mm (11.2"), and H=441 mm (17.4"). These dimensions are not meant to be limiting, they are merely exemplary of dimensions that are typical for the first embodiment, as reduced to practice in the prototype.

6.6.1 Lifter Width vs. Chair Width

For the first embodiment, in the x direction, the chair will fit in the lifting apparatus if W2>W1. Reclining chairs sometimes have a handle on one side to place the chair into its reclining mode; if so, the width of the handle is typically included in W1. To accommodate various widths of chairs, W2 may be varied. If W2 is varied by an amount Δ (either positive or negative), then the width of the platform 1602 is altered by Δ, and the width of the rear strut 2404 is altered by Δ; these are the only two changes. Thus, a wide variety of chairs may be accommodated by these two extremely simple engineering changes. In practice, it is contemplated that a small number of versions of the platform and the rear strut would be manufactured, for example, "narrow", "medium", and "wide". Thus, for example, suppose three widths of platform 1602, denoted 1602N, 1602M, and 1602W, as well as three widths of rear struts 2404, denoted 2404N, 2404M, and 2404W are manufactured to accommodate narrow, medium, and wide chairs, respectively, yielding three values of W2 denoted W2N, W2M, and W2W, respectively. Then, for application to a particular chair, the narrowest version of the two parts that accommodates the chair is chosen. That is:

if (W1<W2N), use narrow parts 1602N and 2404N;
 else if (W2N<W1<W2M), use medium parts
 1602M and 2404M; else if (W2M<W1<W2W),
 use wide parts 1602W and 2404W.  (42)

In general, a width overhead defined by

ΔW≡W4−W3  (43)

is imposed by the lifting apparatus in the x direction. This width overhead is often less than W4−W1 because the arms of the chair are often wider than its lower portion. For the prototype of the first embodiment, and for the prototypical chair, using the values stated following equation (41), ΔW=204 mm The width of each of the prototype lifter assemblies, 1108 and 1110, is, using the values stated following equation (41): ½(W4−W2)=½(1030−780)=125 mm. Again, these dimensions are not meant to be limiting, they are merely exemplary of dimensions that are typical for the first embodiment, as reduced to practice in the prototype.

Figure 28B:
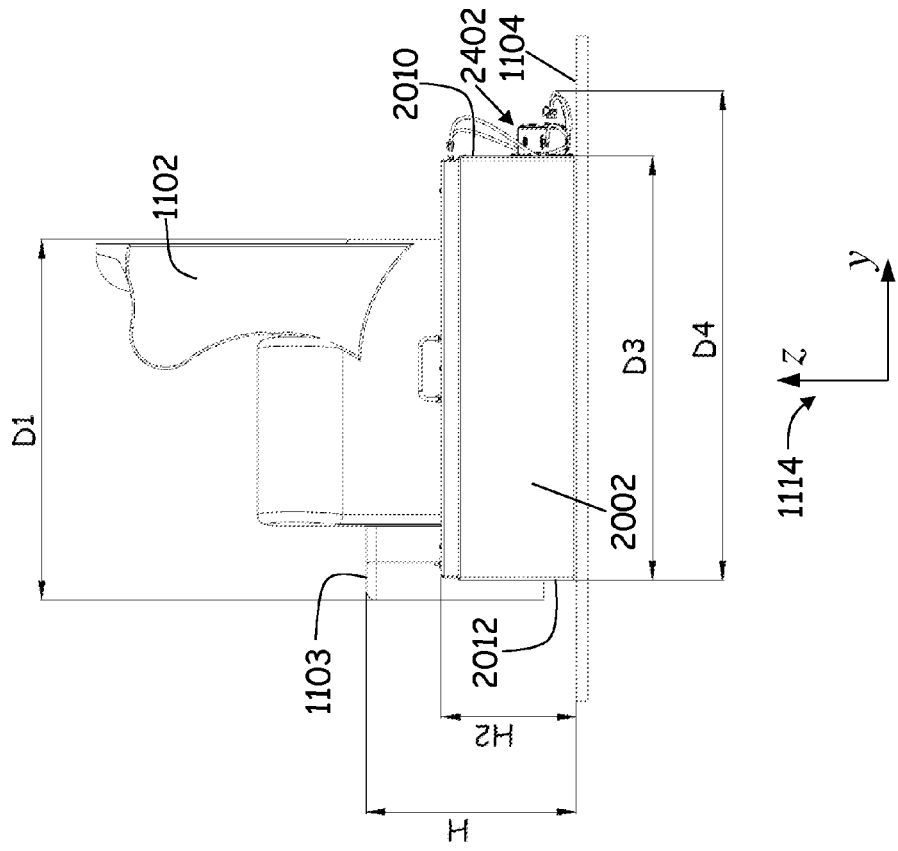
FIG. 28B illustrates a left, dimensioned view of the lifting apparatus 1100 and the chair 1102.

6.6.2. Lift Depth vs. Chair Depth, and Accommodation of Reclining and Rocking Chairs In the y direction, the base of the chair must fit between the front flange 1612 and the rear flange 1614 of the platform 1602 (FIG. 16). That is, the chair's base, or its legs, must fit front-to-back in the depth D2. However, the front of the chair, which is often forward of the base, may project beyond the front surface 2012 of the shroud as shown in FIG. 28B.

Depth overhead of the lifting apparatus is nominally

ΔD≡D4−D1,  (44)

but for popular reclining chairs, this overhead is typically moot, because the reclining motion of the chair typically requires an overhead greater than ΔD, so the lifting apparatus causes no additional depth overhead.

For a chair-lifting retrofit, ample space is desirable at the rear to allow a reclining chair to recline fully and a rocking chair freely to rock. A retrofit design may interfere with reclining or rocking if it comprises structures at the rear that protrude more than about 250 mm (10") above the plane of the chair's base surface. For this reason, the back of the chair-lifter assembly 1100 is open: the electronics assembly 2402 is deliberately placed low, close to the platform surface 1606, and the center of the rear strut is also cut down in the center as far as possible, producing the large U-shaped cutout visible in FIG. 24. In the prototype, the distance from the top surface 1606 of the platform 1602 to the top edge of flange 2516 of the electronics assembly is 128 mm (5"). This is sufficiently low to avoid interfering with the reclining or rocking motion of typical chairs.

Figure 29:
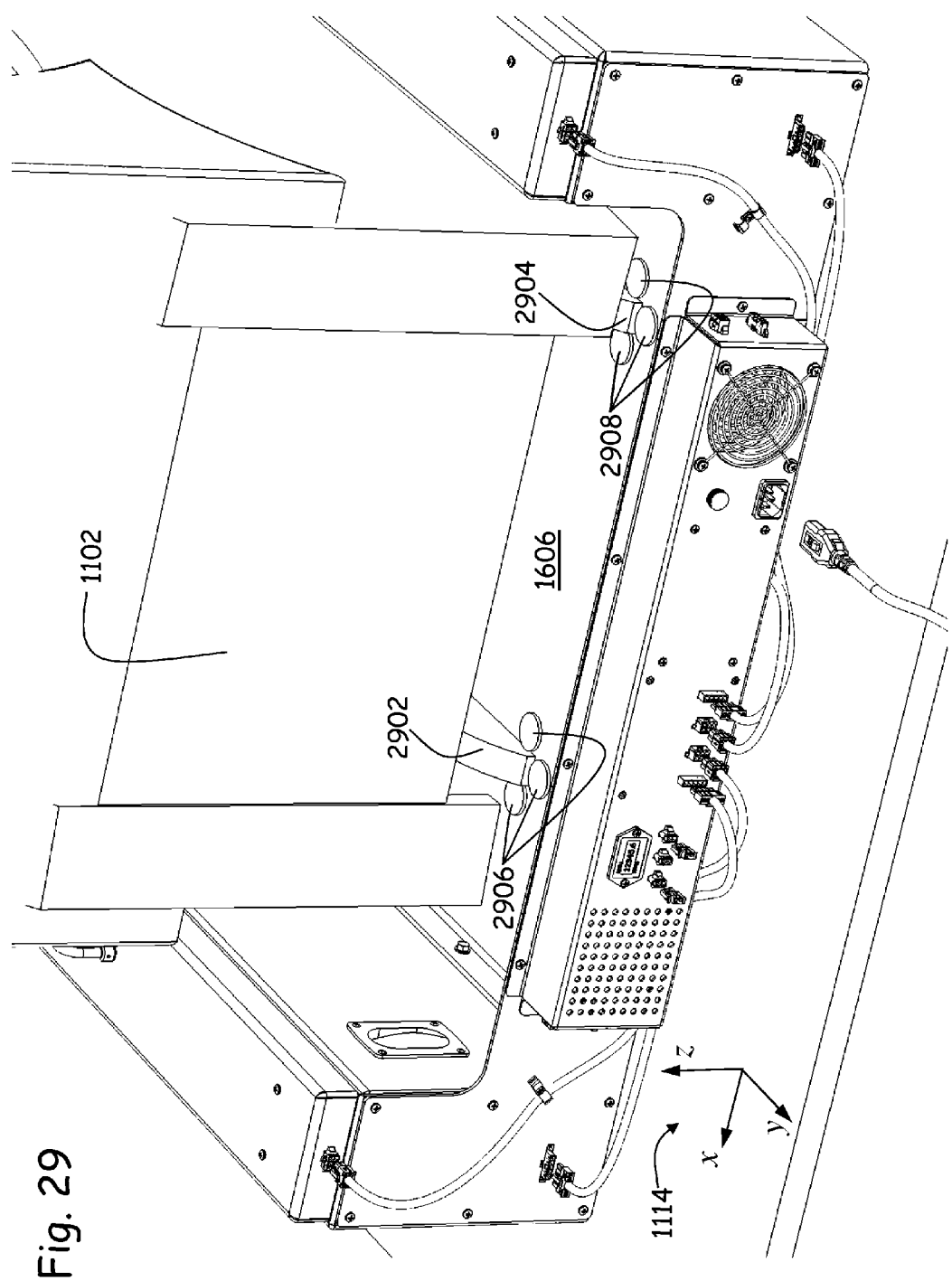
FIG. 29 illustrates means by which a chair 1102 can be prevented from sliding upon a platform surface 1604.

6.6.3 Preventing Sliding of Chair on Platform (FIG. 29)

Referring to FIG. 29, to prevent the chair 1102 from sliding on the platform surface 1606, a plurality of adhesive pads may be applied to the top surface 1606 of platform 1602. For example, a chair such as that shown in FIG. 29 has a base frame comprising a first side member 2902 and a second side member 2904. In such a case, a first set of three adhesive pads 2906 may be adhered to surface 1606 to prevent rearward and lateral motion of the first side member 2902. Likewise, a second set of three adhesive pads 2908 may be adhered to surface 1606 to prevent rearward and lateral motion of the second side member 2904. Similarly, the front ends of the side members 2902 and 2904 may be constrained by analogous placement of sets of three adhesive pads at the front of the first and second side members.

For other types of chair bases, there is typically an arrangement of a plurality of adhesive pads that will constrain movement of the chairs base or legs, so this is a generally applicable means of preventing chair movement on the platform surface 1606. Moreover, the adhesive pads are easily removable when desired, so that the chair lifter may be redeployed repeatedly for different chairs.

7. OPERATION OF FIRST EMBODIMENT

Figure 30:
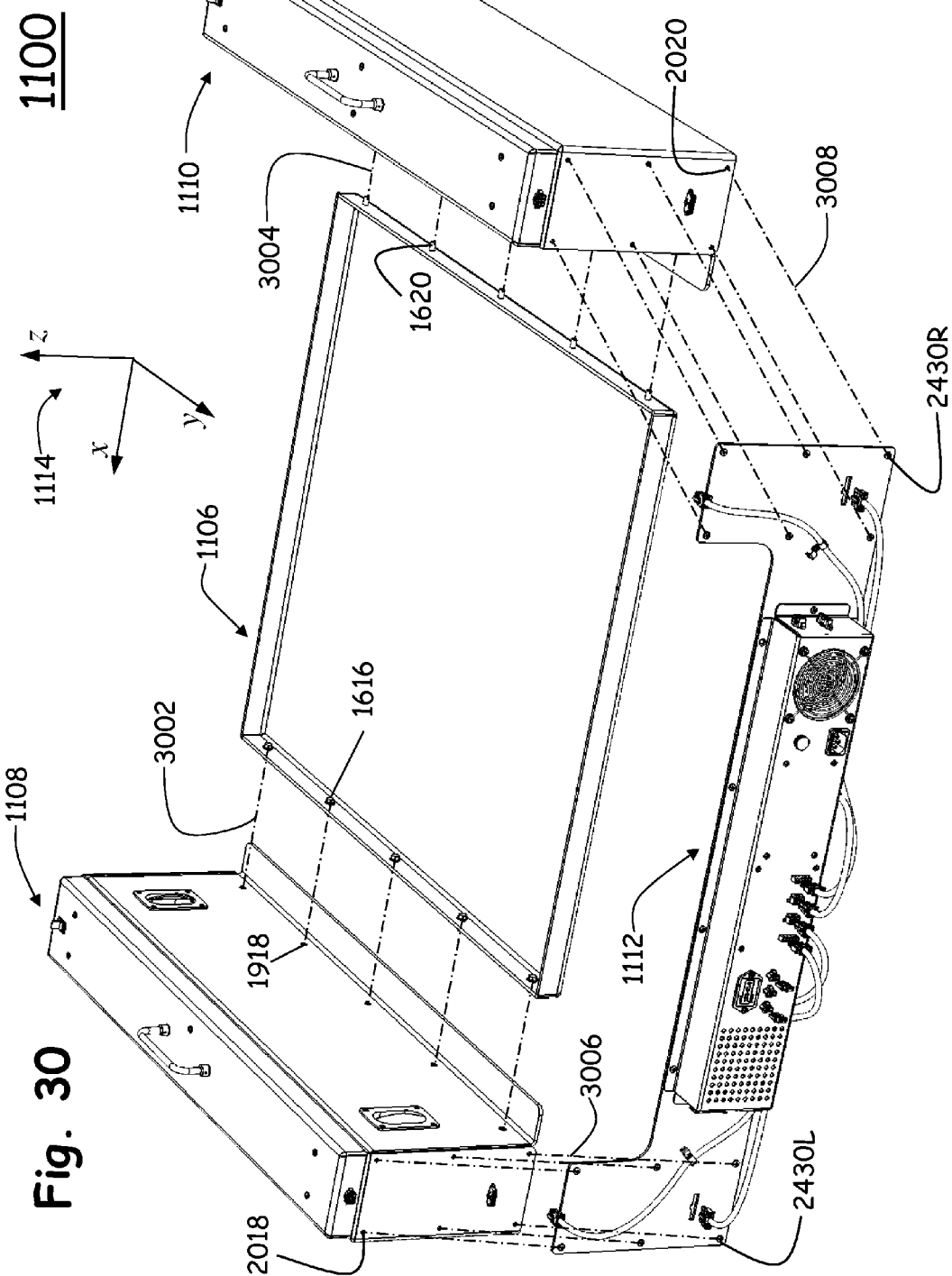
FIG. 30 illustrates a rear-perspective, exploded view of the lifting apparatus 1100, highlighting fasteners used for assembly of the apparatus.
Figure 31:
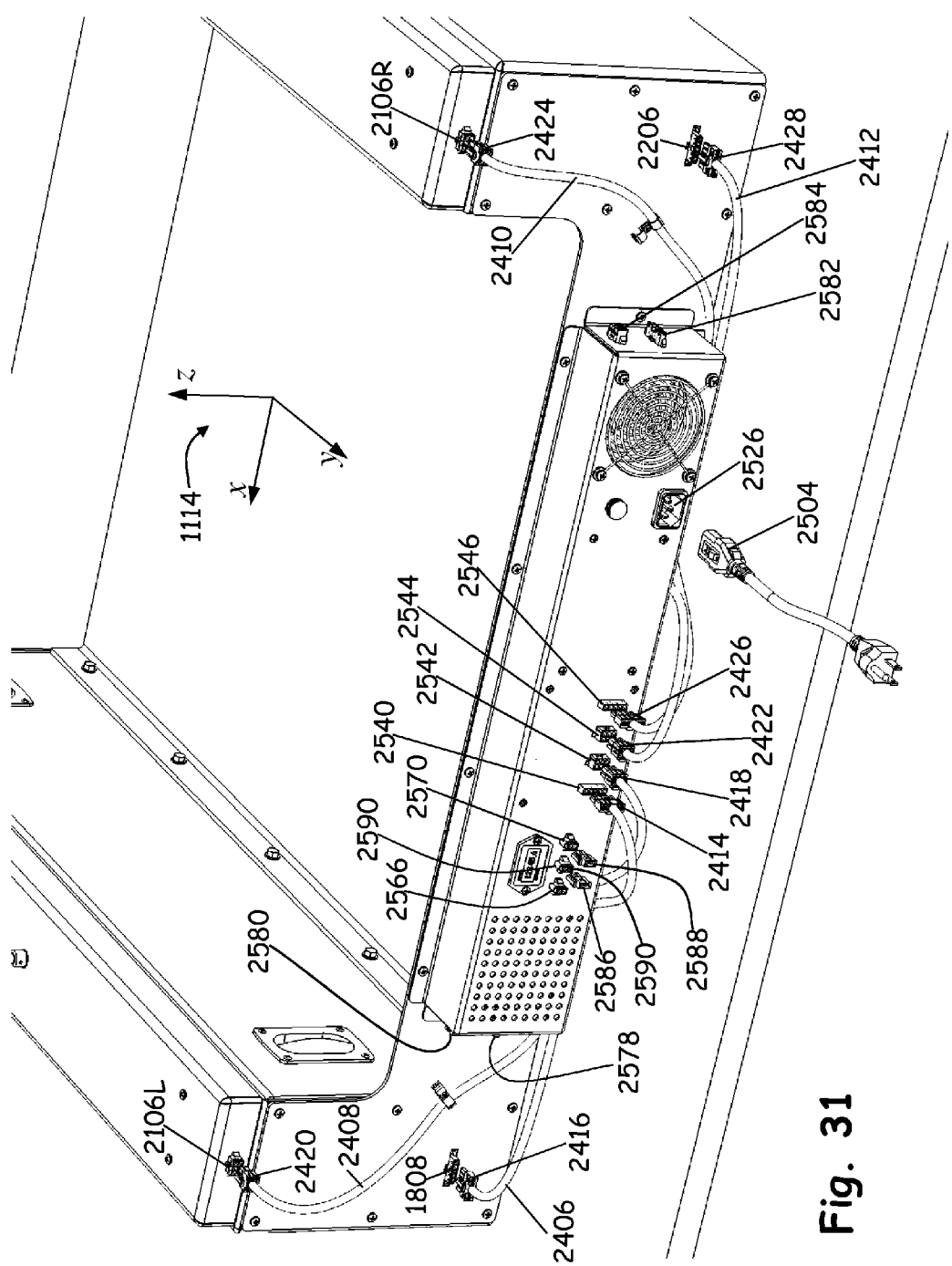
FIG. 31 illustrates various electrical connectors.

7.1 Deployment (FIGS. 29, 30, and 31)

Referring to FIG. 30, which is similar to FIG. 11, the first embodiment may be deployed by assembling the four main sub-assemblies 1106, 1108, 1110, and 1112. Assembly is done with each of the lifter assemblies in its low position. The platform assembly 1106 is assembled to the left lifter assembly 1108 using the plurality of fasteners 1616 that engage the plurality of fasteners 1918 in the left Z-plate assembly 1704L, as shown by dashed lines 3002. The platform assembly 1106 is assembled to the right lifter assembly 1110 using the plurality of fasteners 1620 that engage the plurality of fasteners 1918 (not visible in FIG. 3) in the right Z-plate assembly 1704R, as indicated by dashed lines 3004. The rear assembly 1112 is assembled to the left lifter assembly 1108 using a left portion 2430L of the plurality of fasteners 2430, which engage the plurality of fasteners 2018, as indicated by the dashed lines 3006. The rear assembly 1112 is assembled to the right lifter assembly 1110 using a right portion 2430R of the plurality of fasteners 2430, which engage the plurality of fasteners 2020, as indicated by dashed lines 3008.

Following assembly, all connectors at the rear assembly should be mated to prepare the lifting apparatus for operation. Specifically, referring to FIG. 31, the following pairs of previously introduced connectors are mated; the pairs of connectors are shown unmated on FIG. 31 for clarity:

2504 and 2526. This connects line power to the electronics assembly 2502.
2416 and 1808. This connects the left actuator to cable 2406.
2420 and 2106L. This connects the left switch to cable 2408.
2424 and 2106R. This connects the right switch to cable 2410.
2428 and 2206. This connects the right actuator to cable 2412.
2414 and 2540. This connects cable 2406 to the PCB assembly 2536.
2418 and 2542. This connects cable 2408 to the PCB assembly 2536.
2422 and 2544. This connects cable 2410 to the PCB assembly 2536.
2426 and 2546. This connects cable 2412 to the PCB assembly 2536.
2588 and 2570. This provides power to the tilt switch 2562.
2586 and 2590. This stores the shorting connector 2586 in the dummy connector 2590.

7.2 Mechanical Operation (FIGS. 32A, 32B, 32C, 32D and FIG. 33)

The following sections contain mathematical relationships that relate to mechanical operation of the first embodiment, as well as specific examples of these relationships, specified as certain numeric dimensions and other values. None of these dimensions or values is meant to be limiting; rather, they are exemplary of the first embodiment, as reduced to practice in the prototype.

7.2.1 Basic Operation (FIGS. 32A, 32B, 32C, and 32 D)

Figure 32A:
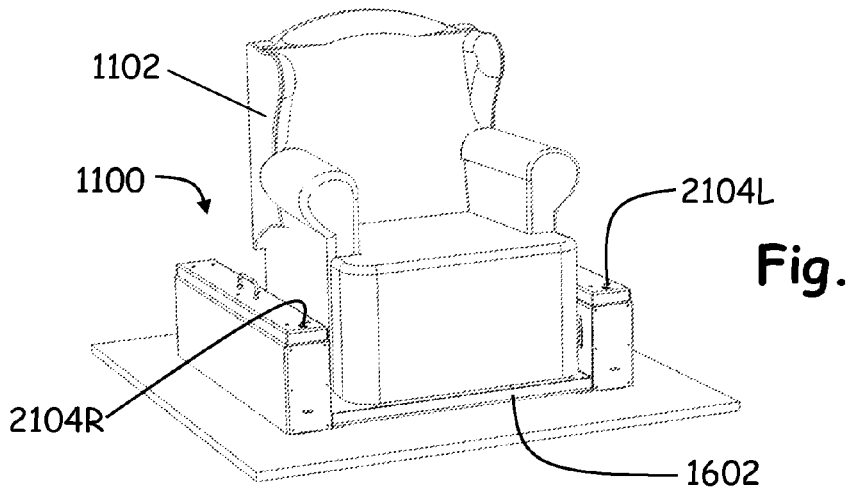
FIG. 32A illustrates operation of the lifter apparatus 1100, showing it in a low position, with a chair as payload.
Figure 32B:
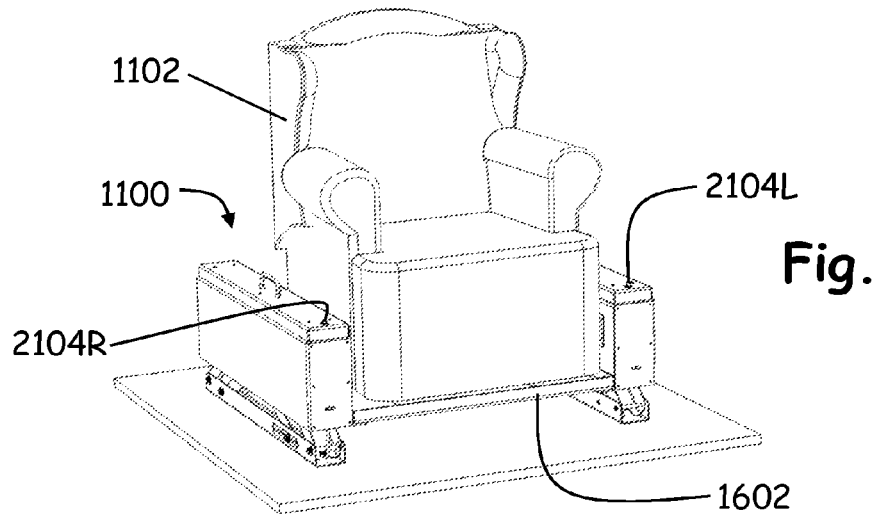
FIG. 32B illustrates operation of the lifter apparatus 1100, showing it in a middle position, with a chair as payload.

When assembly of the lifting apparatus 1100 is complete, the chair 1102 to be lifted is placed upon the top surface 1606 of the platform 1602, as shown in FIG. 32A. In this figure, the lifting apparatus 1100 is in its low position, where the distance R between the floor 1104 and the top surface 1606 of platform 1602 is equal to its minimum value, denoted $R_{SIT}$.

To raise the chair, a user seated thereon manually operates either of the two switches, 2104L or 2104R, from the default "Off" position to the momentary "Extend" position, causing the actuators 1800L and 1800R to lift the two sides of the platform 1602 continuously and substantially in unison. If the user desires less than the maximal sit-to-stand assistance, he or she may release the switch at any time during the motion, causing the actuators to stop immediately and hold at an intermediate position, such as the position shown in FIG. 32B, where $R_{SIT}<R<R_{STAND}$. For the maximum amount of sit-to-stand assistance, the user may hold the switch until the mechanism automatically stops when it reaches its highest possible position, at which point R achieves its maximum value, denoted $R_{STAND}$. This position is shown in FIG. 32C.

When the user wishes to sit, assuming the apparatus has been left in an elevated position, he or she sits upon the elevated seat of the chair and operates either of the two switches, 2104L or 2104R, from the default "Off" position to the momentary "Retract" position, causing the actuators 1800L and 1800R to lower the two sides of the platform 1602 continuously and substantially in unison. For the maximum amount of seated comfort, the user will typically hold the switch until the mechanism automatically stops when R reaches the minimum value $R_{SIT}$. However, the user may release the switch at any time, causing the actuators to stop immediately and hold at any intermediate position.

Figure 32C:
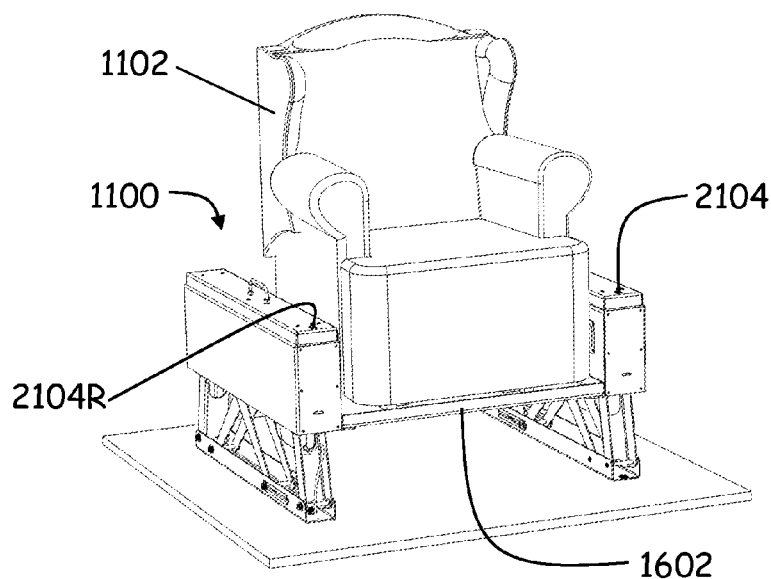
FIG. 32C illustrates operation of the lifter apparatus 1100, showing it in a high position, with a chair as payload.
Figure 32D:
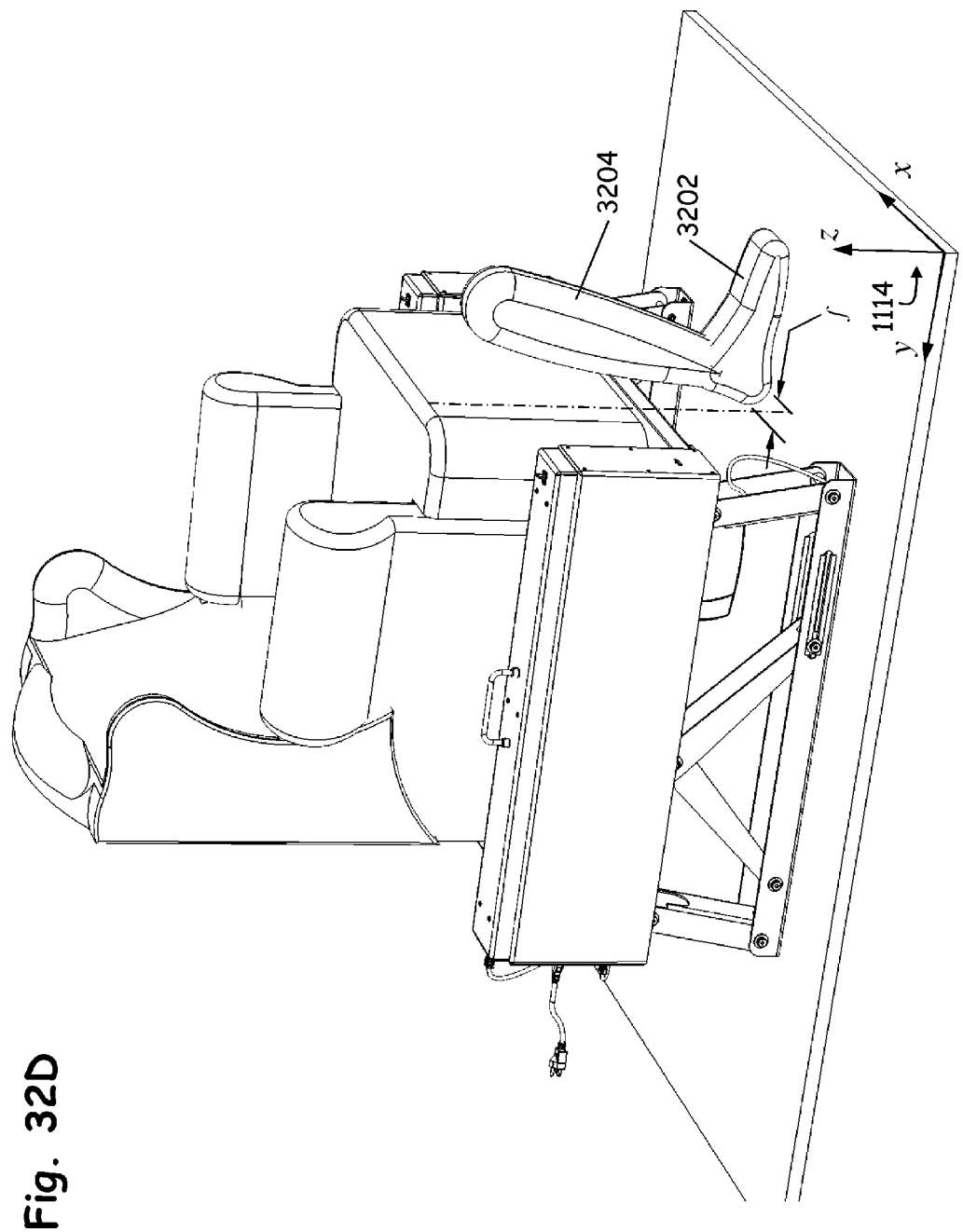
FIG. 32D illustrates "posterior foot placement" for a human foot.

FIG. 32D, like FIG. 32C, illustrates the lifter apparatus 1100 in its high position carrying the chair 1102. Crude models of a human foot 3202 and calf 3204 are also illustrated in FIG. 32D. As suggested by equation (23), the calf is oriented at a 15° angle from vertical, yielding a posterior-foot-placement distance f, measured rearward from the front of the seat to the back of the heel. This illustrates advantage (c) described in Section 3; that is, the lifter assembly imposes no undue limit on f because no member of the assembly, when it an elevated position, occupies space at ground level where the user may wish to place his or her foot: f may be as large the value F indicated by equation (22), thereby assisting further with the sit-to-stand task, as explained under the heading "Third Desirable Attribute" in Section 1.

Figure 33:
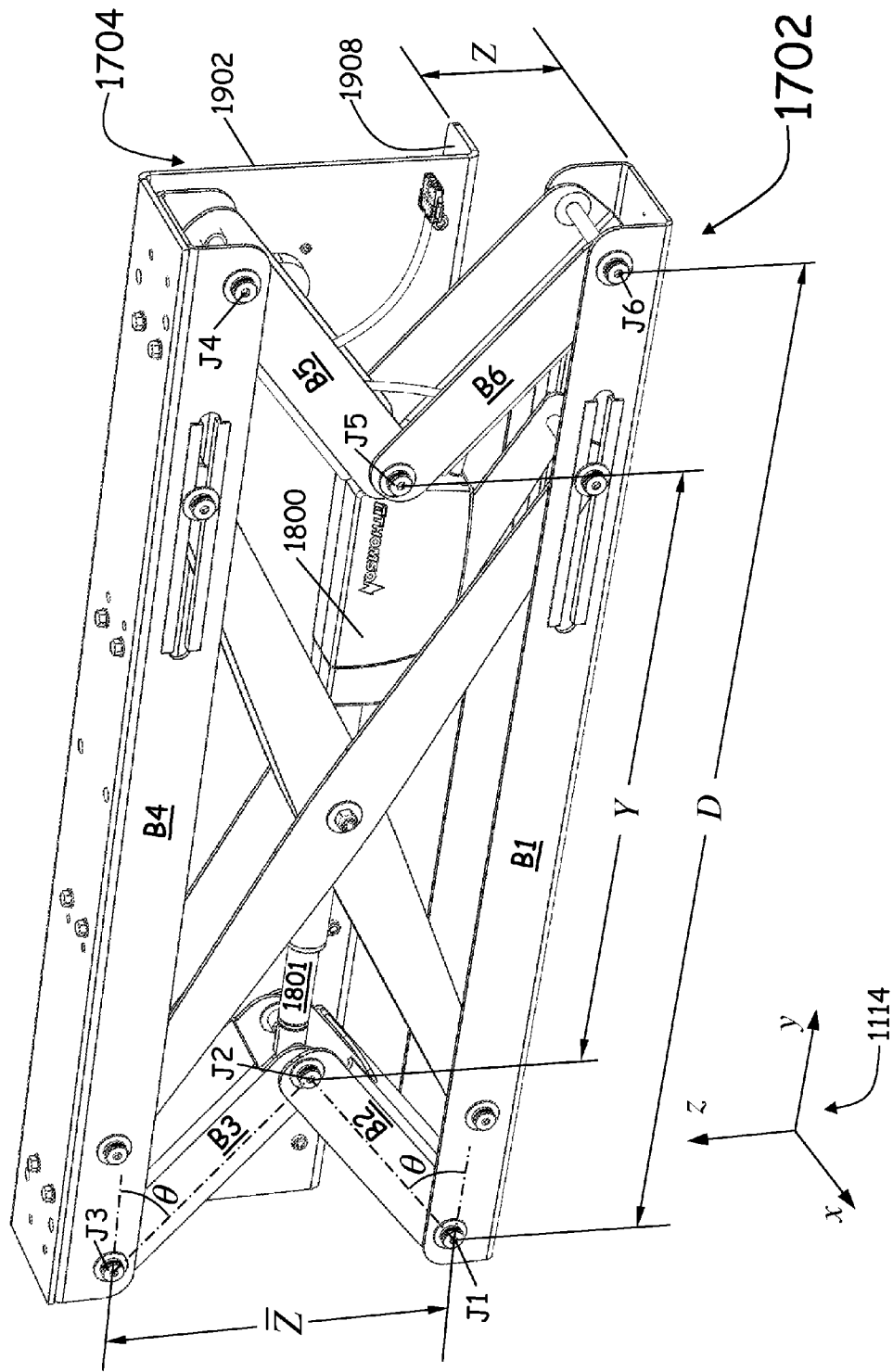
FIG. 33 illustrates a perspective view of the linkage assembly 1702, highlighting its mechanics.

7.2.2 Relation between Piston-Extension Velocity and Lift Velocity (FIG. 33)

Referring to FIG. 33, mechanics of the hex-plus-X linkage 1702 are reviewed; for additional discussion, please refer to Hall (2012). Results of this review are used in Section 7.4, which discusses the tilt switch 2562. As shown on FIG. 33, let $\theta$=The angle between bars B1 and B2 (=angle between bars B3 and B4); (45)

Y=Variable distance in the y direction between joints J2 and J5; (46)

Z=Variable distance in the z direction between joints J1 and J3; (47)

Z=Variable distance in the z direction between the base of bar B1 and the top surface of flange 1908, which is the first horizontal flange of Z plate 1902; (48)

D=Fixed distance in the y direction between joints J1 and J6; (49)

L $\overline{(J1,J2)}=\overline{(J2,J3)}=\overline{(J4,J5)}=\overline{(J5,J6)}$; (50)

where $\overline{(J1,J2)}$ is the distance between joints J1 and J2, and likewise for the other pairs of joints. By inspection of FIG. 33, it follows that Y=D−2 L cos θ; (51)

Z=2 L sin θ. (52)

Let $v_Y$=dY/dt=Piston-extension velocity at which actuator 1800 extends its piston 1801 (53)

$v_Z$=dZ/dt=Lift velocity of bar B4 with respect to stationary bar B1=dZ/dt=Lift velocity of flange 1908 with respect to bar B1 (54)

where t is time. Therefore, taking time derivatives in equations (51) and (52), $v_Y$=dY/dt=2 L sin θdθ/dt, (55)

$v_Z$=dZ/dt=dZ/dt=2 L cos θdθ/dt. (56)

Dividing equation (56) by equation (55) yields $v_Z=v_Y$ cot θ. (57)

That is, the lift velocity $v_Z$ of flange 1908 is related to the piston-extension velocity $v_Y$ in a manner that depends on angle θ. The cotangent function, cot θ, is a decreasing function of θ over the entire range of motion. Consequently, if the piston-extension velocity $v_Y$ is constant throughout the lifting process, the lift velocity $v_Z$ decreases as θ increases. For example, in the prototype of the first embodiment, θ varies from 23.3° in the low position (FIG. 32A) to 79.2° in the high position (FIG. 32C). That is, $$\theta_{MIN}=23.3°; \theta_{MAX}=79.2° \text{ (prototype values)} \tag{58}$$

Thus, using equation (57), $$v_Z=2.32 v_Y \text{ (prototype, in low position),} \tag{59}$$

$$v_Z=0.19 v_Y \text{ (prototype, in high position),} \tag{60}$$

7.2.3 Mechanical Advantage and Maximum Lifting Force

As derived in Hall (2012), the mechanical advantage MA of a hex-plus-X linkage such as the left linkage 1702 in FIG. 22A, or the mechanically identical right linkage 2202 in FIG. 22B, is, referring to the nomenclature of FIG. 33, $$MA \equiv P/F = \tan \theta = Z/D - Y, \tag{61}$$

where $$P \equiv \text{Vertical load applied to the top surface of bar B4} \tag{62}$$

$$F \equiv \text{Horizontal compressive load through the actuator} \\ \text{\textbf{1800} and its piston \textbf{1801}} \tag{63}$$

For the prototype linkage, θ varies from 23.3° in the low position (FIG. 32A) to 79.2° in the high position (FIG. 32C). Consequently, according to equation (61), the minimum mechanical advantage, in the low position, is $$(MA)_{MIN}=0.43 \tag{64}$$

and the maximum mechanical advantage, in the high position, is $$(MA)_{MAX}=5.24. \tag{65}$$

Lifting capacity of the linkage is determined by $(MA)_{MIN}$. As previously stated in Section 6.3.1, the actuators used in the prototype are Thomson WhisperTrak™ actuators, chosen for their compact size and quiet operation. For this actuator, a maximum deliverable force is $$F_{MAX}=2000[\text{N}]=450[\text{lbs}] \text{ (Thomson WhisperTrak actuator).} \tag{66}$$

Consequently, a maximum deliverable lifting force $P_{MAX}$ for a single hex-plus-X linkage such as 1702 using the Thomson WhisperTrak™ actuator is $$P_{MAX}=F_{MAX}\tan(23.3°)=861 \text{ [N]}=194[\text{lbs}] \text{ (Thomson WhisperTrak actuator)} \tag{67}$$

Consequently, even though the hex-plus-X linkage has mechanical advantage that is superior to prior art, as discussed in Hall (2012), it is insufficient to allow a single Thomson WhisperTrak™ actuator to lift a combined weight of a large reclining chair and a large person, because the large reclining chair typically weighs 450 to 500 N (90 to 110 lbs), and the large person typically weighs 900 to 1100 N (200 to 250 lbs). The combined weight is thus 1350 to 1600 N (290 to 360 lbs), which exceeds the capacity of the single actuator stated in equation (67). However, the two-actuator design of the lifting apparatus disclosed herein, wherein the left actuator 1800L and the right actuator 1800R together lift the load, is ideally suited to the task of lifting the large chair occupied by the large person with compact, quiet actuators such as the Thomson WhisperTrak™:

$$\text{Lifting capacity of lifter apparatus}=2P_{max}= \\ 1722[\text{N}]=387 \text{ [lbs] (assuming Thomson WhisperTrak™ actuators).} \tag{68}$$

The above calculations for the prototype lifting apparatus are not meant to be limiting. Greater lifting capacity is attainable using actuators that are more powerful than the WhisperTrak™ actuators assumed, although such actuators are typically larger and noisier.

Figure 34:
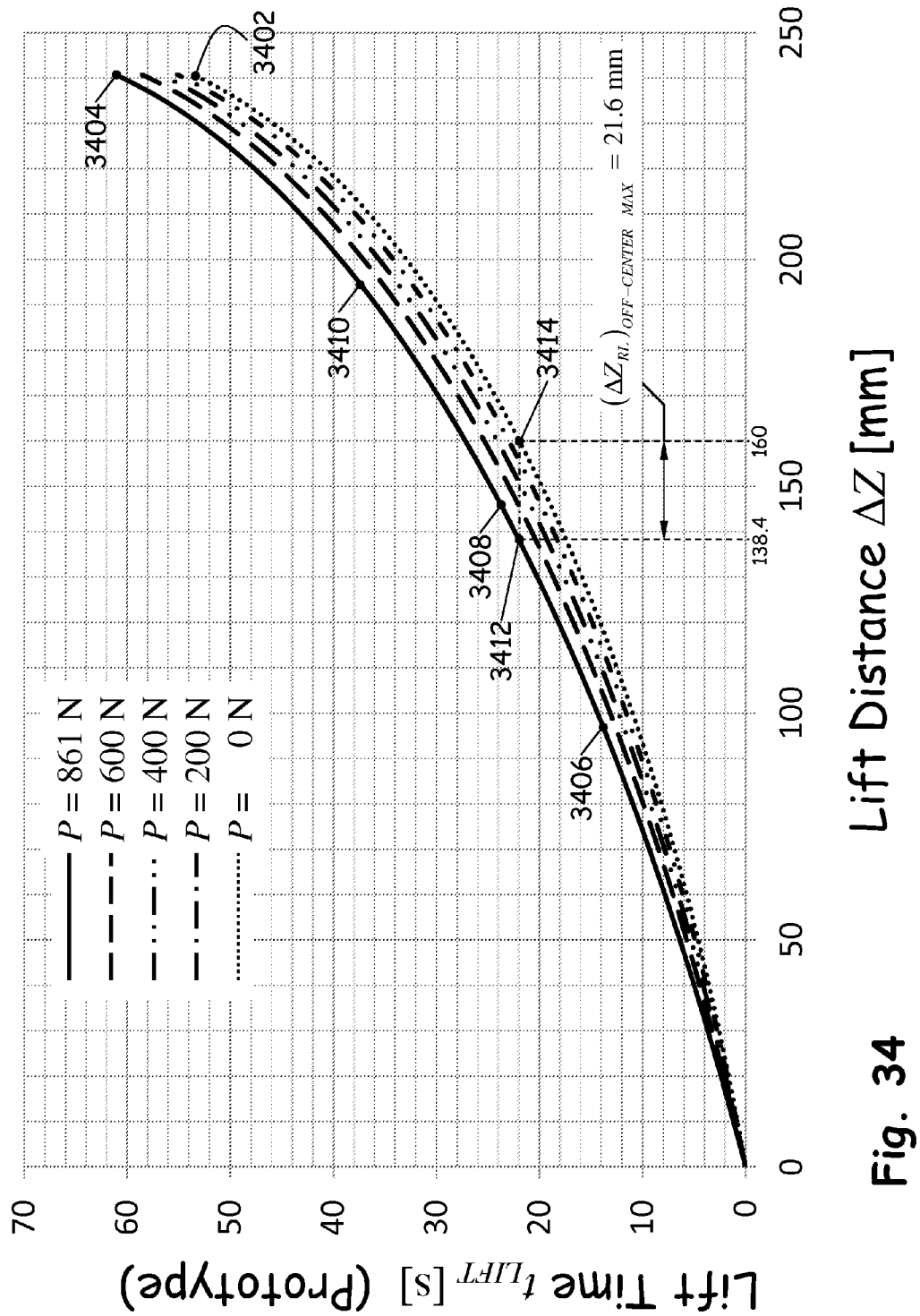
FIG. 34 is a graph of lift time versus lift distance, under various applied loads, for the prototype of the first embodiment.

7.2.4 Lift Time (FIG. 34)

The time $t_{LIFT}$ required for the chair to be lifted from a position where $\theta=\theta_1$ to a position where $\theta=\theta_2>\theta_1$ is, using equation (55), $$t_{LIFT}=\int dt = \int_{\theta_1}^{\theta_2} \frac{dt}{d\theta} d\theta = \int_{\theta_1}^{\theta_2} \frac{2L\sin\theta}{v_Y} d\theta. \tag{69}$$

For many actuators, the piston-extension speed $v_Y$ decreases with piston load F according to $$v_Y=a-bF, \tag{70}$$

where a and b are constant for a given actuator. For example, for the Thomson WhisperTrak™ actuator used in the prototype, the piston-extension velocity $v_Y$ varies linearly from 5.60 mm/s at zero load to 3.70 mm/s at the full load of 2000 N (450 lbs). Consequently, with velocity expressed in mm/s and force expressed in Newtons, for the WhisperTrak™ actuators used in the prototype, mm/s $$a=5.60 \text{ [m/s]}; b=0.000950 \text{ (Thomson WhisperTrak).} \tag{71}$$

Using equation (61), the piston load F depends on the applied load P and angle θ according to $$F=P \cot \theta. \tag{72}$$

Substituting equations (70) and (72) into equation (69) yields $$t_{LIFT}=\int_{\theta_1}^{\theta_2} \frac{2L\sin\theta}{a-bP\cot\theta} d\theta = \\ \frac{2L}{a}\int_{\theta_1}^{\theta_2} \frac{\sin\theta}{1-k\cot\theta} d\theta = \frac{2L}{a}[I(\theta_2, k)-I(\theta_1, k)], \tag{73}$$

where a dimensionless load k is defined as $$k \equiv bP/a, \tag{74}$$

and an indefinite form of the integral in equation (73) is denoted $$I(\theta, k) \equiv \int^\theta \frac{\sin u}{1-k\cot u} du, \tag{75}$$

where u is a dummy variable of integration. To solve the integral in (75), assume $$k \cot \theta<1 \text{ for all values of k and } \theta, \tag{76}$$

an assumption that is justified for the prototype because, using equations (58), (67), (71), and (74), $$k \cot \theta \leq k \cot \theta_{MIN}=(0.1461)(2.3220)=0.3392. \tag{77}$$

Equation (76) implies that the denominator of the integrand in equation (75) may be expanded as a Taylor's series:

$$1/1-k \cot u=1+k \cot u+(k \cot u)^2+(k \cot u)^3+\ldots \tag{78}$$

Substituting equation (78) into equation (75) yields $$I(\theta, k) = \int^\theta \sin u\, du + k \int^\theta \cos u\, du + \qquad (79)$$
$$k^2 \int^\theta \frac{\cos^2 u}{\sin u} du + k^3 \int^\theta \frac{\cos^3}{\sin^2 u} du + \ldots = -\cos\theta + k\sin\theta +$$
$$k^2\left[\cos\theta + \log\left(\sin\frac{\theta}{2}\right) - \log\left(\cos\frac{\theta}{2}\right)\right] + k^3[-\sin\theta - \cos\theta] + \ldots$$

Equation (73) states that $t_{LIFT}$ is a function of $\theta_1$, $\theta_2$, and k, which may be expressed by writing $$t_{LIFT} = t_{LIFT}(\theta_1, \theta_2, k) = 2\,L/a[1(\theta_2,k) - 1(\theta_1,k)]. \qquad (80)$$

Thus, the solution for lift time $t_{LIFT}(\theta_1, \theta_2, k)$ involves evaluating equation (79) for $\theta = \theta_1$ and $\theta = \theta_2$.

Consider in particular the computation of $t_{LIFT}(\theta_{MIN}, \theta, k)$ for the prototype. That is, consider the lift time $t_{LIFT}$ required to start from the low position $\theta_{MIN}$ and proceed to an arbitrary angle $\theta$. The lift time $t_{LIFT}$ may then be plotted vs. $\theta$ for various values of the dimensionless load k. A better way to make such a plot is to use, as the independent variable, instead of the hard-to-measure angle $\theta$, an easy-to-measure lift distance $\Delta Z$, defined in accordance with equation (52) as $$\Delta\bar{Z}(\theta) = \Delta Z(\theta) \equiv 2\,L(\sin\theta - \sin\theta_{MIN}). \qquad (81)$$

That is, for each value of $\theta$ over the range $$(\theta_{MIN}, \theta_{MAX}) = (23.3°, 79.2°) \text{ (prototype)}, \qquad (82)$$

$t_{LIFT}$ and $\Delta Z$ are computed, and $t_{LIFT}$ is plotted vs. $\Delta Z$. Such a computation is done for several values of the dimensionless load k, which is related to the load P according to equation (74). In the prototype, $$L = 205.06 \text{ [mm] (prototype)}, \qquad (83)$$

so the constant in equation (80) is $$2\,L/a = 73.2 \text{ [s] (prototype)}. \qquad (84)$$

The result of such computations for the prototype is shown in FIG. 34, where $\Delta Z = 0$ corresponds to $\theta_{MIN}$, and $$\Delta Z_{MAX} = 243 \text{ mm} \qquad (85)$$

corresponds to $\theta_{MAX}$. FIG. 34 shows five curves, corresponding to five values of the applied load P ranging from zero load (P=0) to full load (P $P_{MAX}$=861 N), as previously calculated in equation (67).

Referring to FIG. 34, several conclusions may be drawn:

First, defining a "full lift" as a lift from $\Delta Z=0$ to $\Delta Z = \Delta Z_{MAX}$, a full lift under zero load, indicated by point 3402 on FIG. 34, requires a lift time $$t_{LIFT}(\theta_{MIN}, \theta_{MAX}, 0) = 53.5 \text{ [s] (prototype: full lift, zero load, theoretical)}, \qquad (86)$$

whereas a full lift under full load, indicated by point 3404 on FIG. 34, requires a lift time $$t_{LIFT}(\theta_{MIN}, \theta_{MAX}, k_{MAX}) = 61.2 \text{ [s] (prototype: full lift, full load, theoretical)}. \qquad (87)$$

Theory may be compared to experiment by timing actual prototype lift time when the prototype lifting apparatus is fully assembled but no payload is placed on the platform 1602. In this case, each actuator bears the combined weight of half the platform, a Z plate, a shroud, and other elements of the lifter assembly, which is about 150 N. For this load, theoretical lift time, reading from FIG. 34, is about 54 seconds, whereas the experimentally obtained value is about 57 seconds. This agreement is reasonably close.

The above calculations for the prototype lifting apparatus are not meant to be limiting. Faster lift times are attainable using actuators whose pistons extend at a faster velocity than those for the WhisperTrak™ actuators used in the prototype; however, achieving such a faster velocity at the same load rating requires higher-power actuators that are typically larger and noisier.

A second conclusion that may be drawn from FIG. 34 is that the early part of the lift (small values of $\Delta Z$) is accomplished relatively quickly compared to the latter part of the lift (large values of $\Delta Z$). For example, at full load, although achieving the full lift distance of $\Delta Z_{MAX}$=243 mm requires $t_{MAX}$=61.2 seconds, as stated in equation (87), 40% of the lift distance (97 mm) is achieved in only 23% of $t_{MAX}$ (~14 seconds), as shown by point 3406 on FIG. 34; 60% of the lift distance (146 mm) is achieved in only 39% of $t_{MAX}$ (~24 seconds), as shown by point 3408; and 80% of that distance (194 mm) is achieved in only 61% of $t_{MAX}$ (~37 seconds), as shown by point 3410. Consequently, a user requiring only a partial lift ($\Delta Z < \Delta Z_{MAX}$) may experience a considerably shorter lift time than a user requiring a full lift.

A third conclusion that may be drawn from FIG. 34, relating to tilt, is discussed in the next section.

7.2.5 Tilt Mechanics

The use of two actuators is a feature that distinguishes the lifting apparatus described herein from prior-art, retrofittable chair-lifting mechanisms, which use only one actuator. Use of two actuators allows the lifter assemblies to lift from the sides rather than from underneath, leading to many of the advantages previously stated in Section 3 and reviewed in Section 7.3. Use of two actuators also allows compact, quiet actuators, such as the Thomson WhisperTrak™ actuators, to be used, as described in Section 7.2.3. For all of these reasons, the use of two actuators rather than one is advantageous. However, using two actuators presents a challenge: to assure that surface 1606 of the platform 1602 does not develop a dangerous, left-to-right tilt.

Tilt may occur for two reasons:

(1) Failure. One of the actuators, or an electronic component required to drive it, fails, while the other actuator continues to function.

(2) Off-center loading. The payload is placed off-center upon the platform 1602, such that the load on the left and right lifter assemblies differ.

Referring to definition (81) of the lift distance $\Delta Z$, let $\Delta Z_L$=Lift distance $\Delta Z$ for the Left lifter assembly $\Delta Z_R$=Lift distance $\Delta Z$ for the Right lifter assembly $\qquad$ (88)

and define a difference in the lift distances for the right and left sides as $$\Delta Z_{RL} \equiv \Delta Z_R - \Delta Z_L. \qquad (89)$$

Let $(\Delta Z_{RL})_{FAILURE}$ = A difference in left and right lift distances due to failure, as described in item (1) above $\qquad$ (90)

$(\Delta Z_{RL})_{OFF\text{-}CENTER}$ = A difference in left and right lift distances due to off-center loading, as described in item (2) above $\qquad$ (91)

$(\Delta Z_{RL})_{FAILURE}$ is critical—if one actuator fails but the other doesn't, $(\Delta Z_{RL})_{FAILURE}$ may become as large as $\Delta Z_{MAX}$, and the chair may tip over. Of course, a user that senses excessive tilt may release the switch (2104L or 2104R) at any time, but an unwitting user may fail to do so. Consequently, it is desirable that excessive tilt be actively prevented. This is accomplished in one or more embodiments by the tilt sensor 2562, shown on FIG. 25, which prevents excessive tilt in conjunction with an electrical circuit described in Section 7.3.

Consider $(\Delta Z_{RL})_{OFF\text{-}CENTER}$. For example, suppose the chair is placed off-center because, as is often the case with reclining chairs, there is reclining-actuation handle on one side, or suppose the user's weight if off-center because the user leans to one side during the lifting process. For these reasons, different curves in FIG. 34 will apply to the left and right lifter assemblies, so that at a given time, the lift heights $\Delta Z_R$ and $\Delta Z_L$ will differ by the amount $(\Delta Z_{RL})_{OFF\text{-}CENTER}$. The worst (largest) possible magnitude of $(\Delta Z_{RL})_{OFF\text{-}CENTER}$, denoted $(\Delta Z_{RL})_{OFF\text{-}CENTER\_MAX}$, where full load is imposed on one of the actuators and zero load is imposed on the other—is determined by finding the largest horizontal distance on FIG. 34 between the curve for P=0 and the curve for P=$P_{MAX}$=861N. This maximum appears to occur at about $t_{LIFT}$=22 seconds, at points 3412 and 3414 on the full-load and zero-load curves, respectively. Consequently, as stated on FIG. 34, $$(\Delta Z_{RL})_{OFF\text{-}CENTER\_MAX} = 21.6 \text{ mm} \tag{92}$$

To determine the tilt angle corresponding to $(\Delta Z_{RL})_{OFF\text{-}CENTER\_MAX}$, let $\varphi$ =Tilt angle, about the y axis, between the xy plane and the surface 1604 of platform 1602; defined as positive, also referred to as "counterclockwise" (CCW), if $\Delta Z_{RL}$>0; and defined as negative, also referred to as "clockwise" (CW), if $\Delta Z_{RL}$<0. $\tag{93}$ That is, referring to equation (93), imagine a person sitting in the chair looking straight ahead at a wall clock. Tilt angle $\phi$ is defined to be counterclockwise (positive) if the platform is higher on the right side (−x) than on the left side (+x) because the person's sight line is tilted counterclockwise; conversely, it is defined to be clockwise (negative) if the platform is higher on the left side than on the right side.

Figure 28A:
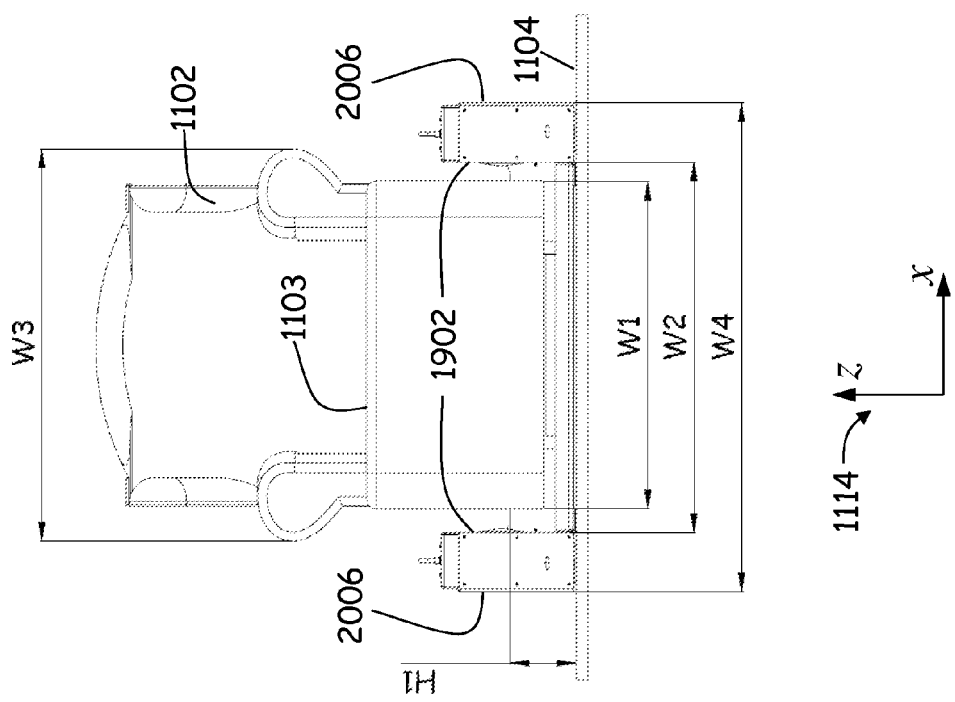
FIG. 28A illustrates a front, dimensioned view of the lifting apparatus 1100 and the chair 1102.
Figure 28C:
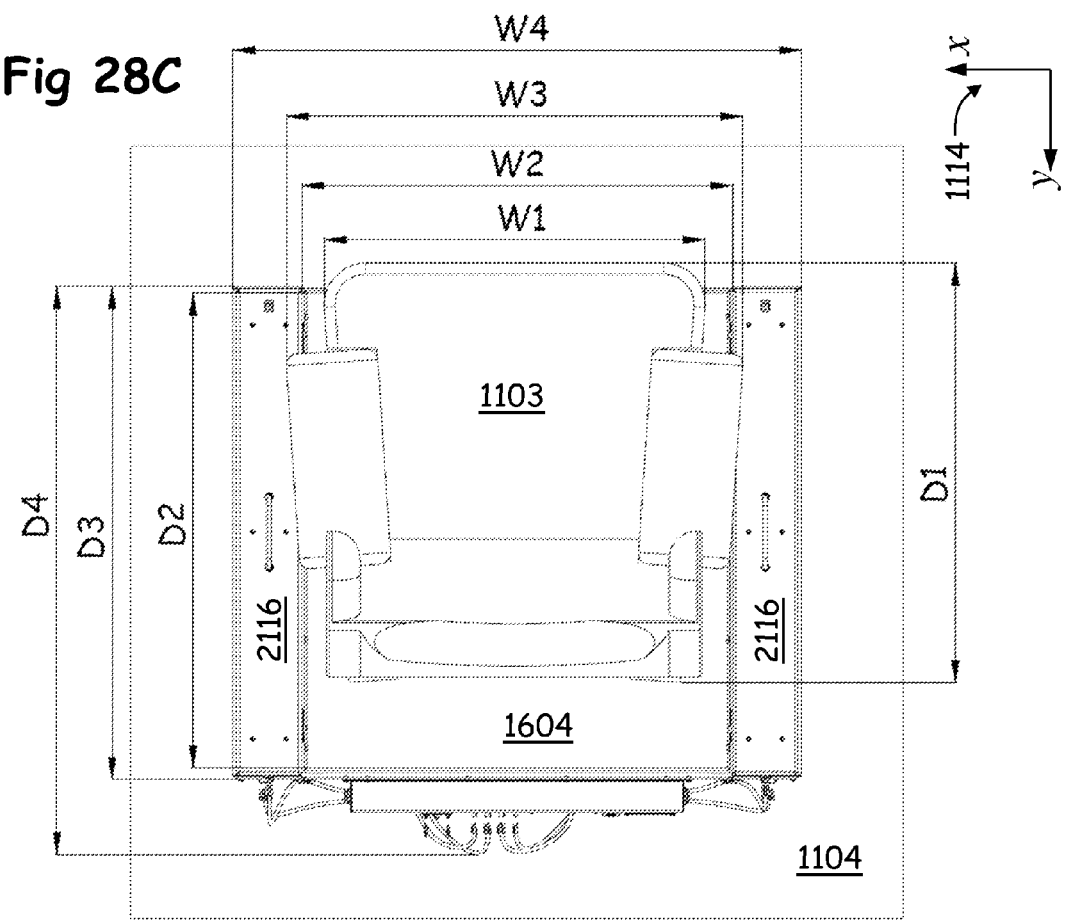
FIG. 28C illustrates a top, dimensioned view of the lifting apparatus 1100 and the chair 1102.
Figure 28D:
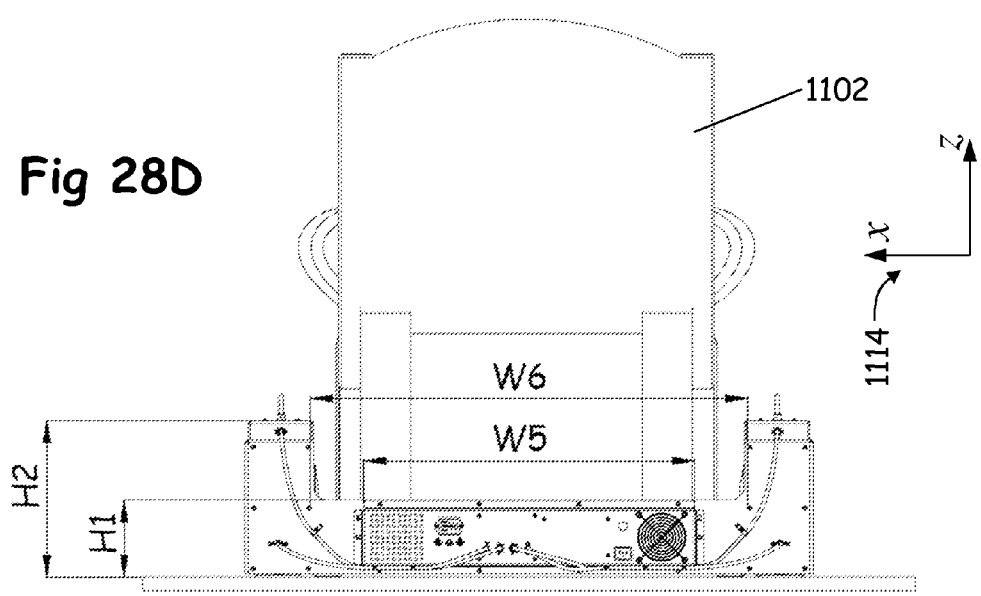
FIG. 28D illustrates a rear, dimensioned view of the lifting apparatus 1100 and the chair 1102.

Referring to definitions (88) and (89), as well as to FIG. 33 and FIG. 28A, it follows from definition (93) that the tilt angle due to off-center loading is $$\varphi_{OFF\text{-}CENTER} = \tan^{-1}\left(\frac{(\Delta Z_{RL})_{OFF\text{-}CENTER}}{W2}\right). \tag{94}$$

From equation (92) and $$W2 = 780 \text{ mm (prototype)}, \tag{95}$$

it follows that the maximum tilt angle attributable to off-center load is $$\varphi_{OFF\text{-}CENTER\_MAX} = \tan^{-1}\left(\frac{(\Delta Z_{RL})_{OFF\text{-}CENTER\_MAX}}{W2}\right) \tag{96}$$

$$= \tan^{-1}\left(\frac{21.6}{780}\right) = 1.6° \text{ (prototype)}.$$

This is a small angle that is unlikely even to be even noticed by the user, let alone to be dangerous.

Consequently, the reason for the tilt sensor 2562 is primarily reason (1)—potential failure of an actuator or other electronic component. The maximum tilt angle that can occur due to failure of an actuator is $$\varphi_{FAILURE\_MAX} = \tan^{-1}\left(\frac{\Delta Z_{MAX}}{W2}\right). \tag{97}$$

In particular, for the prototype, $$\varphi_{FAILURE\_MAX} = \tan^{-1}(242.8/780) = 17.3° \text{ (prototype)}. \tag{98}$$

This is a large tilt angle that may well be dangerous. It is addressed in one or more embodiments by the tilt sensor 2562 and an electrical circuit that acts upon the tilt sensor's output to limit the tilt angle, as described in Section 7.4.

The calculations above are not meant to be limiting. They are merely exemplary of the prototype.

Figure 35A:
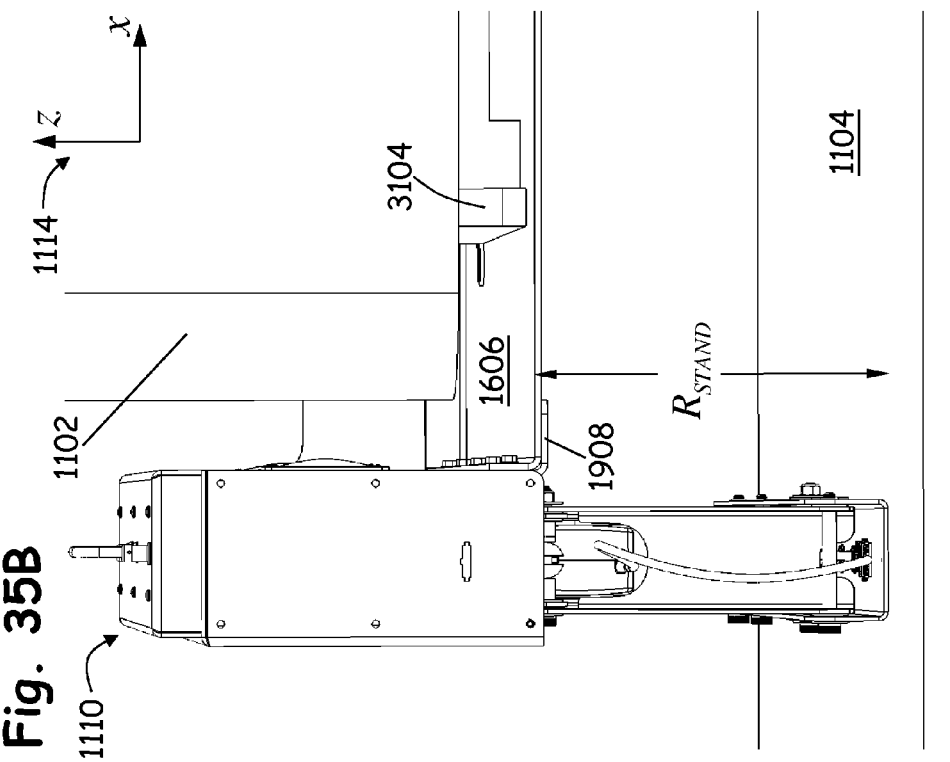
FIG. 35A illustrates a low position of the lifter apparatus 1100, showing the parameter $R_{SIT}$.
Figure 35B:
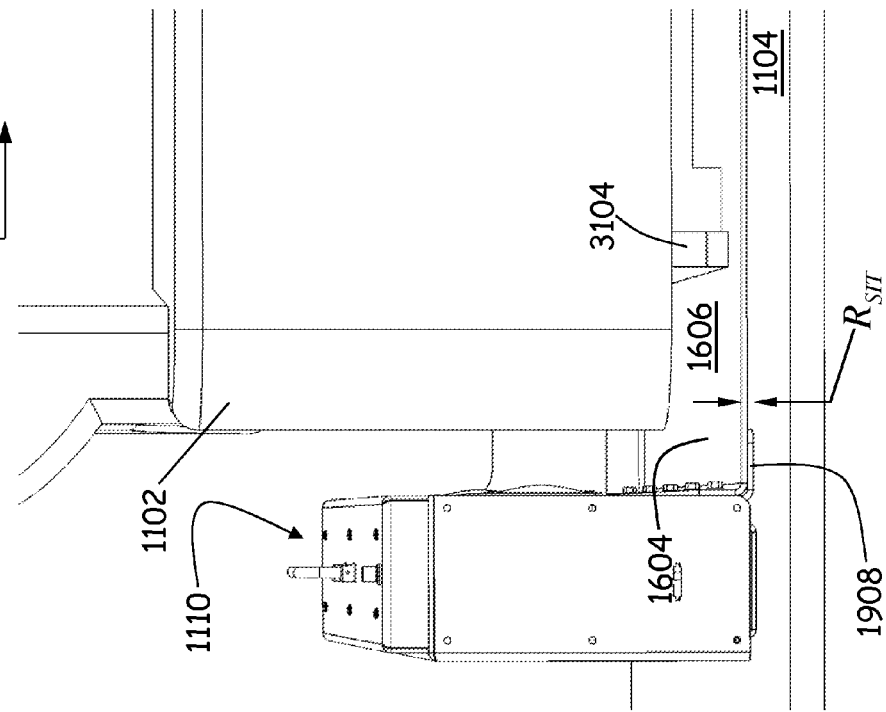
FIG. 35B illustrates a high position of the lifter apparatus 1100, showing the parameter $R_{STAND}$.

7.3 Realization of Advantages (FIGS. 35A and 35B)

From the above description of the structure, deployment, and mechanical operation of the chair-lifting apparatus described herein, it is clear that the advantages stated in Section 2 are realized.

Advantage (a)—satisfaction of requirement (18)—is realized by the prototype of the first embodiment described here, for which $$\Delta R = R_{STAND} - R_{SIT} = 243 \text{ mm} = 9.6\text{"}. \tag{99}$$

No prior-art, retrofittable chair lifter provides such a full measure of sit-to-stand assistance.

Advantage (b)—satisfaction of requirement (19)—is likewise realized by the prototype embodiment, for which $$R_{SIT} \approx 12 \text{ mm}. \tag{100}$$

No prior-art retrofittable chair lifter provides such a comfortable sitting position so close to the ideal value of $R_{SIT}$=0.

The values of $R_{SIT}$ and $R_{STAND}$ are illustrated in FIGS. 35A and 35B, which correspond to the low position and the high position of the lifting apparatus, respectively. In these figures, the front flange 1614 of the platform 1602 has been artificially removed to reveal clearly the base of the chair, in particular the base member 3104, which rests on the surface 1606 of platform 1602. The small value of $R_{SIT}$ stated in equation (100)—the distance from the floor surface 1104 to the platform surface 1606 with the lifting apparatus in the low position—is achieved because the lifting mechanism is not underneath the chair as it is in prior art. Consequently, as illustrated by FIG. 35A, $R_{SIT}$ approaches a combined material thickness defined as the sum of the thickness of the first horizontal flange 1908 of Z plate 1902 and the thickness of the base flange 1604 of platform 1602.

Advantage (c)—satisfaction of requirement (24)—is also realized by the first embodiment because, as clearly shown in FIGS. 32D, when the apparatus is in an elevated position, no portion of the structure interferes with posterior foot placement. In fact, there are no cross struts near the floor anywhere front to back, so there is absolutely no possibility of undue interference with the user's foot placement.

Advantage (d)—universal applicability as a retrofit for all types of chairs—is achieved by the first embodiment because the chair rests simply on the substantially planar platform surface 1606, rather than on struts or bars as in prior-art retrofits. The platform is a surrogate floor, so no engineering is necessary to adapt the chair to the retrofit or vice versa. The chair is simply placed upon the platform. The platform is designed to remain level rather than tilt forward; so no chair-specific engineering is required to secure the chair to the retrofit for the sake of safety, as in the prior art. At most, shifting of the chair on the platform in the x and y directions may be eliminated by simple adhesive pads, as explained in Section 7.2 and shown on FIG. 29. The chair is not altered in any way. Chairs of various widths may be handled, without excessive width overhead, by the means discussed in Section 6.6.1.

Advantage (e)—making no limiting assumption about available space under the chair seat—is also achieved because the lifting apparatus has a substantially flat platform.

Advantage (f)—easy deployability—is achieved partially for reasons discussed in connection with advantage (d), but also because the lifting apparatus has been designed to disassemble into just four sub-assemblies, as shown on FIG. 15, each of which may be easily transported and stored. Specifically, each of the lifter assemblies, 1108 or 1110, weighs about 16.5 kg (36.4 lbs), and is provided with the carrying handle 2112. The platform assembly 1106 weighs about 9.3 kg (20.5 lbs) and is easy to transport because its z dimension is small. The rear assembly 1112 weighs about 3 kg (6.6 lbs), with means provided to secure loose cable ends, for their protection during storage and transport.

7.4 Electrical Operation (FIGS. 36A through 36I and FIG. 37)

Referring to FIG. 36A, electrical operation of the lifting apparatus is described below in terms of a schematic diagram of an electrical circuit that illustrates electrical interconnections between electronics components previously enumerated in Sections 6.5.1 and 6.5.2 and previously illustrated on FIG. 24 through FIG. 27. Specifically, FIG. 36A illustrates electrical connections between the following thirteen components:

| Reference Numeral | Description |
| --- | --- |
| 1800L | Left Actuator |
| 1800R | Right Actuator |
| 2104L | Left Switch, DP3T |
| 2104R | Right Switch, DP3T |
| 2532 | Power Converter |
| 2562 | Tilt Sensor |
| 2712 | Hour Meter |
| 2718 | Fan |
| 2720 | CW Tilt Relay |
| 2722 | Extend Relay |
| 2724 | Retract Relay |
| 2726 | CCW Tilt Relay |
| 2728 | Diodes (4X) |

The power supply 2532 creates a high voltage level referred to as "24 VDC", as well as a low voltage level referred to as "Gnd". This voltage difference powers the other devices.

For purposes of this discussion, the left actuator 1800L is assumed to comprise, like the Thomson WhisperTrak™ actuators used in the prototype, five connections, including two power connections for 24VDC and Gnd as well as three signal connections referred to as ExtL, RetL, and ComL. Similarly, the right actuator 1800R comprises five connections, including two power connections for 24VDC and Gnd as well as three signal connections referred to as ExtR, RetR, and ComR. Although the left actuator 1800L is constantly supplied with the power connections 24VDC and Gnd, its piston remains stationary unless ExtL is shorted to ComL, in which case the left-actuator's piston extends at the piston-extension velocity $v_Y$ defined by equation (53), or unless RetL is shorted to ComL, in which case the left-actuator's piston retracts at velocity $v_Y$. Similarly, although the right actuator 1800R is constantly supplied with the power connections 24VDC and Gnd, its piston remain stationary unless ExtR is shorted to ComR, in which case the right-actuator's piston extends at velocity $v_Y$, or unless RetR is shorted to ComR, in which case the right-actuator's piston retracts at velocity $v_Y$.

For each actuator, the piston is assumed to stop moving automatically without damage when it reaches its limit in either direction; that is, like the Thomson WhisperTrak™ actuators used in the prototype, the actuator is assumed to have built-in limit switches.

The left switch 2104L is double-pole, three-throw (DP3T), as previously described in Section 6.3.4 under the heading "Switch-Tunnel Assembly". A first pole of left switch 2104L, denoted "switch I" on FIG. 36A, connects pin 2 of 2104L to nothing in a first, default position, to pin 1 in a second position, and to pin 3 in a third position. A second pole of switch 2104L, denoted "switch J", connects pin 5 to nothing in the first, default position, to pin 4 in the second position and to pin 6 in the third position.

Similarly, the right switch 2104R is double-pole, three-throw (DP3T). A first pole of switch 2104R, denoted "switch K", connects its pin 2 of 2104R to nothing in a first, default position, to pin 1 in a second position, and to pin 3 in a third position. A second pole of switch 2104R, denoted "switch L", connects pin 5 to nothing in the first, default position, to pin 4 in the second position and to pin 6 in the third position. Switches 2104L and 2104R used in the prototype are three-position rocker switches comprising a paddle that the user employs to actuator the switch, wherein the first position is the default position to which the switch automatically returns when the user releases the paddle, and the second and third positions are "momentary"; that is, the switch remains in the second or third positions only as long as the user holds the paddle. This type of switch is often referred to as "momentary-off-momentary".

The first, second, and third positions of switches 2104L and 2104R correspond to user commands "Off", "Extend" and "Retract", respectively. The Off command requests that the pistons of both actuators remain stationary so that the platform 1602 remains stationary. The Extend command requests that the pistons of both actuators extend, so that the platform, referring to coordinate system 1114, rises toward +z. The Retract command requests that the pistons of both actuators retract, so that the platform descends toward −z. Using a switch that returns to Off when the user releases it provides safety, because the actuators stop moving upon release. The momentary-off-momentary rocker switches used in the prototype satisfy this safety requirement.

Switches 2104L and 2104R are wired in parallel, pin for pin. That is, pin i of switch 2104L is connected to pin i of switch 2104R, where i=1, 2, 3, 4, 5, 6. Consequently, the user of the lifting apparatus may actuate either switch to raise or lower the apparatus. That is, the switches are redundant; although the embodiment would operate with only one of the switches, the two switches are provided to accommodate both right- and left-handed users, as well as users who may have a one-sided disability. In the description below, it is assumed that the user operates the left switch 2104L only, but all of the discussion would go through if it were assumed instead that the user operated the right switch 2104R.

Each of the four relays 2720, 2722, 2724, and 2726 is double-pole, double-throw (DPDT). That is, each relay comprises a first pole, a second pole, and a coil. When the coil is not energized, pins (3, 4) are shorted together at the first pole and pins (10, 9) are shorted together at the second pole. When the coil is energized, pins (5, 4) are shorted together at the first pole and pins (8, 9) are shorted together at the second pole. The tilt relays 2720 and 2726 use only the "normally closed" ("NC") pins (3, 4) and (10, 9), whereas the extend relay 2722 and the retract relay 2724 use only the "normally open" ("NO") pins (5, 4) and (8, 9). The first and second poles of relay 2720 are denoted "switch A" and "switch B" respectively, as shown on FIG. 36A. The first and second poles of relay 2726 are denoted "switch C" and "switch D", respectively. The first and second poles of relay 2722 are denoted "switch E" and "switch F", respectively. The first and second poles of relay 2724 are denoted "switch G" and "switch H", respectively. Diodes 2728 are to protect the relay coils from harmful voltage spikes that occur when voltage is removed, as is well known in the art.

Switch I of 2104L, or alternatively switch K of 2104R, is used to energize the coil of relay 2722 when switch I is in the second position (i.e. when the Ext command is asserted) and to energize the coil of relay 2724 when switch I is in the third position (i.e. when the Ret command is asserted). Switch J of 2104L, or alternatively switch L of 2014R, is used to energize the fan 2718 and the hour meter 2712 when either of the commands Ext or Ret is asserted. Because the fan 2718 spins only when either Ext or Ret is asserted, the lifting apparatus is completely silent unless it is being actively employed to raise or lower a user. Because the hour meter 2712 logs time only when Ext or Ret is asserted, it properly records the usage of the actuators 1800L and 1800R, in order to appreciate when the end of actuator life is approaching. The hour meter will slightly over-record usage of an actuator that, because of tilt conditions, does not actually operate, as described below, but a tilt condition is rare enough that this does not substantially matter for end-of-life prediction.

The tilt sensor 2562 comprises two open-collector outputs that together define a tilt status: a first open-collector output denoted "CW Tilt" at the tilt-sensor's pin 4, and a second open-collector output denoted "CCW Tilt" at the tilt-sensor's pin 3. "CW" and "CCW" refer to clockwise and counterclockwise tilt, respectively, as defined by equation (93). Whenever the tilt sensor senses that its base, mounted upon flange 2514 of electronics panel 2502, is substantially level with respect to rotation about the y axis in FIG. 25B, both tilt-sensor pins 3 and 4 remain internally unconnected; in this state, the tilt status is "No Tilt". However, whenever the tilt sensor senses that its base is tilted clockwise beyond a programmable threshold, the "CW Tilt" open-collector output at pin 4 is substantially shorted to ground potential (Gnd); in this state, the tilt status is "CW Tilt". Conversely, whenever the tilt sensor senses that its base is tilted counterclockwise beyond the programmable threshold, the "CCW Tilt" open-collector output at pin 3 is substantially shorted to ground potential (Gnd); in this state, the tilt status is "CCW Tilt".

Consequently, under normal circumstances when No Tilt is asserted, the coils of relays 2720 and 2726 are not energized, so the "normally closed" switches A, B, C, and D all remain closed, as shown in FIG. 36A. However, whenever CW Tilt is asserted, the coil of the CW Tilt relay 2720 is energized, whereby switches A and B open. Conversely, whenever CCW Tilt is asserted, the coil of the CCW Tilt relay 2726 is energized, whereby switches C and D open.

Because the user switch 2104L (or 2014R) has three positions (Off, Extend, Retract), and because for each position there are three possible values of tilt status (No Tilt, CW Tilt, CCW Tilt), there are consequently nine cases that must be analyzed to prove that the electrical circuit shown in FIG. 36A operates as desired. The nine cases are illustrated in FIGS. 36A through 36I. Each of FIGS. 36B through 36I is similar to FIG. 36A; the figures differ only in two ways: first, in the position of switches I and J caused by the user asserting Off, Extend, or Retract, and in the consequent energization states of relays 2722 and 2724 and therefore the positions of switches E through H; and second, in the status of the outputs CW Tilt and CCW Tilt of the tilt sensor, and in the consequent energization states of relays 2720 and 2724 and therefore the positions of switches A through D. Specifically, FIG. 36A illustrates a first case denoted (No Tilt, Off),
FIG. 36B illustrates a second case denoted (No Tilt, Exend),
FIG. 36C illustrates a third case denoted (No Tilt, Retract),
FIG. 36D illustrates a fourth case denoted (CW Tilt, Off),
FIG. 36E illustrates a fifth case denoted (CW Tilt, Extend),
FIG. 36F illustrates a sixth case denoted (CW Tilt, Retract),
FIG. 36G illustrates a seventh case denoted (CWW Tilt, Off),
FIG. 36H illustrates an eighth case denoted (CWW Tilt, Extend), and
FIG. 36I illustrates a ninth case denoted (CWW Tilt, Retract).

These nine cases are also summarized in FIG. 37, which tabulates, for each case, the tilt status (No Tilt, CW Tilt, or CCW Tilt), the user command being asserted (Off, Extend, or Retract), the coil-energization status for the four relays 2720, 2722, 2724, and 2726, and the state of the ten switches A through J.

The general strategy for all six cases where Extend or Retract is asserted is:
(1) If the tilt status is No Tilt, move both actuators' pistons in the commanded direction (Extend or Retract).
(2) If the tilt status is CW Tilt or CWW Tilt, move only one of the actuators' pistons in the commanded direction (Extend or Retract)—the one that tends to eliminate the tilt.

Referring now to FIG. 36A through FIG. 36I, the nine cases are examined in detail. On these figures, a relay coil is shown as cross-hatched when it is energized.

FIG. 36A illustrates the first case, denoted (No Tilt, Off), in which the platform 1602 is level enough that the tilt sensor asserts No Tilt, and the user is not actuating a switch, so Off is asserted. Consequently, neither the left actuator's piston nor the right actuator's piston should move. The circuit configuration in FIG. 36A achieves both these objectives. First, the left actuator's piston does not move: it is prevented from extending by open switch E, which prevents the connection of ExtL to ComL, and it is prevented from retracting by open switch H, which prevents the connection of RetL to ComL Second, the right actuator's piston does not move: it is prevented from extending by open switch F, which prevents the connection of ExtR to ComR, and it is prevented from retracting by open switch G, which prevents the connection of RetR to ComR.

FIG. 36B illustrates the second case, denoted (No Tilt, Extend), in which the platform 1602 is level enough that the tilt sensor asserts No Tilt, and the user is actuating switch 2104L to its second position, so that Extend is asserted. Consequently, both the left actuator's piston and the right actuator's piston should extend. The circuit configuration shown in FIG. 36B accomplishes both these objectives. First, the left actuator's piston extends because closed switches A and E cause ExtL to be shorted to ComL via a path 3602 shown as a heavy dashed line. The left actuator's piston is prevented from retraction by open switch H, which prevents RetL from being shorted to ComL. Second, the right actuator's piston extends because closed switches C and F cause ExtR to be shorted to ComR via a path 3604 shown as a heavy dotted line, while open switch G prevents retraction of the right piston by preventing RetR from being shorted to ComR.

FIG. 36C illustrates the third case, denoted (No Tilt, Retract), in which the platform 1602 is level enough that the tilt sensor asserts No Tilt, and the user is actuating switch 2104L to its third position, so that Retract is asserted. Consequently, both the left actuator's piston and the right actuator's piston should retract. The circuit configuration in FIG. 36C accomplishes both these objectives. First, the left actuator's piston retracts because closed switches D and H cause RetL to be shorted to ComL via a path 3606 shown as a heavy dashed line, while open switch E prevents extension of the left piston by preventing ExtL from being shorted to ComL Second, the right actuator's piston retracts because closed switches B and G cause RetR to be shorted to ComR via a path 3608 shown as a heavy dotted line, while open switch F prevents retraction of the right actuator's piston by preventing ExtR from being shorted to ComR.

FIG. 36D illustrates the fourth case, denoted (CW Tilt, Off), in which the platform 1602 is tilted clockwise far enough that the tilt sensor asserts CW Tilt, and the user is not actuating a switch, so Off is asserted. According to definition (93) of clockwise tilt, the tilt sensor is sensing that the lifting apparatus is too high on the left, but because the user is not requesting motion, neither the left actuator's piston nor the right actuator's piston should move. The circuit configuration in FIG. 36D accomplishes both these objectives. First, the left actuator's piston does not move: it is prevented from extending by open switches A and E, which prevent the connection of ExtL to ComL, and it is prevented from retracting by open switch H, which prevents the connection of RetL to ComL. Second, the right actuator's piston does not move: it is prevented from extending by open switch F, which prevents the connection of ExtR to ComR, and it is prevented from retracting by open switches B and G, which prevent the connection of RetR to ComR.

FIG. 36E illustrates the fifth case, denoted (CW Tilt, Extend), in which the platform 1602 is tilted clockwise far enough that the tilt sensor asserts CW Tilt, and the user is actuating switch 2104L to its second position, so that Extend is asserted. According to definition (93) of clockwise tilt, the tilt sensor is sensing that the lifting apparatus is too high on the left. Consequently, to correct the clockwise tilt, the right-actuator's piston should be extended, but the left-actuator's piston should remain stationary until the clockwise tilt is corrected. The circuit configuration in FIG. 36E accomplished both these objectives. First, the left actuator's piston remains stationary: it is prevented from extending by open switch A, which prevents the connection of ExtL to ComL, and it is prevented from retracting by open switch H, which prevents the connection of RetL to ComL Second, the right actuator's piston is allowed to extend by virtue of the closed switches C and F that cause ExtR to be shorted to ComR via a path 3610 shown as a heavy dotted line, while open switches B and G prevent retraction of the right actuator's piston by preventing the connection of RetR to ComR.

FIG. 36F illustrates the sixth case, denoted (CW Tilt, Retract), in which the platform 1602 is tilted clockwise far enough that the tilt sensor asserts CW Tilt, and the user is actuating switch 2104L to its third position, so that Retract is asserted. According to definition (93) of clockwise tilt, the tilt sensor is sensing that the lifting apparatus is too high on the left. Consequently, to correct the clockwise tilt, the left-actuator's piston should be retracted, but the right-actuator's piston should remain stationary until the clockwise tilt is corrected. The circuit configuration in FIG. 36F accomplishes both these objectives. First, the left actuator's piston is allowed to retract by virtue of closed switches D and H that cause RetL to be shorted to ComL via a path 3612 shown as a heavy dashed line, while open switches A and E prevent extension of the left-actuator's piston by preventing connection of ExtL to ComL Second, the right actuator's piston remains stationary: it is prevented from extending by open switch F, which prevents connection of ExtR to ComR, and it is prevented from retracting by open switch B, which prevents connection of RetR to ComR.

FIG. 36G illustrates the seventh case, denoted (CCW Tilt, Off), in which the platform 1602 is tilted counterclockwise far enough that the tilt sensor asserts CCW Tilt, and the user is not actuating a switch, so Off is asserted. According to definition (93) of counterclockwise tilt, the tilt sensor is sensing that the lifting apparatus is too high on the right, but because the user is not requesting motion, neither actuator's piston should move. The circuit configuration in FIG. 36G accomplishes both these objectives. First, the left actuator's piston does not move: it is prevented from extending by open switch E, which prevents the connection of ExtL to ComL, and it is prevented from retracting by open switches D and H, which prevent the connection of RetL to ComL. Second, the right actuator's piston does not move: it is prevented from extending by open switches C and F, which prevent the connection of ExtR to ComR, and it is prevented from retracting by open switch G, which prevents the connection of RetR to ComR.

FIG. 36H illustrates the eighth case, denoted (CCW Tilt, Extend), in which the platform 1602 is tilted counterclockwise far enough that the tilt sensor asserts CCW Tilt, and the user is actuating switch 2104L to its second position, so that Extend is asserted. According to definition (93) of counterclockwise tilt, the tilt sensor is sensing that the lifting apparatus is too high on the right. Consequently, to correct the counterclockwise tilt, the left-actuator's piston should be extended, but the right-actuator's piston should remain stationary until the counterclockwise tilt is corrected. The circuit configuration in FIG. 36H accomplishes both these objectives. First, the left actuator's piston is allowed to extend by virtue of the closed switches A and E that cause ExtL to be shorted to ComL via a path 3614 shown as a heavy dashed line, while open switches D and H prevent the left-actuator's piston from retracting by preventing the connection of RetL to ComL Second, the right actuator's piston remains stationary: it is prevented from extending by open switch C, which prevents the connection of ExtR to ComR, and it is prevented from retracting by virtue of open switch G, which prevents the connection of RetR to ComR.

FIG. 36I illustrates the ninth case, denoted (CCW Tilt, Retract), in which the platform 1602 is tilted counterclockwise far enough that the tilt sensor asserts CCW Tilt, and the user is actuating switch 2104L to its third position, so that Retract is asserted. According to definition (93) of counterclockwise tilt, the tilt sensor is sensing that the lifting apparatus is too high on the right. Consequently, to correct the counterclockwise tilt, the right-actuator's piston should be retracted, but the left-actuator's piston should remain stationary until the counterclockwise tilt is correct. The circuit configuration in FIG. 36I accomplishes both these objectives. First, the left actuator's piston remains stationary: it is prevented from extending by open switch E, which prevents connection of ExtL to ComL, and it is prevented from retracting by open switch D, which prevents connection of RetL to ComL. Second, the right actuator is allowed to retract by virtue of the closed switches B and G that cause RetR to be shorted to ComR via a path 3616 shown as a heavy dotted line, while open switches C and F prevent the right-actuator's piston from extending by preventing the connection of ExtR to ComR.

The tilt sensor 2562 used in the prototype, available from The Fredericks Company as Model 0729-1758-99 as previously noted in Section 6.5.1, may be programmed to do the following:

(1) Set the rotational orientation about the y axis that is defined as "pseudo-level". This allows slightly out-of-level floors to be defined artificially as pseudo-level. Defining the xy plane of coordinate system 1100 as parallel to the floor, the pseudo-level position corresponds to $\varphi = 0$.

(2) Set an angular deviation $\Delta\phi$ from the pseudo-level orientation that, in either direction, will trigger the tilt sensor. That is, let $\phi_P$=Angular orientation of platform surface 1604 about the y axis. Assume that surface 1604 is parallel to the base of the tilt sensor 2562. (101)

Then, using definition (93) of angle ω, the tilt sensor will assert CW Tilt on pin 4 if $\phi_P < -\Delta\phi$ (102)

and will assert CCW Tilt on pin 3 if $\phi_P > +\Delta\phi$. (103)

In the context of the lifting apparatus described herein as the first embodiment, programming is done as follows, in accordance with the operation of tilt-sensor model 0729-1758-99 from The Fredericks Company:

(a) Temporarily remove the second shorting connector 2588 from the second tilt-sensor programming connector 2570. This temporarily removes power from the tilt sensor 2562.

(b) Temporarily attach the first shorting connector 2586, normally stored in the fifth dummy connector 2590, to the first tilt-sensor programming connector 2566.

(c) Establish an orientation of the lifting apparatus 1100 that will be deemed to be pseudo-level.

(d) Re-attach the second shorting connector 2588 to the second tilt-sensor programming connector 2570. This restores power to the tilt tensor. Wait at least three seconds.

(e) Tilt the lifting apparatus 1100 by the angular deviation $\Delta\phi$ beyond which the tilt-sensor should assert a tilt output. The angular deviation $\Delta\phi$ may be applied in either direction; the tilt sensor will use the same deviation in both directions.

(f) Remove the first shorting connector 2586 from the first tilt-sensor programming connector 2566, and replace it in the fifth dummy connector 2590 for storage. Wait at least 3 seconds.

(g) Temporarily remove the second shorting connector 2588 from the second tilt-sensor programming connector 2570. This temporarily removes power from the tilt sensor. Wait at least 3 seconds.

(h) Again re-attach the second shorting connector 2588 to the second tilt-sensor programming connector 2570. This restores power to the tilt tensor.

The tilt sensor is now programmed with the desired pseudo-level value and the desired value of $\Delta\phi$.

The choice of tilt sensor discussed above is not meant to be limiting; it is merely exemplary of the type of tilt sensor that is appropriate in one or more embodiments.

8. ALTERNATIVE EMBODIMENTS

Figure 38:
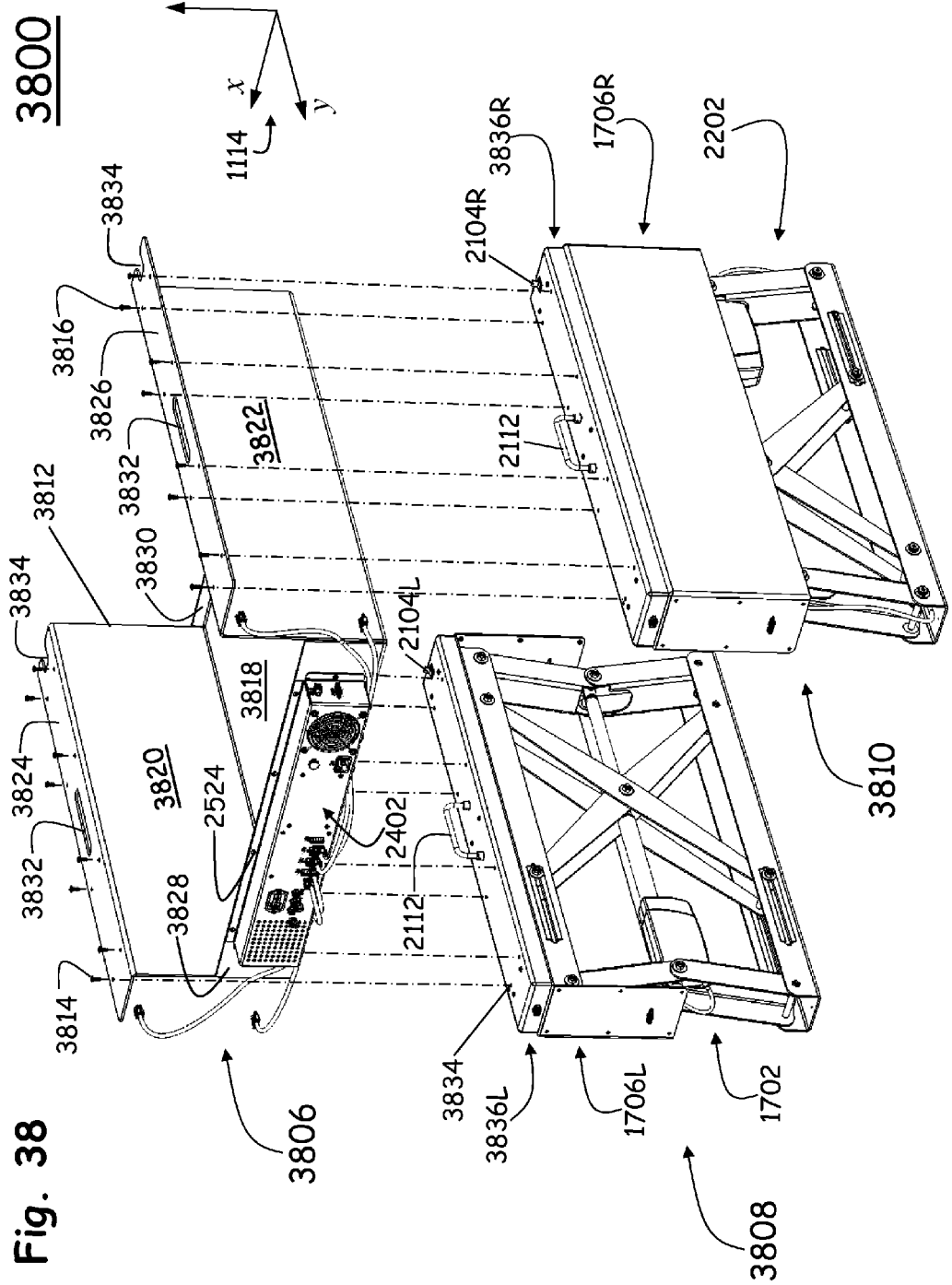
FIG. 38 is a rear-perspective, exploded view of a lifting apparatus 3800 according to a second embodiment.

FIG. 38 is an exploded diagram illustrating a lifting apparatus 3800 according to a second embodiment that is a modification of the first-embodiment lifting apparatus 1100. Lifting apparatus 3800 comprises a monolithic platform assembly 3806, a modified left lifter assembly 3808, and a modified right lifter assembly 3810. The monolithic platform assembly 3806 comprises a monolithic platform 3812, the electronics assembly 2402, and fasteners 3814 and 3816 suitable for affixing the monolithic platform assembly 3806 to the left and right lifter assemblies 3808 and 3810, respectively.

The second-embodiment lifter apparatus 3800 differs from the first-embodiment lifter apparatus 1100 in that monolithic platform 3812 replaces the following elements of the first embodiment: the platform 1602 (FIG. 16), the Z-plates 1704L and 1704R (FIGS. 22A and 22B), and the rear strut 2404 (FIG. 24).

The monolithic platform 3812 comprises a base flange 3818, a left vertical flange 3820, a right vertical flange 3822, a left horizontal flange 3824, a right horizontal flange 3826, a rear flange 3828, and a front flange 3830. Electronics assembly 2402, which is identical to that in the first embodiment, is attached to the rear flange 3828 using fasteners 2524. Slots 3832 in the left and right horizontal flanges 3824 and 3826 accommodate handles 2112; notches 3834 accommodate switches 2104L and 2104R.

Left lifter assembly 3808 is identical to the lifter assembly 1108 with the following exceptions: first, in lifter assembly 3808, the Z-plate assembly 1704L is removed, and the shroud assembly 1706L is affixed atop bar B4 of left linkage assembly 1702. Holes 3834 are added to switch tunnel 2012 of switch-tunnel assembly 1708L to create a modified switch tunnel assembly 3836, a first instance of which, denoted 3836L, is affixed atop the left-shroud assembly 1706L. The left horizontal flange 3824 of the monolithic platform 3812 is affixed to the modified switch-tunnel assembly 3836L using fasteners 3814. Thus, for the second embodiment, the switch-tunnel assembly 3836L serves as the lifting member for the left lifter assembly 3808.

Likewise, right lifter assembly 3810 is identical to the right assembly 1110 with the following exceptions: first, in right lifter assembly 3810, the Z-plate assembly 1704R is removed, and the shroud assembly 1706R is affixed atop bar B4 of right linkage assembly 2202. A second instance of modified switch-tunnel assembly 3836, denoted 3836R, is affixed atop the right shroud assembly 1706R. The right horizontal flange 3826 of the monolithic platform 3812 is affixed to the modified switch tunnel assembly 3836R using fasteners 3816. Thus, for the second embodiment, the switch-tunnel assembly 3836R serves as the right lifting member of the right lifter assembly 3810.

Figure 39:
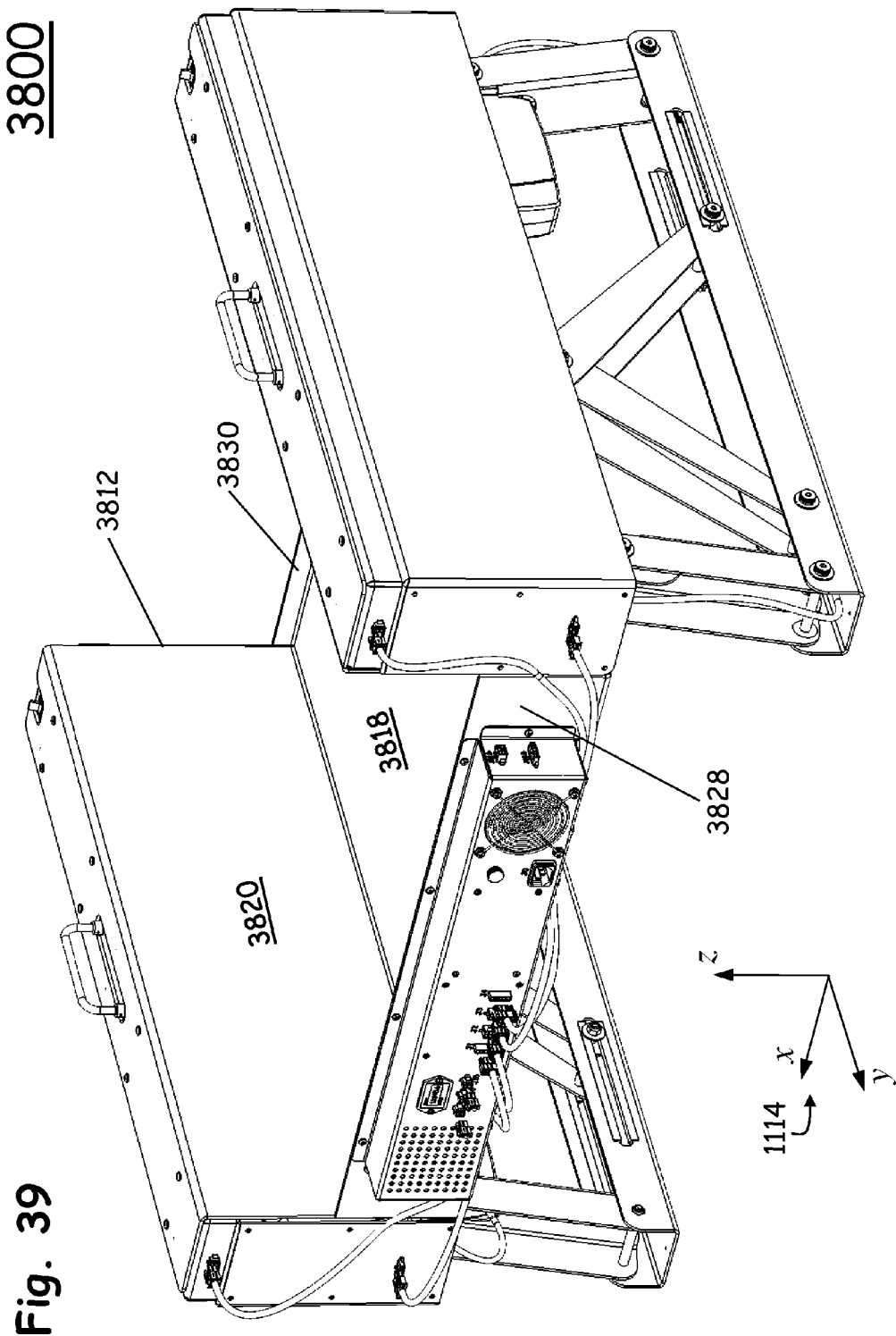
FIG. 39 is a rear-perspective, assembled view of the lifting apparatus 3800, shown in a high position.

FIG. 39 illustrates an assembled perspective view of the second embodiment 3800. Operation of the second-embodiment lifting assembly 3800 is identical to that of the first-embodiment lifting assembly 1100.

Figure 40:
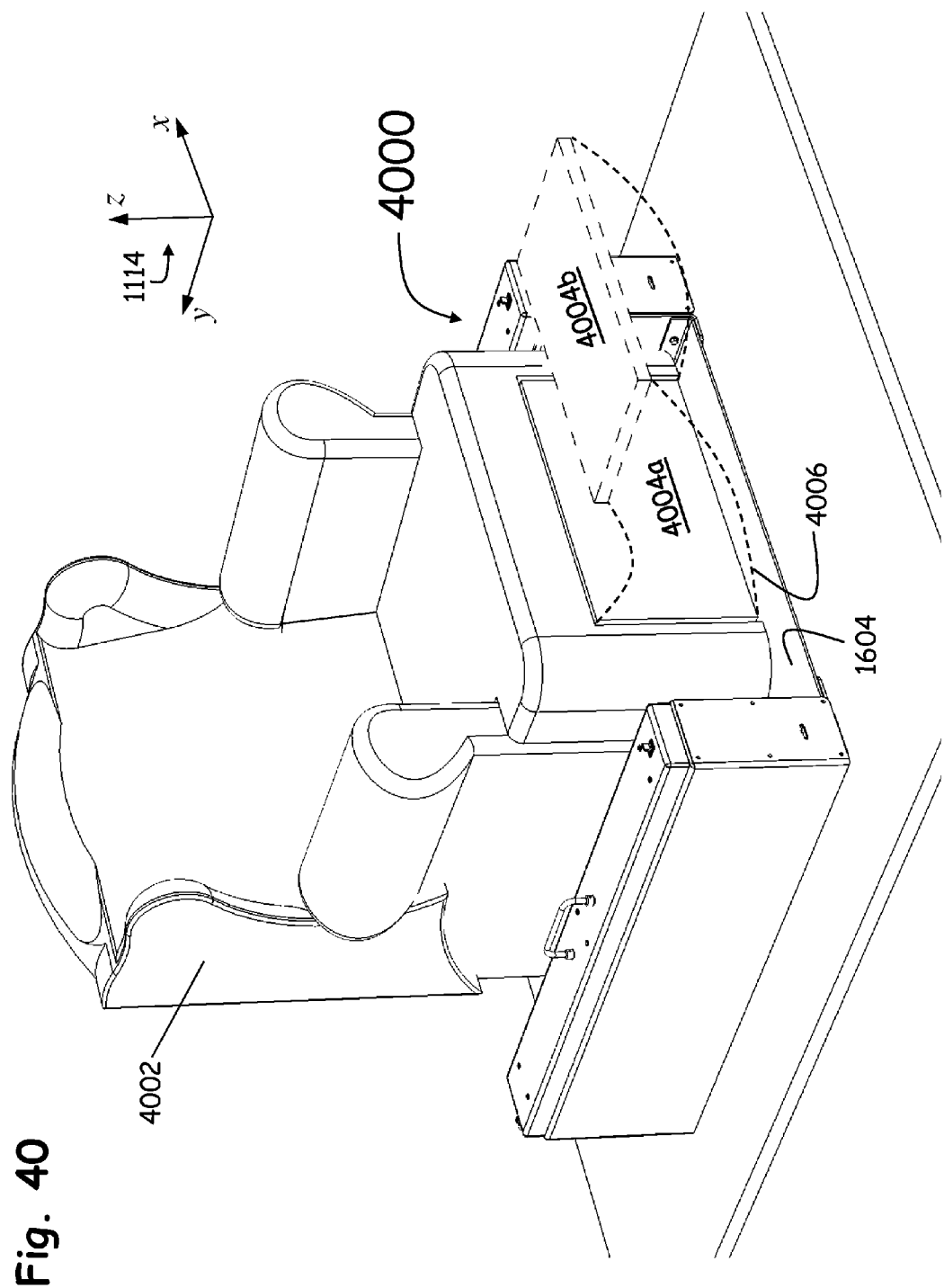
FIG. 40 is a perspective view of a lifting apparatus 4000 according to a third embodiment.

FIG. 40 illustrates a perspective view of a lifter apparatus 4000 according to a third embodiment, together with a chair 4002. The third embodiment 4000 is identical to the first embodiment except that the front flange 1612 of the platform 1602 is eliminated. Elimination of the front flange may be desirable in cases where the chair 4002 comprises a movable foot-rest 4004 that is normally stored in a first, stored position 4004a, but that may be moved along a path indicated by the dotted lines 4006 to a second, deployed position 4004b. For some chairs, during execution of this motion, an internal mechanism of the chair that enables the motion, not shown in FIG. 40, would experience an interference with the front flange 1612 if it were present. Elimination of the front flange 1612 eliminates this interference. A purpose of the front flange is to stiffen the platform; if it is removed as in apparatus 4000, stiffness of the base flange 1604 of the platform 1602 may be regained by making the base flange thicker. An additional purpose of the front flange is to prevent forward sliding of the chair on the platform; if the front flange is removed, forward sliding is prevented as described in Section 6.6.3.

9. CONCLUSIONS, RAMIFICATION, SCOPE

Thus the reader will see that at least one embodiment of the lifter apparatus provides several advantages for the purpose of raising and lowering a payload, in particular a chair and a user seated therein, thereby helping the user to stand and to sit. The user's comfort is enhanced by providing an apparatus capable of lifting the user's own, favorite chair. The user's comfort is further enhanced because the apparatus does not interfere with a comfortable seat height when the apparatus is configured in the low position that is used while the user is sitting. That is, the chair's seat height in the low position is minimally different from what it would be if the apparatus were absent; for example, in the prototype of the first embodiment, the difference is only 12 mm. The user is also provided with a full measure of sit-to-stand assistance, because the apparatus is capable of raising the seat height by a large amount; for example, in the prototype of the first embodiment, the seat height may be raised by as much as 243 mm (9.6"), which is ample even for demanding users according to clinical studies. Furthermore, because the lifter apparatus has no floor-level obstructions across the front when in the high position, it does not interfere with the user's ability to achieve posterior foot placement, which is helpful for standing. All of these advantages are provided in an apparatus that is easily and safely retrofittable to a wide variety of chairs, including popular recliner chairs, without requiring modification thereof, and without interfering with the reclining or rocking operation thereof. Moreover, the apparatus is easily deployable, movable, and storable, comprising only a few subassemblies that are manageable and easy to assemble and disassemble.

While the above description contains much specificity, this should not be construed as limitations on the scope, but rather as an exemplification of several embodiments thereof. Many other variations are possible. As a first example, although each enumerated embodiment comprises hex-plus-X linkages as described in Hall (2012), other types of linkages described therein, such as X linkages, as well as other mechanisms, may be used. As a second example, although each enumerated embodiment comprises Thomson Whisper-Trak™ actuators, other types of electrically powered actuators may be used, as well as those that are powered pneumatically, hydraulically, or otherwise. As a third example, although each enumerated embodiment comprises a tilt sensor to enhance safety, and an hour meter to detect end of actuator life, the tilt sensor and hour meter are optional. As a fourth example, although each enumerated embodiment comprises hard-wired switches by which the user asserts the Extend, Retract, and Off commands, a variety of wireless-remote switches may be provided, alternatively or additionally, for this purpose. As a fifth example, electronics components shown in FIGS. 25A and 25B may be packaged differently; for instance, the tilt sensor 2562 may be mounted directly on the base flange 1604 of the platform 1602 and the other electronics components may be packaged in a container that is separate from the rest of the lifting apparatus and connected thereto by cables, including cables analogous to the cables 2406, 2408, 2410, and 2412 shown in FIG. 24, as well as a fifth cable that connects the container to the platform-mounted tilt sensor. As a sixth example, the linkages may be designed to produce a forward tilt of the platform as it rises, which involves a rotation of the platform about the x axis, if such tilt is desired to assist in forward placement of the user's center of gravity prior to standing. As a seventh example, the lifting apparatus may be employed to lift a payload other than a chair and its user.

Accordingly, the scope should be determined not by the embodiments illustrated, but by the appended claims and their legal equivalents.

I claim:

1. A lifting apparatus for raising and lowering a payload along an imaginary z axis of an imaginary, right-handed Cartesian xyz coordinate system comprising an imaginary x axis defining a +x direction and a −x direction, an imaginary y axis defining a +y direction and a −y direction, and the imaginary z axis defining a +z direction and a −z direction, these axes also defining an imaginary xy plane spanned by the x and y axes, in which context the lifting apparatus comprises:

a. a platform whose projection upon the xy plane is substantially rectangular, the platform comprising a substantially planar platform top surface facing the +z direction upon which the payload is placed, a left platform portion near a +x edge of the platform that is also known as the left edge, a right platform portion near a −x edge of the platform that is also known as the right edge, a front platform portion near a −y edge of the platform that is also known as the front edge, and a rear platform portion near a +y edge of the platform that is also known as the rear edge;

b. a left lifter assembly comprising a left hex-plus-X linkage and a left lifting member, wherein the left hex-plus-X linkage comprises a left base member which rests on a reference surface such as a floor that is substantially parallel to the xy plane, and a left actuator capable of raising and lowering the left lifting member with respect to the left base member, c. a right lifter assembly comprising a right hex-plus-X linkage and a right lifting member, wherein the right hex-plus-X linkage comprises a right base member which rests on the reference surface, and a right actuator capable of raising and lowering the right lifting member with respect to the right base member, d. power means capable of powering both the left actuator and the right actuator, the left actuator receiving either Forward Power to raise the left platform portion toward +z, or Reverse Power to lower the left platform portion toward −z, or No Power to leave the left platform portion stationary, and similarly, the right actuator receiving either Forward Power to raise the right platform portion toward +z, or Reverse Power to lower the right platform portion toward −z, or No Power to leave the right platform portion stationary;

e. control means capable of issuing commands denoted Extend, Retract, and Off, these commands causing a delivery of either Forward Power, Reverse Power, or No Power, respectively, to the left and right actuators simultaneously, whereby both the left and right lifting members, as well as the platform affixed thereto, execute a motion in the z direction, either ascending substantially in unison toward +z, descending substantially in unison toward −z, or remaining stationary, in accordance with the Extend, Retract, and Off commands, respectively, such that a distance R from the reference surface to a representative point on the front edge may be increased or decreased, in a substantially continuous fashion, between a minimum value $R_{SIT}$ defining a low position of the lifting apparatus and a maximum value $R_{STAND}$ defining a high position of the lifting apparatus.

2. The apparatus as described in claim 1 in which the payload is a seating device such as a chair, as well as a person using the seating device.

3. An apparatus as described in claim 1 in which $R_{SIT}$ is less than 25 millimeters.

4. An apparatus as described in claim 2 in which $R_{SIT}$ is less than 25 millimeters.

5. A lifting apparatus for raising and lowering a payload along an imaginary z axis of an imaginary, right-handed Cartesian xyz coordinate system comprising an imaginary x axis defining a +x direction and a −x direction, an imaginary y axis defining a +y direction and a −y direction, and the imaginary z axis defining a +z direction and a −z direction, these axes also defining an imaginary xy plane spanned by the x and y axes, in which context the lifting apparatus comprises:
   a. a platform whose projection upon the xy plane is substantially rectangular, the platform comprising a substantially planar platform top surface facing the +z direction upon which the payload is placed, a left platform portion near a +x edge of the platform that is also known as a left edge, a right platform portion near a −x edge of the platform that is also known as a right edge, a front platform portion near a −y edge of the platform that is also known as a front edge, and a rear platform portion near a +y edge of the platform that is also known as a rear edge;
   b. a left lifter assembly comprising a left base member that rests on a reference surface such as a floor that is substantially parallel to the xy plane, a left lifting member affixed to the left platform portion, and a left actuator denoted LA that is capable of raising and lowering the left lifting member with respect to the left base member;
   c. a right lifter assembly comprising a right base member that rests on the reference surface, a right lifting member affixed to the right platform portion, and a right actuator denoted RA that is capable of raising and lowering the right lifting member with respect to the right base member;
   d. power means capable of powering both the left actuator LA and the right actuator RA, the left actuator receiving either Forward Power to raise the left platform portion toward +z, or Reverse Power to lower the left platform portion toward −z, or No Power to leave the left platform portion stationary, and similarly, the right actuator receiving either Forward Power to raise the right platform portion toward +z, or Reverse Power to lower the right platform portion toward −z, or No Power to leave the right platform portion stationary;
   e. control means capable of asserting commands denoted Extend, Retract, and Off, the Extend command requesting that the left and right platform portions be raised in unison toward +z, the Retract command requesting that the left and right platform portions be lowered in unison toward −z, and the Off command requesting that the left and right platform portions both remain stationary, the control means thereby defining a command status having the value of Extend, Retract, or Off, respectively;
   f. tilt-sensing means capable of detecting sideways rotation of the platform, about the y axis, and asserting either CW Tilt, or CCW Tilt, or No Tilt, wherein CW Tilt is asserted if the tilt-sensing means detects a clockwise tilt of the platform about the y axis beyond a pre-determined tilt-angle threshold defined with respect to the xy plane, implying that the left edge of the platform is substantially further toward +z than is the right edge of the platform; CCW Tilt is asserted if the tilt-sensing means detects a counterclockwise tilt of the platform about the y axis beyond the tilt threshold, implying that the right edge of the platform is substantially further toward +z than is the left edge of the platform; and No Tilt is asserted if the tilt sensor detects that the platform is substantially parallel to the xy plane with respect to rotation about the y axis; the tilt-sensing means thereby defining a tilt status having the value of CW Tilt, CCW Tilt, or No Tilt, respectively;
   g. tilt-correction means that, depending on the command status and the tilt status, cause power to be applied to the left and right actuators according to an algorithm defined as follows: first, if the command status is Oft supply No Power to both LA and RA regardless of the tilt status; second, if the tilt status is No Tilt and the command status is Extend, supply Forward Power to both LA and RA; third, if the tilt status is No Tilt and the command status is Retract, supply Reverse Power to both LA and RA; fourth, if the tilt status is CW Tilt and the command status is Extend, supply Forward Power to RA and No Power to LA; fifth, if the tilt status is CW Tilt and the command status is Retract, supply Reverse Power to LA and No Power to RA; sixth, if the tilt status is CCW Tilt and the command status is Extend, supply Forward Power to LA and No Power to RA; and seventh, if the tilt status is CCW Tilt and the command status is Retract, supply Reverse Power to RA and No Power to LA;
   whereby the apparatus always remains stationary when Off is asserted, but otherwise exhibits either a normal behavior when the tilt status is No Tilt, or a tilted behavior otherwise, where
      the normal behavior comprises powering both actuators in unison, applying Forward Power to both actuators when Extend is asserted or applying Reverse Power to both actuators when Retract is asserted, thereby allowing a motion of the platform in the z direction wherein a distance R from the reference surface to a representative point on the front edge is increased or decreased, respectively, in a substantially continuous fashion, between a minimum value $R_{SIT}$ defining a low position of the lifting apparatus and a maximum value $R_{STAND}$ defining a high position of the lifting apparatus, with the front edge of the platform remaining substantially parallel to the xy plane throughout the motion, whereas
      the tilted behavior comprises powering only one of the two actuators when Extend or Retract is asserted, in order to eliminate a clockwise or counterclockwise tilt of the platform about the y axis beyond a predetermined threshold, as represented by the assertion of CW Tilt or CCW Tilt, respectively, thereby to eliminate the tilt and to re-establish approximate parallelism between the platform top surface and the reference surface, whereupon, if both actuators remain capable of the normal behavior, such behavior is immediately and seamlessly resumed, or, if either actuator is not capable thereof; excessive tilt beyond the tilt threshold, both clockwise and counterclockwise, is prevented.

6. The apparatus as described in claim 5 in which the payload is a seating device such as a chair, as well as a person using the seating device.

7. The apparatus as described in claim 5 in which the left lifter assembly comprises a hex-plus-X linkage and the right lifter assembly comprises a hex-plus-X linkage.

8. The apparatus as described in claim 5 in which the left lifter assembly comprises a hex-plus-X linkage and the right lifter assembly comprises a hex-plus-X linkage.

9. An apparatus as described in claim 5 in which $R_{SIT}$ is less than 25 millimeters.

10. An apparatus as described in claim 6 in which $R_{SIT}$ is less than 25 millimeters.

11. An apparatus as described in claim 7 in which $R_{SIT}$ is less than 25 millimeters.

12. An apparatus as described in claim 8 in which $R_{SIT}$ is less than 25 millimeters.

13. A method for raising and lowering a payload along an imaginary z axis of an imaginary, right-handed Cartesian xyz coordinate system comprising an imaginary x axis defining a +x direction and a −x direction, an imaginary y axis defining a +y direction and a −y direction, and the imaginary z axis defining a +z direction and a −z direction, these axes also defining an imaginary xy plane spanned by the x and y axes, in which context the method comprises:
  a. providing a platform whose projection upon the xy plane is substantially rectangular, the platform comprising a substantially planar platform top surface facing the +z direction upon which the payload is placed, a left platform portion near a +x edge of the platform that is also known as the left edge, a right platform portion near a −x edge of the platform that is also known as the right edge, a front platform portion near a −y edge of the platform that is also known as the front edge, and a rear platform portion near a +y edge of the platform that is also known as the rear edge;
  b. providing a left lifter assembly comprising a left hex-plus-X linkage and a left lifting member, wherein the left hex-plus-X linkage comprises a left base member which rests on a reference surface such as a floor that is substantially parallel to the xy plane, and a left actuator capable of raising and lowering the left lifting member with respect to the left base member,
  c. providing a right lifter assembly comprising a right hex-plus-X linkage and a right lifting member, wherein the right hex-plus-X linkage comprises a right base member which rests on the reference surface, and a right actuator capable of raising and lowering the right lifting member with respect to the right base member,
  d. providing power means capable of powering both the left actuator and the right actuator, the left actuator receiving either Forward Power to raise the left platform portion toward +z, or Reverse Power to lower the left platform portion toward −z, or No Power to leave the left platform portion stationary, and similarly, the right actuator receiving either Forward Power to raise the right platform portion toward +z, or Reverse Power to lower the right platform portion toward −z, or No Power to leave the right platform portion stationary;
  e. providing control means capable of issuing commands denoted Extend, Retract, and Off, these commands causing a delivery of either Forward Power, Reverse Power, or No Power, respectively, to the left and right actuators simultaneously,
whereby both the left and right lifting members, as well as the platform affixed thereto, execute a motion in the z direction, either ascending substantially in unison toward +z, descending substantially in unison toward −z, or remaining stationary, in accordance with the Extend, Retract, and Off commands, respectively, such that a distance R from the reference surface to a representative point on the front edge may be varied, in a substantially continuous fashion, between a minimum value $R_{SIT}$ defining a low position of the lifting apparatus and a maximum value $R_{STAND}$ defining a high position of the lifting apparatus.

14. The method as described in claim 13 in which the payload is a seating device such as a chair, as well as a person using the seating device.

15. A method for raising and lowering a payload along an imaginary z axis of an imaginary, right-handed Cartesian xyz coordinate system comprising an imaginary x axis defining a +x direction and a −x direction, an imaginary y axis defining a +y direction and a −y direction, and the imaginary z axis defining a +z direction and a −z direction, these axes also defining an imaginary xy plane spanned by the x and y axes, in which context the method comprises:
  a. providing a platform whose projection upon the xy plane is substantially rectangular, the platform comprising a substantially planar platform top surface facing the +z direction upon which the payload is placed, a left platform portion near a +x edge of the platform that is also known as a left edge, a right platform portion near a −x edge of the platform that is also known as a right edge, a front platform portion near a −y edge of the platform that is also known as a front edge, and a rear platform portion near a +y edge of the platform that is also known as a rear edge;
  b. providing a left lifter assembly comprising a left base member that rests on a reference surface such as a floor that is substantially parallel to the xy plane, a left lifting member affixed to the left platform portion, and a left actuator denoted LA that is capable of raising and lowering the left lifting member with respect to the left base member;
  c. providing a right lifter assembly comprising a right base member that rests on the reference surface, a right lifting member affixed to the right platform portion, and a right actuator denoted RA that is capable of raising and lowering the right lifting member with respect to the right base member;
  d. providing power means capable of powering both the left actuator LA and the right actuator RA, the left actuator receiving either Forward Power to raise the left platform portion toward +z, or Reverse Power to lower the left platform portion toward −z, or No Power to leave the left platform portion stationary, and similarly, the right actuator receiving either Forward Power to raise the right platform portion toward +z, or Reverse Power to lower the right platform portion toward −z, or No Power to leave the right platform portion stationary;
  e. providing control means capable of asserting commands denoted Extend, Retract, and Off, the Extend command requesting that the left and right platform portions be raised in unison toward +z, the Retract command requesting that the left and right platform portions be lowered in unison toward −z, and the Off command requesting that the left and right platform portions both remain stationary, the control means thereby defining a command status having the value of Extend, Retract, or Off, respectively;
  f. providing tilt-sensing means capable of detecting sideways rotation of the platform, about the y axis, and asserting either CW Tilt, or CCW Tilt, or No Tilt, wherein CW Tilt is asserted if the tilt-sensing means detects a clockwise tilt of the platform about the y axis beyond a pre-determined tilt-angle threshold defined with respect to the xy plane, implying that the left edge of the platform is substantially further toward +z than is the right edge of the platform; CCW Tilt is asserted if the tilt-sensing means detects a counterclockwise tilt of the platform about the y axis beyond the tilt threshold, implying that the right edge of the platform is substantially further toward +z than is the left edge of the platform; and No Tilt is asserted if the tilt sensor detects that the platform is substantially parallel to the xy plane with respect to rotation about the y axis; the tilt-sensing means thereby defining a tilt status having the value of CW Tilt, CCW Tilt, or No Tilt, respectively;

g. providing tilt-correction means that, depending on the command status and the tilt status, cause power to be applied to the left and right actuators according to an algorithm defined as follows: first, if the command status is Off, supply No Power to both LA and RA regardless of the tilt status; second, if the tilt status is No Tilt and the command status is Extend, supply Forward Power to both LA and RA; third, if the tilt status is No Tilt and the command status is Retract, supply Reverse Power to both LA and RA; fourth, if the tilt status is CW Tilt and the command status is Extend, supply Forward Power to RA and No Power to LA; fifth, if the tilt status is CW Tilt and the command status is Retract, supply Reverse Power to LA and No Power to RA; sixth, if the tilt status is CCW Tilt and the command status is Extend, supply Forward Power to LA and No Power to RA; and seventh, if the tilt status is CCW Tilt and the command status is Retract, supply Reverse Power to RA and No Power to LA;

whereby the apparatus always remains stationary when Off is asserted, but otherwise exhibits either a normal behavior when the tilt status is No Tilt, or a tilted behavior otherwise, where the normal behavior comprises powering both actuators in unison, applying Forward Power to both actuators when Extend is asserted or applying Reverse Power to both actuators when Retract is asserted, thereby allowing a motion of the platform in the z direction wherein a distance R from the reference surface to a representative point on the front edge is increased or decreased, respectively, in a substantially continuous fashion, between a minimum value $R_{SIT}$ defining a low position of the lifting apparatus and a maximum value $R_{STAND}$ defining a high position of the lifting apparatus, with the front edge of the platform remaining substantially parallel to the xy plane throughout the motion, whereas the tilted behavior comprises powering only one of the two actuators when Extend or Retract is asserted, in order to eliminate a clockwise or counterclockwise tilt of the platform about they axis beyond a predetermined threshold, as represented by the assertion of CW Tilt or CCW Tilt, respectively, thereby to eliminate the tilt and to re-establish approximate parallelism between the platform top surface and the reference surface, whereupon, if both actuators remain capable of the normal behavior, such behavior is immediately and seamlessly resumed, or, if either actuator is not capable thereof, excessive tilt beyond the tilt threshold, both clockwise and counterclockwise, is prevented.

* * * * *